US011928835B2

(12) United States Patent
Arriaga et al.

(10) Patent No.: US 11,928,835 B2
(45) Date of Patent: Mar. 12, 2024

(54) MAP REPRESENTATION DATA PROCESSING DEVICE, INFORMATION PROCESSING METHOD, AND PROGRAM

(71) Applicant: STROLY INC., Kyoto (JP)

(72) Inventors: Varela Enrique Javier Arriaga, Kyoto (JP); Toru Takahashi, Kyoto (JP)

(73) Assignee: STROLY INC., Kyoto (JP)

( * ) Notice: Subject to any disclaimer, the term of this patent is extended or adjusted under 35 U.S.C. 154(b) by 174 days.

(21) Appl. No.: 17/622,473

(22) PCT Filed: Jun. 22, 2020

(86) PCT No.: PCT/JP2020/024436
§ 371 (c)(1),
(2) Date: Dec. 23, 2021

(87) PCT Pub. No.: WO2020/262313
PCT Pub. Date: Dec. 30, 2020

(65) Prior Publication Data
US 2022/0318297 A1   Oct. 6, 2022

(30) Foreign Application Priority Data
Jun. 25, 2019 (JP) .................. 2019-117259

(51) Int. Cl.
*G06F 16/00* (2019.01)
*G06F 16/532* (2019.01)
(Continued)

(52) U.S. Cl.
CPC .............. *G06T 7/70* (2017.01); *G06F 16/532* (2019.01); *G06F 16/55* (2019.01); *G06F 16/587* (2019.01);
(Continued)

(58) Field of Classification Search
CPC ......... G06T 7/70; G06F 16/532; G06F 16/55; G06F 16/587; G06F 16/909; G06F 16/29;
(Continued)

(56) References Cited

U.S. PATENT DOCUMENTS

| 2013/0103306 A1* | 4/2013 | Uetake ............... G01C 21/3889 |
| | | 348/121 |
| 2020/0234613 A1 | 7/2020 | Takahashi |

FOREIGN PATENT DOCUMENTS

| JP | 2002-169823 A | 6/2002 |
| JP | 2010-272082 A | 12/2010 |

(Continued)

OTHER PUBLICATIONS

International Search Report issued in International Patent Application No. PCT/JP2020/024436, dated Aug. 25, 2020; with English translation.

(Continued)

*Primary Examiner* — Jared M Bibbee
(74) *Attorney, Agent, or Firm* — Rimon P.C.

(57) ABSTRACT

It is possible to realize navigation that employs map representation data acquired using a captured map photograph, with a map representation data processing device including: a photograph reception unit that receives a map photograph from a terminal device; a determination unit that searches a navigation information group that contains two or more pieces of navigation information that contain map representation data and two or more pieces of correspondence information that are each a set of coordinate information and position information on the map representation data, and determines a piece of navigation information that has a relationship that satisfies a first condition, with the map photograph; and a navigation information transmission unit that transmits the piece of navigation information determined by the determination unit, to the terminal device.

21 Claims, 61 Drawing Sheets

(51) Int. Cl.
    *G06F 16/55*     (2019.01)
    *G06F 16/587*     (2019.01)
    *G06T 7/70*     (2017.01)
    *G06V 10/40*     (2022.01)
    *G06V 10/764*     (2022.01)
    *G06V 30/19*     (2022.01)

(52) U.S. Cl.
    CPC ............ *G06V 10/40* (2022.01); *G06V 10/764* (2022.01); *G06V 30/19* (2022.01)

(58) Field of Classification Search
    CPC .... G06F 40/279; G06V 10/40; G06V 10/764; G06V 30/19; G09B 29/10
    See application file for complete search history.

(56) References Cited

FOREIGN PATENT DOCUMENTS

| | | |
|---|---|---|
| JP | 2011-043788 A | 3/2011 |
| JP | 2011-158518 A | 8/2011 |
| JP | 2012-168069 A | 9/2012 |
| JP | 2012-185741 A | 9/2012 |
| JP | 2014-032308 A | 2/2014 |
| WO | 2019/069366 A1 | 4/2019 |

OTHER PUBLICATIONS

Extended European Search Report issued from corresponding European Application No. 20831685.1 dated Jul. 5, 2022 (19 pages).

\* cited by examiner

| String | | Label |
|---|---|---|
| Kyoto Aquarium | | 1 |
| Museum of Art Osaka | | 1 |
| 森美術館 | | 1 |
| 63h | | 0 |
| 10:00 AM to 11:00 PM | | 0 |
| Evacuation Area | | 0 |
| 神社 | | 2 |
| Holiday Inn | | 2 |
| First Avenue | | 2 |

FIG.6

| Location information | Position information |
|---|---|
| ABC | (X1, Y1) |
| XYZ | (X2, Y2) |
| DEF | (X3, Y3) |
| ⋮ | ⋮ |

FIG.15

| ID | Map representation data identifier | Coordinate information | Position information | Location information |
|---|---|---|---|---|
| 1 | Gojo-dori | $(x_{51}, y_{51})$ | (X51, Y51) | G01 |
| 2 | Gojo-dori | $(x_{52}, y_{52})$ | (X52, Y52) | G02 |
| 3 | Gojo-dori | $(x_{53}, y_{53})$ | (X53, Y53) | G03 |
| ⋮ | ⋮ | ⋮ | ⋮ | ⋮ |
| 38 | Sanjo-dori | $(x_{31}, y_{31})$ | (X31, Y31) | S01 |

FIG.16

| String | Coordinate information [x, y] | Location information flag |
|---|---|---|
| Takatsu post office | [3000, 1538] | |
| Kajigaya station | [3008, 1081] | |
| 2015 | [578, 695] | -1 |
| Kawasaki shimin plaza | [2521, 3597] | |
| Toranomon hospital branch | [1069, 1689] | |
| Cargo terminal | [882, 3585] | |

FIG.31

| String | Coordinate information [x, y] | Position information [Latitude, Longitude] |
|---|---|---|
| Takatsu post office | [3000, 1538] | [35.5918, 139.6053] |
| Kajigaya station | [3008, 1081] | [35.5937, 139.6054] |
| Kawasaki shimin plaza | [2521, 3597] | [35.5849, 139.6096] |
| Toranomon hospital branch | [1069, 1689] | [35.5891, 139.5993] |
| Cargo terminal | [882, 3585] | [26.2151, 127.6515] |

FIG.32

| Rotation | C1 | C2 | C3 |
|---|---|---|---|
| C2 | -2 | | |
| C3 | -40 | -32 | |
| C4 | -24 | -1 | -26 |

FIG.38

| Rotation | C1 | C2 | C3 |
|---|---|---|---|
| C2 | cos(-2), sin(-2) | | |
| C3 | cos(-40), sin(-40) | cos(-32), sin(-32) | |
| C4 | cos(-24), sin(-24) | cos(-1), sin(-1) | cos(-26), sin(-26) |

FIG.39

| ID | Navigation information | | | | Region specification information | Thumbnail image |
|---|---|---|---|---|---|---|
| | Map representation data | Correspondence information | | | | |
| | | Coordinate information | Position information | | | |
| 1 | | $(x_{11}, y_{11})$ | $(X_{11}, Y_{11})$ | | $P1(X_{p1}, Y_{p1})$ $P2(X_{p2}, Y_{p2})$ | |
| | | $(x_{12}, y_{12})$ | $(X_{12}, Y_{12})$ | | | |
| | | $(x_{13}, y_{13})$ | $(X_{13}, Y_{13})$ | | | |
| | | ... | ... | | | |
| 2 | | $(x_{21}, y_{21})$ | $(X_{21}, Y_{21})$ | | $P1(X_{p3}, Y_{p3})$ $P2(X_{p4}, Y_{p4})$ | |
| | | $(x_{22}, y_{22})$ | $(X_{22}, Y_{22})$ | | | |
| | | ... | ... | | | |
| ... | ... | ... | ... | | ... | ... |

FIG.54

MAP REPRESENTATION DATA PROCESSING DEVICE, INFORMATION PROCESSING METHOD, AND PROGRAM

CROSS-REFERENCE OF RELATED APPLICATIONS

This application is the U.S. National Phase under 35 U.S.C. § 371 of International Patent Application No. PCT/JP2020/024436, filed on Jun. 22, 2020, which in turn claims the benefit of Japanese Application No. 2019-117259, filed on Jun. 25, 2019, the entire disclosures of which Applications are incorporated by reference herein.

TECHNICAL FIELD

The present invention relates to, for example, a map representation data processing device that receives a map photograph, searches for one or more pieces of map representation data, using the map photograph, and transmits the one or more pieces of map representation data to a terminal device.

BACKGROUND ART

There is a conventional map information system with which users of one or more first terminal devices register a handwritten map created or prepared by themselves or a map such as an illustration map in a server device, and that can be used by users of one or more second terminal devices, wherein geographical information, which is information regarding objects such as landmarks, can be added to the map (see Patent Document 1).

CITATION LIST

Patent Document

Patent Document 1: JP 2011-158518A

SUMMARY OF INVENTION

Technical Problem

However, with the conventional technique, the conventional map representation data processing device cannot realize navigation that employs the map representation data acquired using a captured map photograph. That is to say, with the conventional technique, for example, it is not possible to capture sketch maps or the like, which are present everywhere in cities, acquire map presentation data that is organized and is available for navigation, using the acquired map photographs, and use the map presentation data.

Note that navigation is, for example, to indicate the current position on map representation data.

Solution to Problem

A map representation data processing device according to a first aspect of the present invention is a map representation data processing device including a photograph reception unit that receives a captured map photograph from a terminal device; a determination unit that searches a navigation information group that contains two or more pieces of navigation information that contain map representation data and two or more pieces of correspondence information that are each a set of coordinate information and position information on the map representation data that is one of an illustration map, a handwritten map, and a sketch map, and determines a piece of navigation information that has a relationship with the map photograph, the relationship satisfying a first condition; and a navigation information transmission unit that transmits the piece of navigation information determined by the determination unit, to the terminal device.

With such a configuration, it is possible to realize navigation that employs map representation data acquired using a captured map photograph.

A map representation data processing device according to a second aspect of the present invention is the map representation data processing device according to the first aspect of the invention, wherein the determination unit includes: a determination part that determines a piece of map representation data that is similar to the map photograph enough to satisfy the first condition; and an acquisition part that acquires a piece of navigation information that includes the piece of map representation data determined by the determination part, from the navigation information group, and the navigation information transmission unit transmits the piece of navigation information acquired by the acquisition part, to the terminal device.

With such a configuration, it is possible to realize navigation that employs map representation data that is similar to a captured map photograph as an image.

A map representation data processing device according to a third aspect of the present invention is the map representation data processing device according to the first or the second aspect of the invention, further including a string acquisition unit that acquires one or more strings from the map photograph, wherein the determination unit determines the piece of navigation information that satisfies the first condition, using the one or more strings.

With such a configuration, it is possible to realize navigation that employs more appropriate map representation data.

A map representation data processing device according to a fourth aspect of the present invention is the map representation data processing device according to the third aspect of the invention, wherein name information regarding locations is stored in association with the correspondence information, and the determination unit determines whether or not each of the one or more strings matches the name information, and determines the piece of navigation information that satisfies the first condition, using the result of the determination regarding matching between the strings and the name information.

With such a configuration, it is possible to realize navigation that employs more appropriate map representation data.

A map representation data processing device according to a fifth aspect of the present invention is the map representation data processing device according to the third aspect of the invention, wherein region specification information that specifies a region that is covered by the piece of map representation data is stored in association with the piece of navigation information, the string acquisition unit acquires three or more strings from the map photograph, the map representation data processing device further includes: a position information acquisition unit that acquires pieces of position information corresponding to pieces of location information that are three or more strings acquired by the string acquisition unit, using a location dictionary that contains one or more pieces of location position information that associate the pieces of location information that specify locations and pieces of position information that specify positions of the locations with each other; and a region specification information acquisition unit that acquires region specification information that specifies a region that is covered by the map photograph, using the three or more pieces of position information acquired by the position information acquisition unit, and the determination unit determines a piece of navigation information corresponding to the region specification information acquired by the region specification information acquisition unit and the region specification information that satisfies the first condition.

With such a configuration, it is possible to realize navigation that employs more appropriate map representation data.

A map representation data processing device according to a sixth aspect of the present invention is the map representation data processing device according to any one of the first to fifth aspects of the invention, wherein the determination unit cuts a map region from the map photograph to acquire a map cut image, and searches a navigation information group that contains two or more pieces of navigation information that contain map representation data and two or more pieces of correspondence information that are each a set of coordinate information and position information on the map representation data, using the map cut image, and determines a piece of navigation information that is to be transmitted.

With such a configuration, it is possible to realize navigation that employs more appropriate map representation data.

A map representation data processing device according to a seventh aspect of the present invention is the map representation data processing device according to the sixth aspect of the invention, wherein the determination unit corrects the map cut image to be a rectangle, and searches a navigation information group that contains two or more pieces of navigation information that contain map representation data and two or more pieces of correspondence information that are each a set of coordinate information and position information on the map representation data, using the corrected map image, and determines a piece of navigation information that is to be transmitted.

With such a configuration, it is possible to realize navigation that employs more appropriate map representation data.

A map representation data processing device according to an eighth aspect of the present invention is the map representation data processing device according to any one of the first to seventh aspects of the invention, wherein the photograph reception unit additionally receives terminal position information that specifies the current position of the terminal device, and if the determination unit fails to determine a piece of navigation information that satisfies the first condition, the determination unit determines a piece of navigation information that contains a piece of position information that indicates a position that is close to the terminal position information enough to satisfy a second condition.

With such a configuration, if appropriate map representation data cannot be determined using a map photograph, it is possible to determine appropriate map representation data using position information.

A map representation data processing device according to a ninth aspect of the present invention is the map representation data processing device according to any one of the first to eighth aspects of the invention, further including: a selection image transmission unit that, when the determination unit determines two or more pieces of navigation information, transmits two or more selection images that are pieces of map representation data that are contained in the two or more pieces of navigation information, or thumbnail images of the pieces of map representation data, to the terminal device; and a selection reception unit that receives a selection instruction that contains an image identifier that identifies a selection image, from the terminal device, wherein the navigation information transmission unit transmits two or more pieces of correspondence information that are paired with the image identifier contained in the selection instruction, to the terminal device.

With such a configuration, the user can select their favorite map representation data.

A map representation data processing device according to a tenth aspect of the present invention is the map representation data processing device according to any one of the first to seventh aspects of the invention, wherein the photograph reception unit additionally receives terminal position information that specifies the current position of the terminal device, the map representation data processing device further includes: a string acquisition unit that acquires three or more strings from the map photograph; a coordinate information acquisition unit that acquires pieces of coordinate information regarding the three or more strings; a position information acquisition unit that acquires pieces of position information corresponding to the three or more strings, using a location dictionary that contains one or more pieces of location position information that associate pieces of location information that specify locations and pieces of position information that specify positions of the locations with each other; and a current coordinate acquisition unit that acquires current coordinate information that specifies coordinates corresponding to the terminal position information, using three or more pieces of correspondence information that are sets of the pieces of coordinate information and the pieces of position information, and the terminal position information, and the navigation information transmission unit transmits the current coordinate information to the terminal device instead of the piece of navigation information.

With such a configuration, it is possible to indicate the current position in the map photograph.

A terminal device according to an eleventh aspect of the present invention is a terminal device including: a terminal image capturing unit that takes a map photograph; a terminal transmission unit that transmits the map photograph to a map representation data processing device; a terminal reception unit that receives navigation information from the map representation data processing device; a terminal position acquisition unit that acquires current position information; a terminal coordinate acquisition unit that acquires current coordinate information corresponding to the current position information, using two or more pieces of correspondence information that are contained in the navigation information; and a terminal output unit that outputs current position-added map representation data formed by explicitly indicating a current position at a coordinate position that is indicated by the current coordinate information, on map representation data that is contained in the navigation information.

With such a configuration, it is possible to realize navigation that employs map representation data acquired using a captured map photograph.

A terminal device according to a twelfth aspect of the present invention is the terminal device according to the eleventh aspect of the invention, further including a terminal cutting unit that cuts a map region from the map photograph to acquire a map cut image, wherein the terminal transmission unit transmits the map cut image to the map representation data processing device, instead of the map photograph.

With such a configuration, it is possible to realize navigation that employs map representation data acquired using a captured map photograph.

A terminal device according to a thirteenth aspect of the present invention is the terminal device according to the twelfth aspect of the invention, further including a terminal correction unit that corrects the map cut image to be a rectangle to acquire a corrected map image, wherein the terminal transmission unit transmits the corrected map image to the map representation data processing device, instead of the map cut image.

With such a configuration, it is possible to realize navigation that employs map representation data acquired using a captured map photograph.

Advantageous Effects of Invention

With the map representation data processing device according to the present invention, it is possible to realize navigation that employs map representation data acquired using a captured map photograph.

BRIEF DESCRIPTION OF DRAWINGS

FIG. 6 is a diagram showing an example of a learning source information according to the same.

FIG. 15 is a diagram showing an example of a location dictionary according to the same.

FIG. 16 is a diagram showing an example of a correspondence information management table according to the same.

FIG. 31 is a diagram showing an example of information that is acquired by the map representation data processing device E according to the same in the middle of processing.

FIG. 32 is a diagram showing an example of information that is acquired by the map representation data processing device E according to the same in the middle of processing.

FIG. 38 is a diagram showing an example of information that is acquired by the map representation data processing device E according to the same in the middle of processing.

FIG. 39 is a diagram showing an example of information that is acquired by the map representation data processing device E according to the same in the middle of processing.

FIG. 54 is a diagram showing a navigation information management table according to the same.

DESCRIPTION OF EMBODIMENTS

Figure 1:
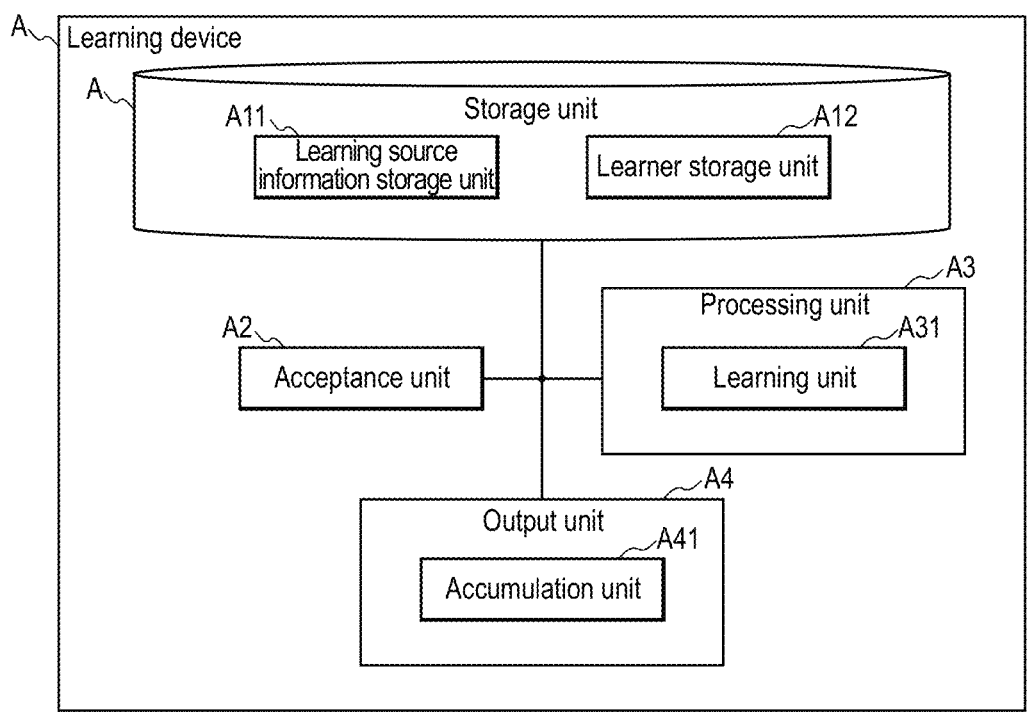
FIG. 1 is a block diagram for a learning device A according to Embodiment 1.

Hereinafter, embodiments of a map representation data processing device and so on will be described with reference to the drawings. Note that the constituent elements with the same reference numerals perform the same operations in the embodiments, and therefore redundant descriptions thereof may be omitted.

Embodiment 1

The present embodiment describes a learning device that forms a learner by learning two or more pieces of learning source information that each contains: a character string (hereinafter simply referred to as a "string") that contains two or more characters; and labels for classifying the strings, using a machine learning technique. Note that a label is related to the number of appearances in a location dictionary, and is any label of two or two or more types of labels. It is preferable that a label indicates an occurrence frequency that is one of three types, namely 1, 0, and 2 or more. Note that using a machine learning technique means the same as using a machine learning algorithm.

The present embodiment also describes a learning device that forms a learning device by providing a string to a learning module, one character at a time (providing a stream of a string thereto), and causing the learning module to learn the string.

Furthermore, the present embodiment describes a classification device that provides a string to a classification module, using a learner formed by a learning device, and acquires a label corresponding to the string. Note that the classification module may also be referred to as a prediction module.

Figure 2:
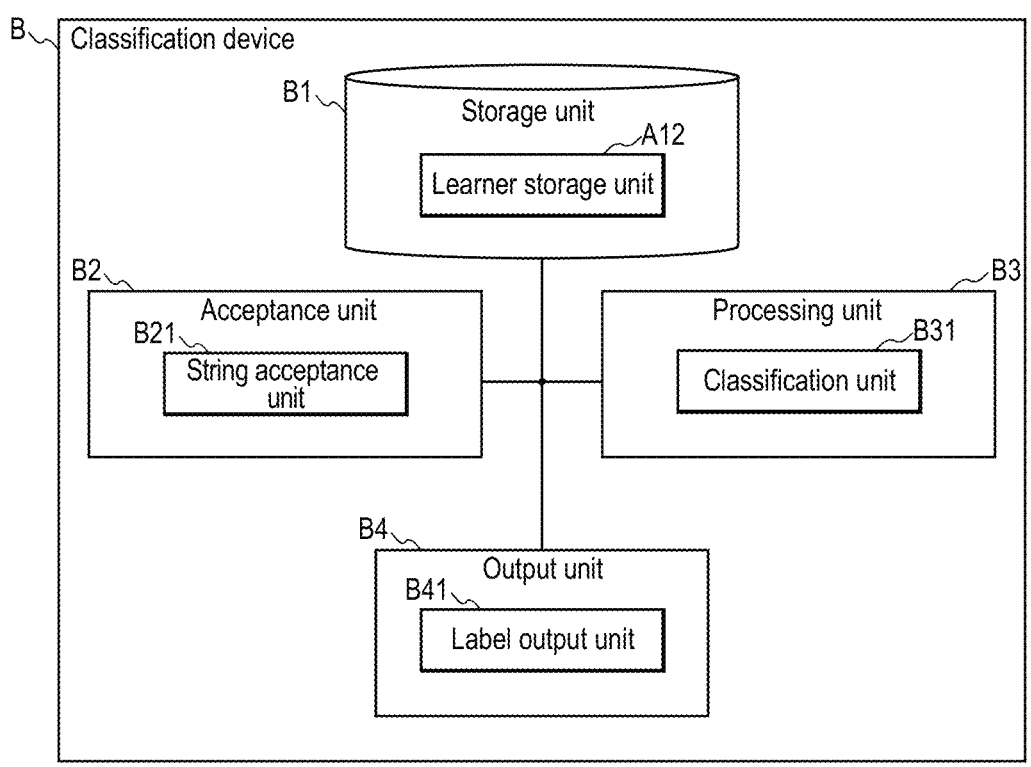
FIG. 2 is a block diagram for a classification device B.

FIG. 1 is a block diagram for a learning device A according to the present embodiment. FIG. 2 is a block diagram for a classification device B according to the present embodiment.

The learning device A includes a storage unit A1, an acceptance unit A2, a processing unit A3, and an output unit A4. The storage unit A1 includes a learning source information storage unit A11 and a learner storage unit A12. The processing unit A3 includes a learning unit A31. The output unit A4 includes an accumulation unit A41.

The classification device B includes a storage unit B1, an acceptance unit B2, a processing unit B3, and an output unit B4. The storage unit B1 includes the learner storage unit A12. The acceptance unit B2 includes a string acceptance unit B21. The processing unit B3 includes a classification unit B31. The output unit B4 includes a label output unit B41.

The storage unit A1 included in the learning device A stores various kinds of information. Examples of various kinds of information include a learning source information described later, a learner described later, and a learning module. The learning module is a program for forming the learning unit A31, and a program for acquiring a learner. Examples of learning modules include functions in machine learning frameworks such as fastText, tinySVM, and TensorFlow, and various kinds of random forest functions and so on.

The learning source information storage unit A11 stores two or more pieces of learning source information. The learning source information is information that is to be learned. The learning source information includes strings and labels. Each string includes two or more characters. A label is information regarding the number of appearances in the location dictionary described later. Each label may have information regarding one of two or more kinds of labels.

It is preferable that each label is one of: a first label indicating that the number of appearances in the location dictionary is 1; a second label indicating that the number of appearances in the location dictionary is 0; or a third label indicating that the number of appearances in the location dictionary is 2 or more. That is to say, it is preferable that each label has one of three kinds of information.

The location dictionary is a dictionary regarding location names. The location dictionary contains, for example, two or more pieces of correspondence information that each contain a location name and position information that specifies the position of the location specified by the location name. The location name is, for example, the name of a location, the name of a landscape, the name of a specific location, the name of a prefecture, the name of a municipality, the name of a river, a mountain, a park, a scenic spot, or the like. The location dictionary contains, for example, two or more pieces of correspondence information that each contain a location name and description information regarding the location specified by the location name.

The learner storage unit A12 stores a learner. A learner may also be referred to as a classifier. A learner may also be referred to as a classification model, a prediction model, or the like. A learner is information that is acquired by a learning module that employs a machine learning technique. The machine learning technique may be deep learning, SVM, decision tree, random forest, or the like, and there is no limitation. It is preferable that the machine learning technique is, for example, a technique using a recurrent neural network (RNN). That is to say, it is preferable that the learner is an RNN.

The acceptance unit A2 accepts various kinds of information and instructions. Here, acceptance means acceptance of a user input, reception from an external device, or the like. It suffices if various information and instructions can be acquired through acceptance. Any input means, such as a touch panel, a keyboard, a mouse, a menu screen, or the like, may be employed to input various kinds of information and instructions.

The processing unit A3 performs various kinds of processing. Examples of various kinds of processing include processing that is performed by the learning unit A31.

The learning unit A31 performs learning processing through a machine learning technique, using two or more pieces of learning source information stored in the learning source information storage unit A11, to acquire a learner.

For example, the learning unit A31 sequentially provides a learning module for machine learning with characters that constitute strings contained in the two or more pieces of learning source information stored in the learning source information storage unit A11, and also provides labels that are paired with the strings, and executes the learning module to acquire a learner. Note that the processing through which characters that constitute a string are sequentially provided to the learning module for machine learning may also be referred to as processing through which a stream of a string is provided to the learning module for machine learning. That is to say, it may be said that the learning unit A31 learns streams of strings contained in two or more pieces of learning source information. The learning module for machine learning is stored in the storage unit A1, for example.

Examples of available machine learning techniques for acquiring a learner include deep learning, SVR, random forest, decision tree, and so on. Examples of the learning module for machine learning include functions in machine learning frameworks such as fastText, tinySVM, and TensorFlow, and various kinds of random forest functions and so on.

The learner to be acquired by the learning unit A31 is information that is used to output a label when a string is input to a classification module for machine learning. The learner to be acquired by the learning unit A31 is information that is used to output a label when characters that constitute a string are sequentially input to a classification module for machine learning, one character at a time.

The learning unit A31 may be regarded as including a learning module or not including a learning module.

The output unit A4 outputs various kinds of information. Examples of various kinds of information include a learner. Here, "output" typically means accumulation on a recording medium, but may be regarded as a concept that includes displaying on a display device, projection with a projector, printing with a printer, sound output, transmission to an external device, delivery of processing results to another processing apparatus or another program, and so on.

The accumulation unit A41 accumulates the learner acquired by the learning unit A31. The accumulation unit A41 typically accumulates the learner acquired by the learning unit A31, in the learner storage unit A12. However, the accumulation unit A41 may transmit the learner acquired by the learning unit A31 to an external device (not shown).

The storage unit B1 included in the classification device B stores various kinds of information. Examples of various kinds of information include a learner, a classification module for machine learning, and map information.

The machine learning technique may be deep learning, SVM, decision tree, random forest, or the like, and there is no limitation. It is preferable that the machine learning technique is, for example, a technique using a recurrent neural network. The classification module is a program for classifying the accepted strings, and examples thereof include functions in machine learning frameworks such as fastText, tinySVM, and TensorFlow, and various kinds of random forest functions and so on.

Map information is information regarding a map. Map information is map representation data, for example. Map representation data is information that represents a limited geographical region. It is preferable that map representation data is associated with a map identifier that identifies the map representation data. A map identifier is, for example, an ID, the file name of the file that contains map representation data, the name of the map representation data, or the like. Map representation data is, for example, an old map, an illustration map, a sketch map, a handwritten map, or the like, but there is no limitation on the type thereof. Map representation data typically is image data, but may be vector data or the like, and there is no limitation on the data structure thereof. Map representation data is associated with one or more attribute values. One or more attribute values are attribute values of map representation data. Attribute values are pieces of information that indicate characteristics and features of map representation data. The one or more attribute values associated with the map representation data each contain region specification information. Region specification information is information that specifies the region expressed by the map representation data. The region typically is rectangular, but may be a region that has a non-rectangular shape, such as a triangle, an octagon, a circle, or the like. The region expressed by map representation data may also be referred to as a region represented by map representation data. Region specification information is, for example, sets of (latitude, longitude). Region specification information is, for example, sets of information that indicates coordinates relative to a reference point. However, there is no limitation on the data structure of region specification information, and any information that specifies the region may be used.

One or more attribute values associated with map representation data are, for example, static attribute values, which are attribute values that are static. Alternatively, one or more attribute values associated with map representation data are, for example, dynamic attribute values, which are attribute values that change dynamically. The one or more attribute values may include one or more static attribute values and one or more dynamic attribute values. A static attribute value is, for example, the scale ratio of representation data that serves as a map (simply referred to as a "scale ratio" as appropriate), the actual area of the region on the map indicated by map representation data (simply referred to as an "area" as appropriate), or content information indicating the content of the map. Content information includes the degree of completion of the map representation data, the theme of the map representation data, metadata corresponding to the map representation data, keywords, and so on. Metadata and keywords are, for example, the type of map representation data, the names of landscapes and locations that are present in the region indicated by map representation data, and so on. Examples of types of map representation data include "theme park" indicating that the map is a theme park map, "tourist map" indicating that the map is for sightseeing, information indicating that the map is of a specific region (for example, a school), and so on. The one or more static attribute values may be, for example, a flag indicating that the position indicated by the position specification information is explicitly shown, and a flag indicating that the position indicated by the position specification information cannot be explicitly shown. Dynamic attribute values are, for example, the distance between the position indicated by position specification information and a location that is representative of the map representation data, and user action information regarding a user action performed on the map representation data.

Note that the location that is representative of map representation data is, for example, the center of gravity of the map representation data, a point at the edges of the map representation data, or a point that constitutes the boundary of the region of the map representation data.

It is preferable that map representation data is included in a file. However, map representation data can be data in a database, and there is no limitation on the data format thereof or management method therefor. When map representation data is included in a file, two or more pieces of map representation data may be included in the file. Also, one piece of map representation data may be realized as two or more files. That is to say, one piece of map representation data may be divided into two or more files.

The learner storage unit A12 included in the classification device B stores the learner accumulated by the learning device A.

The acceptance unit B2 accepts various kinds of information and instructions. Here, "acceptance" means, for example, acceptance of a user input, reception from an external device, or the like. It suffices if various information and instructions can be acquired through acceptance. Any input means, such as a touch panel, a keyboard, a mouse, a menu screen, or the like, may be employed to input various kinds of information and instructions.

The string acceptance unit B21 accepts a string. Here, "acceptance" is, for example, a concept that includes acceptance of information input from an input device such as a keyboard, a mouse, or a touch panel, reception of information transmitted via a wired or wireless communication line, and acceptance of information read out from a recording medium such as an optical disk, a magnetic disk, or a semiconductor memory.

The string acceptance unit B21 performs character recognition processing on map information to acquire one or more strings, for example.

The processing unit B3 performs various kinds of processing. Examples of various kinds of processing include processing that is performed by the classification unit B31.

Using the string accepted by the acceptance unit B2 and the learner in the learner storage unit A12, the classification unit B31 acquires labels corresponding to the strings through a machine learning technique.

For example, the classification unit B31 sequentially provides the two or more characters that constitute the string accepted by the acceptance unit B2 to the classification module for machine learning, one character at a time, provides the learner in the learner storage unit A12 to the classification module, and executes the classification module to acquire labels.

Note that the classification unit B31 may be regarded as including a classification module or not including a classification module.

The output unit B4 outputs various kinds of information. Examples of various kinds of information include labels acquired by the classification unit B31.

The label output unit B41 outputs the labels acquired by the classification unit B31. Here, "output" may be regarded as a concept that includes accumulation on a recording medium, displaying on a display device, projection with a projector, printing with a printer, sound output, transmission to an external device, delivery of processing results to another processing apparatus or another program, and so on.

It is preferable that the storage unit A1, the learning source information storage unit A11, the learner storage unit A12, the storage unit B1, and the learner storage unit A12 are realized using a non-volatile recording medium, but they may be realized using a volatile recording medium.

There is no limitation on the process in which information is stored in the storage unit A1 and so on. For example, information may be stored in the storage unit A1 or the like via a recording medium, or information transmitted via a communication line or the like may be stored in the storage unit A1 or the like, or information input via an input device may be stored in the storage unit A1 or the like.

The acceptance unit A2, the acceptance unit B2, and the string acceptance unit B21 can be realized using a device driver for the input means such as a touch panel or a keyboard, or control software or the like for controlling the menu screen.

The processing unit A3, the learning unit A31, the accumulation unit A41, the processing unit B3, and the classification unit B31 typically are realized using an MPU, a memory, and so on. The processing procedures performed by the processing unit A3 and so on typically are realized using software, and the software is recorded on a recording medium such as a ROM. However, such processing procedures may be realized using hardware (a dedicated circuit).

The output unit A4, the output unit B4, and the label output unit B41 may be regarded as including or not including an output device such as a display or a speaker. The output unit A4 and so on can be realized using the driver software of the output device, the driver software of the output device and the output device, or the like.

Figure 3:
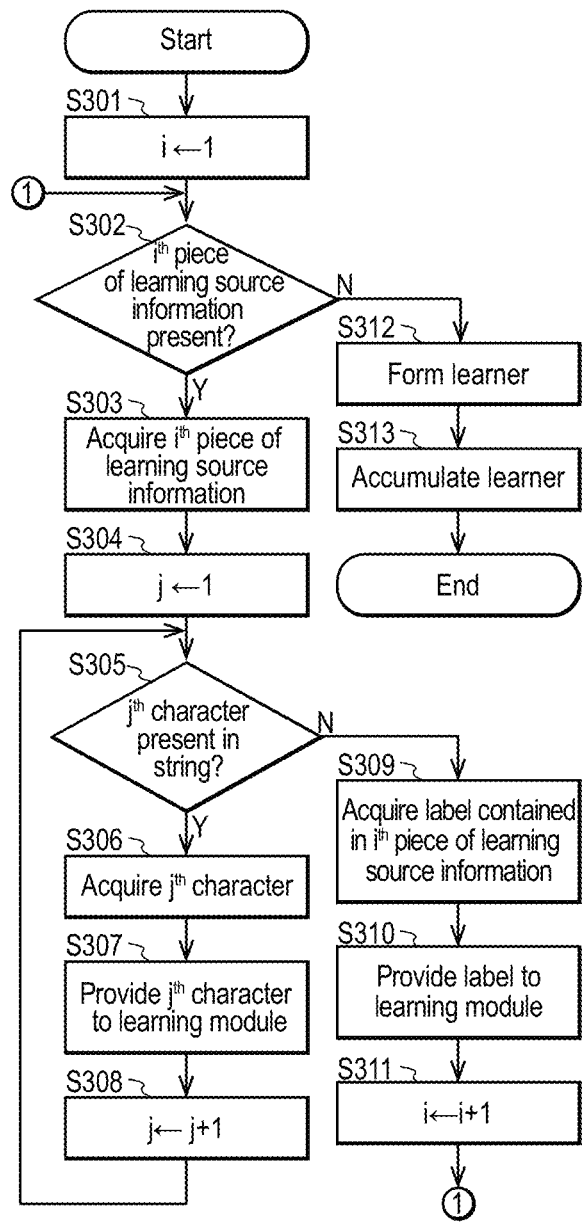
FIG. 3 is a flowchart illustrating examples of operations of the learning device A.

Next, examples of operations of the learning device A will be described with reference to the flowchart shown in FIG. 3.

(Step S301) The learning unit A31 substitutes 1 for a counter i.

(Step S302) The learning unit A31 judges whether or not the $i^{th}$ piece of learning source information is present in the learning source information storage unit A11. If the $i^{th}$ piece of learning source information is present, processing proceeds to step S303, and if the $i^{th}$ piece of learning source information is not present, processing proceeds to step S312.

(Step S303) The learning unit A31 acquires the $i^{th}$ piece of learning source information from the learning source information storage unit A11.

(Step S304) The learning unit A31 substitutes 1 for a counter j.

(Step S305) The learning unit A31 judges whether or not the $j^{th}$ character is present in the string contained in the $i^{th}$ piece of learning source information acquired in step S303. If the $j^{th}$ character is present, processing proceeds to step S306, and if the $j^{th}$ character is not present, processing proceeds to step S309.

(Step S306) The learning unit A31 acquires the $j^{th}$ character in the string contained in the $i^{th}$ piece of learning source information acquired in step S303.

(Step S307) The learning unit A31 provides the $j^{th}$ character acquired in step S306 to the learning module in the storage unit A1. Note that the processing performed to provide a character to the learning module is, for example, providing the character as an argument for the learning module that serves as a function or a method, providing the character to the learning module that serves as an execution module, or the like, so that the learning module can perform learning processing using the character, and a broad interpretation is applied.

(Step S308) The learning unit A31 increments the counter j by 1. Processing returns to step S305.

(Step S309) The learning unit A31 acquires the label contained in the $i^{th}$ piece of learning source information acquired in step S303.

(Step S310) The learning unit A31 provides the label acquired in step S309 to the learning module in the storage unit A1. Note that the processing performed to provide a label to the learning module is, for example, providing the label as an argument for the learning module that serves as a function or a method, providing the label to the learning module that serves as an execution module, or the like, so that the learning module can perform learning processing using the label, and a broad interpretation is applied.

(Step S311) The learning unit A31 increments the counter i by 1. Processing returns to step S302.

(Step S312) The learning unit A31 executes the learning module to which character streams and labels are provided, to acquire a learner.

(Step S313) The accumulation unit A41 accumulates the learner acquired in step S312, in the learner storage unit A12. Processing is terminated.

Next, examples of operations of the classification device B will be described with reference to the flowchart shown in FIG. 4.

(Step S401) The string acceptance unit B21 judges whether or not a string has been accepted. If a string has been accepted, processing proceeds to step S402, and if a string has not been accepted, processing returns to step S401.

(Step S402) The classification unit B31 substitutes 1 for the counter i.

(Step S403) The classification unit B31 judges whether or not the $i^{th}$ character is present in the string accepted in step S401. If the $i^{th}$ character is present, processing proceeds to step S404, and if the $i^{th}$ character is not present, processing proceeds to step S407.

(Step S404) The classification unit B31 acquires the $i^{th}$ character in the string accepted in step S401.

(Step S405) The classification unit B31 provides the $i^{th}$ character acquired in step S404 to the classification module in the storage unit B1. Note that the processing performed to provide a character to the classification module is, for example, providing the character as an argument for the classification module that serves as a function or a method, providing the character to the classification module that serves as an execution module, or the like, so that the classification module can perform classification processing using the character, and a broad interpretation is applied.

(Step S406) The classification unit B31 increments the counter i by 1. Processing returns to step S403.

(Step S407) The classification unit B31 provides the learner in the learner storage unit A12 to the classification module in the storage unit B1. Note that the processing performed to provide a learner to the classification module is, for example, providing the learner as an argument for the classification module that serves as a function or a method, providing the learner to the classification module that serves as an execution module, providing link information regarding a link to the learner as an argument for the classification module that serves as a function or a method, providing link information regarding a link to the learner to the classification module that serves as an execution module, or the like, so that the classification module can perform classification processing using the learner, and a broad interpretation is applied.

(Step S408) The classification unit B31 executes the classification module to acquire a label.

(Step S409) The label output unit B41 outputs the label acquired in step S408. Processing returns to step S401.

Figure 4:
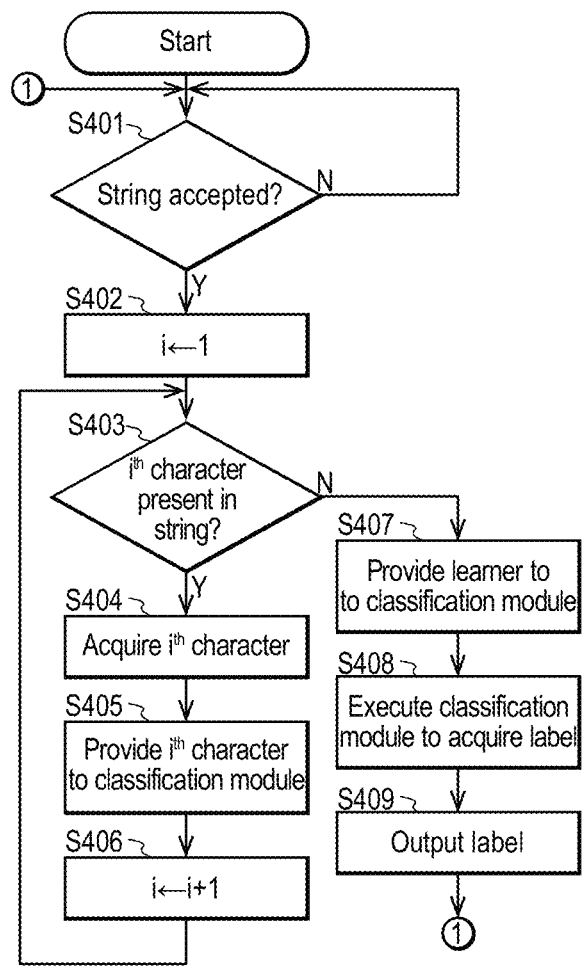
FIG. 4 is a flowchart illustrating examples of operations of the classification device B according to the same.

In the flowchart shown in FIG. 4, processing is terminated when power is turned off or an interruption is made to terminate the processing.

Figure 5:
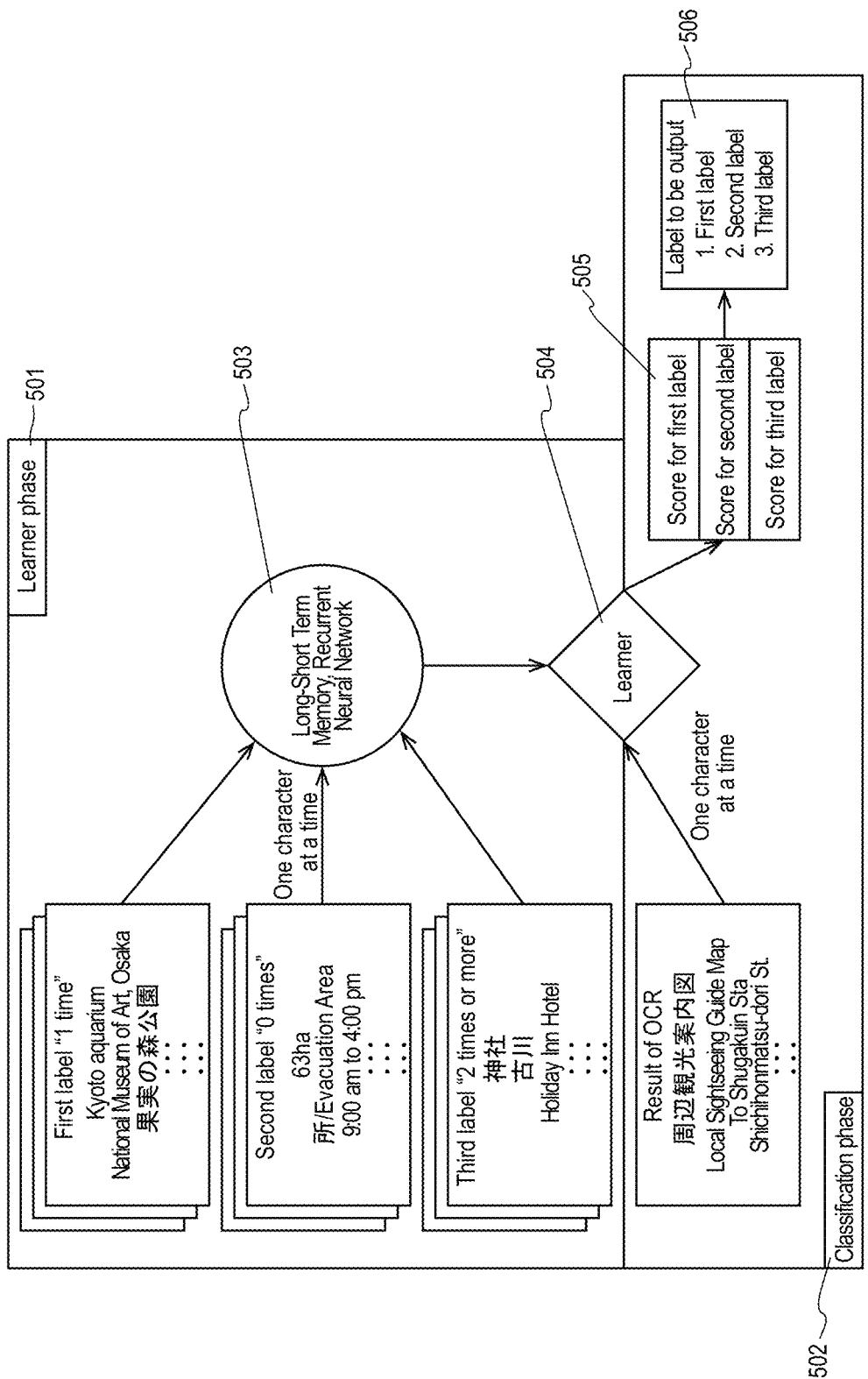
FIG. 5 is an illustration diagram for specific examples of operations of the learning device A and the classification device B according to the same.

The following describes specific examples of operations of the learning device A and the classification device B according to the present embodiment with reference to FIG. 5. The processing performed by learning device A is a learning phase 501. The processing performed by the classification device B is a classification phase 502.

It is assumed that the learning source information storage unit A11 in the learning device A stores many pieces of learning source information that have the structure shown in FIG. 6. In FIG. 6, learning source information includes strings and labels. Each label is one of: the first label (the value is "1") indicating that the number of appearances in the location dictionary is 1; the second label (the value is "0") indicating that the number of appearances in the location dictionary is 0; or the third label (the value is "2") indicating that the number of appearances in the location dictionary is 2 or more.

In the learning phase 501, the learning device A provides many pieces of learning source information such as the learning source information shown in FIG. 6 to the learning module in the storage unit A1 to form a learner. Here, in the learning phase 501, the learning unit A31 sequentially provides the characters that constitute the string contained in the learning source information to the learning module, one character at a time. Also, the learning unit A31 provides the labels contained the learning source information to the learning module. Thereafter, the learning unit A31 executes the learning module to acquire a learner. The accumulation unit A41 accumulates the learner 504 in the learner storage unit A12. Note that the learning module here is 503, for example, and is, for example, a module that employs a long short-term memory (LSTM) of recurrent neural networks.

Next, in the classification phase 502, the string acceptance unit B21 in the classification device B performs character recognition processing on the map information in the storage unit B1 to acquire one or more strings, for example. Note that the processing through which character recognition processing is performed on map information that is an image, to acquire one or more strings, is a well-known technique, and therefore the detailed description thereof will be omitted.

For each of one or more strings, the classification unit B31 sequentially provides the characters that constitute the string to the classification module, and provides the learner 504 to the classification module, executes the classification module, and acquires scores respectively corresponding to the first label, the second label, and the third label, for each string (505). Next, the classification unit B31 acquires the label with the highest score. Next, the label output unit B41 outputs the label with the highest score in association with the string (506).

As described above, according to the present embodiment, it is possible to acquire a learner for appropriately classifying pieces of information regarding location names.

Also, according to the present embodiment, it is possible to appropriately classify pieces of information regarding location names.

Note that the processing in the present embodiment may be realized using software. This software may be distributed through software downloading or the like. Also, this software may be recorded on a recording medium such as a CD-ROM and distributed. Note that the same applies to the other embodiments in the present description. The software that realizes the learning device A in the present embodiment is the program described below. That is to say, the program is a program that enables a computer that can access a learning source information storage unit that stores two or more pieces of learning source information that contain strings that each contain two or more characters and any one label of two or more types of labels that are labels regarding the number of appearances in a location dictionary, to function as: a learning unit that sequentially provides the characters that constitute the strings contained in the two or more pieces of learning source information stored in the learning source information storage unit, to a learning module for machine learning, one character at a time, provides labels that are paired with the strings, to the learning module, and executes the learning module to acquire a learner; and an accumulation unit that accumulates the learner.

The software that realizes the classification device B in the present embodiment is the program described below. That is to say, the program is a program that enables a computer that can access a learner storage unit that stores a learner accumulated by the learning device A, to function as: a string acceptance unit that accepts a string; a classification unit that sequentially provides two or more characters that constitute the string to a classification module for machine learning, one character at a time, provides the learner to the classification module, and executes the classification module to acquire a label; and a label output unit that outputs the label.

Embodiment 2

The present embodiment describes a map representation data processing device that acquires one or more strings from map representation data, acquires pieces of position information (latitude, longitude) that are respectively paired with the one or more strings, acquires pieces of coordinate information regarding the one or more strings on the map representation data, and accumulates the pieces of coordinate information regarding the one or more strings and the pieces of position information in association with each other.

The present embodiment also describes a map representation data processing device that determines an appropriate string from one or more strings acquired from map representation data, and accumulates coordinate information and position information that only correspond to the appropriate string, in association with each other. It is preferable that the learner acquired by the learning device A described in Embodiment 1 is used for the processing performed to determine an appropriate string. Furthermore, it is preferable that the classification processing performed in the classification device B described in Embodiment 1 is used for the processing performed to determine an appropriate string.

Also, the present embodiment describes a map information generation device that acquires one or more graphic feature spots such as intersections from map representation data, acquires pieces of position information that are respectively paired with the one or more graphic feature spots, acquires pieces of coordinate information respectively corresponding to the one or more graphic feature spots, and accumulates the pieces of coordinate information and the pieces of position information regarding the one or more graphic feature spots in association with each other. It is preferable that the graphic feature spots are constituted by one or more kinds of graphic feature spots that are intersections or bridges.

Also, the present embodiment describes a map representation data processing device that acquires two or more strings from map representation data, acquires a set of pieces of position information that are close enough so that the pieces of position information respectively paired with the two or more strings satisfy a predetermined condition, and accumulates coordinate information and position information that only correspond to a string corresponding to the set of pieces of position information thus acquired, in association with each other.

The present embodiment also describes a map representation data processing device that determines a region in accurate map information that corresponds to a region in map representation data. In such a case, it is preferable to determine region in accurate map information considering an outer region of the map representation data where no string is present.

Furthermore, the present embodiment describes a map representation data processing device that acquires direction information regarding map representation data.

Figure 7:
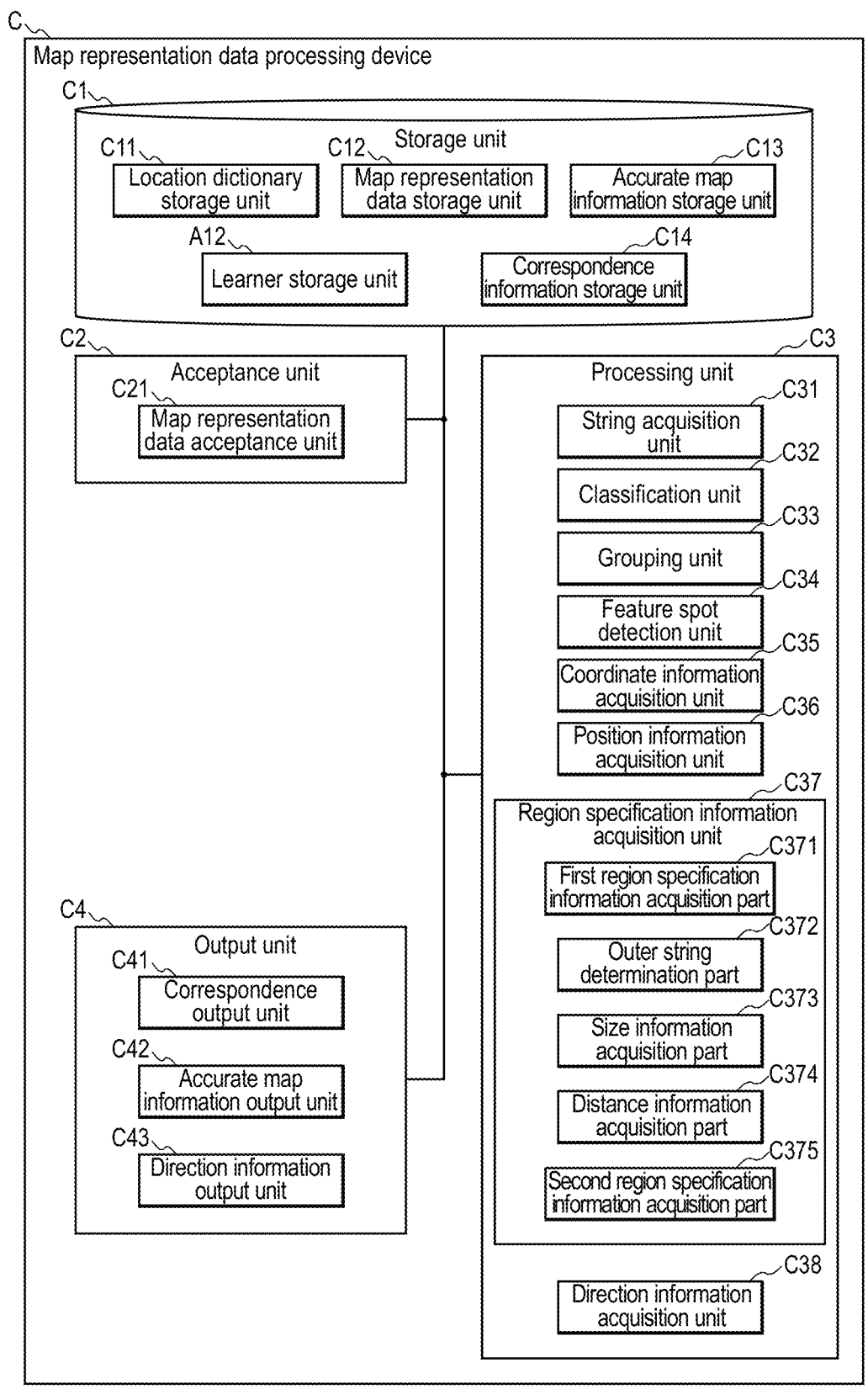
FIG. 7 is a block diagram for a map representation data processing device C according to Embodiment 2.

FIG. 7 is a block diagram for a map representation data processing device C according to the present embodiment. The map representation data processing device C includes a storage unit C1, an acceptance unit C2, a processing unit C3, and an output unit C4.

The storage unit C1 includes a location dictionary storage unit C11, a map representation data storage unit C12, an accurate map information storage unit C13, a learner storage unit A12, and a correspondence information storage unit C14. The acceptance unit C2 includes a map representation data acceptance unit C21. The processing unit C3 includes a string acquisition unit C31, a classification unit C32, a grouping unit C33, a feature spot detection unit C34, a coordinate information acquisition unit C35, a position information acquisition unit C36, a region specification information acquisition unit C37, and a direction information acquisition unit C38. The region specification information acquisition unit C37 includes, for example, a first region specification information acquisition part C371, an outer string determination part C372, a size information acquisition part C373, a distance information acquisition part C374, and a second region specification information acquisition part C375. The output unit C4 includes a correspondence output unit C41, an accurate map information output unit C42, and a direction information output unit C43.

The storage unit C1 stores various kinds of information. Examples of various kinds of information include a location dictionary described later, map representation data described later, accurate map information described later, a learner, correspondence information described later, and a classification module. Note that the storage unit C1 need not necessarily include a location dictionary storage unit C11. The location dictionary storage unit C11 may be located in an external device (not shown).

The location dictionary storage unit C11 stores a location dictionary. The location dictionary contains one or more pieces of location position information. Location position information is information that associates location information that specifies a location and position information that specifies the position of the location with each other. Location position information is, for example, information that contains location information and position information. Location position information is, for example, information that contains a pointer to location information and a pointer to position information. However, there is no limitation on the data structure of location position information.

Location information is, for example, a location name or an ID that specifies a location. The location name is, for example, the name of a location, the name of a landscape, the name of a specific location, the name of a prefecture, the name of a municipality, the name of a river, a mountain, a park, a scenic spot, the name of an intersection, or the like. Position information is (latitude, longitude), for example, but may have a different data format. Note that an ID that specifies a location typically is associated with a location name.

The map representation data storage unit C12 stores one or more pieces of map representation data. Map representation data is data that represents a map. Map representation data is information that represents a limited geographical region. Map representation data is not the accurate map information described later. Map representation data is, for example, data that lacks accuracy as a map. Map representation data is, for example, an old map, an illustration map, a sketch map, a handwritten map, or the like, but there is no limitation on the type thereof. It is preferable that map representation data is associated with a map identifier that identifies the map representation data. A map identifier is, for example, an ID, the file name of the file that contains map representation data, the name of the map representation data, or the like.

The map representation data typically is image data, but may be vector data or the like, and there is no limitation on the data structure thereof. Map representation data may include a string of location information. When map representation data is image data or vector data, map representation data typically is data that expresses location information. It is preferable that map representation data is included in a file. Map representation data may be a file. However, map representation data can be data in a database, and there is no limitation on the data format thereof or management method therefor. When map representation data is included in a file, two or more pieces of map representation data may be included in the file. Also, one piece of map representation data may be realized as two or more files. That is to say, one piece of map representation data may be divided into two or more files. Needless to say, map representation data may be a single file.

The accurate map information storage unit C13 stores accurate map information. Accurate map information is accurate electronic map information. There is no limitation on the type of the map represented by accurate map information or the data format of map information. Examples of the type of the map include a contour map, a topographical map, a geological map, a land use map, a residential map, a route map, a road map, a guide map, an aerial photograph, a satellite photograph, and so on. Examples of data formats of accurate map information include raster data, vector data, KIWI format, and so on.

The learner storage unit A12 stores one or more learners. It is preferable that the learners in the learner storage unit A12 are learners acquired by the learning device A. In such a case, as described above, each learner is information acquired by sequentially providing two or more pieces of learning source information that contain a string that contains two or more characters and a label of two or more kinds of labels that are labels regarding the number of appearances in a location dictionary, to a learning module for machine learning, and executing the learning module. Note that each learner need not necessarily be a learner acquired by the learning device A, and may be a learner acquired by learning one or more positive examples that are pieces of location name information and one or more negative examples that are not pieces of location name information, using a machine learning technique.

The correspondence information storage unit C14 stores one or more pieces of correspondence information. Correspondence information is information that indicates correspondence between coordinate information and position information. Correspondence information may be an information set of coordinate information and position information. Correspondence information may also be an information set of a pointer to coordinate information and a pointer to position information.

Correspondence information may be associated with location name information, or contain location information. There is no limitation on the data structure of correspondence information. It is preferable that correspondence information is associated with a map representation data identifier that identifies map representation data.

The acceptance unit C2 accepts various kinds of information and instructions. Examples of various kinds of information include map representation data, an operation start instruction, and an output instruction. An operation start instruction is an instruction to start an operation that is performed by the map representation data processing device C to acquire correspondence information. An output instruction is an instruction to output map representation data or the like. An output instruction contains, for example, a map representation data identifier that identifies map representation data.

Here, "acceptance" means, for example, acceptance of a user input, reception from an external device (for example, a terminal device, which is not shown in the drawings), or the like. It suffices if various information and instructions can be acquired through acceptance. Any input means, such as a touch panel, a keyboard, a mouse, a menu screen, or the like, may be employed to input various kinds of information and instructions.

The map representation data acceptance unit C21 accepts map representation data. Here, "acceptance" is a concept that includes acceptance of information input from an input device such as a keyboard, a mouse, or a touch panel, reception of information transmitted via a wired or wireless communication line, and acceptance of information read out from a recording medium such as an optical disk, a magnetic disk, or a semiconductor memory. That is to say, the map representation data acceptance unit C21 may read out map representation data from the map representation data storage unit C12.

The processing unit C3 performs various kinds of processing. Examples of the various kinds of processing include processing that is performed by the string acquisition unit C31, the classification unit C32, the grouping unit C33, the feature spot detection unit C34, the coordinate information acquisition unit C35, the position information acquisition unit C36, the region specification information acquisition unit C37, the direction information acquisition unit C38, the first region specification information acquisition part C371, the outer string determination part C372, the size information acquisition part C373, the distance information acquisition part C374, and the second region specification information acquisition part C375.

The string acquisition unit C31 acquires one or more strings from the map representation data accepted by the map representation data acceptance unit C21. It is preferable that the string acquisition unit C31 acquires three or more strings from the map representation data. For example, the string acquisition unit C31 acquires one or more strings from the map representation data through character recognition processing. Note that character recognition processing is a well-known technique, and therefore the detailed description thereof will be omitted. For example, the string acquisition unit C31 acquires one or more strings that are included in map representation data.

The classification unit C32 judges whether or not each of the one or more strings acquired by the string acquisition unit C31 is a string that specifies a location.

For example, the classification unit C32 judges whether or not each of the one or more strings acquired by the string acquisition unit C31 is a string that specifies a location that is to be registered. A string that specifies a location that is to be registered is, for example, location information or unique location information.

The classification unit C32 performs, for example, classification processing on each of the two or more strings, to determine the string is location information or non-location information, through a machine learning technique, using the one or more strings acquired by the string acquisition unit C31 and the learners.

For example, the classification unit C32 performs learning processing through a machine learning technique, using strings that are one or more pieces of location information, as positive examples, and strings that are one or more pieces of non-location information, as negative examples, and performs processing to determine whether each of the one or more strings acquired by the string acquisition unit C31 is location information or non-location information, using the acquired learner.

Note that, as described above, the machine learning technique may be deep learning, SVM, decision tree, random forest, or the like, and there is no limitation. Examples of the learning module that performs learning processing to form a learner include functions in machine learning frameworks such as fastText, tinySVM, and TensorFlow, and various kinds of random forest functions and so on. Examples of the classification module that performs determination processing performed by the classification unit C32 include functions in machine learning frameworks such as fastText, tinySVM, and TensorFlow, and various kinds of random forest functions and so on.

It is preferable that the classification unit C32 performs the same processing as the classification unit B31 to acquire labels respectively corresponding to the one or more strings acquired by the string acquisition unit C31. In such a case, the classification unit C32 sequentially provides the two or more characters that constitute the string accepted by the string acquisition unit C31 to the classification module for machine learning, one character at a time, provides the learner in the learner storage unit A12 to the classification module, and executes the classification module to acquire labels.

It is preferable that the classification unit C32 only judges that strings corresponding to the first label are strings that specify locations, for example. Alternatively, the classification unit C32 may determine strings that correspond to the first label and the third label as string that specify locations.

The grouping unit C33 determines two or more pieces of position information that indicate positions that are close enough to satisfy a predetermined condition, from among the three or more pieces of position information acquired by the position information acquisition unit C36. That is to say, the grouping unit C33 performs processing to exclude position information regarding positions that would not be located in the map representation data. Note that the one or more pieces of position information regarding the locations that is considered as not being located in the map representation data are pieces of information that indicate locations that are far enough to satisfy a predetermined condition with respect to the other pieces of location information acquired by the position information acquisition unit C36.

The processing performed by the grouping unit C33 is either one of the following two kinds of processing, for example.

(1) Processing Using Representative Position Information

For example, the grouping unit C33 determines representative position information that is position information representative of the three or more pieces of position information acquired by the position information acquisition unit C36. Representative position information typically is a piece of position information that indicates a central position of the three or more pieces of position information acquired by the position information acquisition unit C36.

Next, for example, the grouping unit C33 calculates the distance between each piece of position information other than the representative position information and the representative position information, and acquires position information that is other than the representative position information and indicates a distance that is close enough to satisfy a predetermined condition. Such one or more pieces of position information and the representative position information are the pieces of position information determined by the grouping unit C33. Note that the pieces of position information not acquired at this time are pieces of excluded position information.

Note that examples of the method for acquiring representative position information are (1-1) or (1-2) or (1-3) or (1-4) shown below.

(1-1) For example, the grouping unit C33 calculates three or more combinations of distances for two pieces of position information of the three or more pieces of position information acquired by the position information acquisition unit C36, and acquires two pieces of representative position information that indicate the shortest-distance set that is the set of two pieces of position information corresponding to the shortest distance of the three or more combinations of distances.

(1-2) The grouping unit C33 acquires either one piece information of the shortest-distance set acquired in (1-1) above as representative position information.

(1-3) The grouping unit C33 may acquire the center of gravity of the region that includes the three or more pieces of position information acquired by the position information acquisition unit C36 as representative position information.

(1-4) The grouping unit C33 may acquire a piece of position information regarding the position that is closest to the center of gravity of the region that includes the three or more pieces of position information acquired by the position information acquisition unit C36 as representative position information.

Note that the representative position information acquisition algorithm is not limited to (1-1) to (1-4) above.

(2) Clustering Processing

For example, the grouping unit C33 performs position information clustering processing, using the three or more pieces of position information acquired by the position information acquisition unit C36. Thereafter, the grouping unit C33 acquires the two or more pieces of position information acquired through clustering processing. Note that clustering processing is a well-known technique, and therefore the detailed description thereof will be omitted.

Note that pieces of correspondence information corresponding to the pieces of position information determined by the grouping unit C33 are to be accumulated. Correspondence information corresponding to position information is, for example, correspondence information that includes the position information, or correspondence information that includes a pointer to the position information.

The feature spot detection unit C34 detects feature spots that are spots where feature patterns that are predetermined characteristic patterns are expressed, from map representation data. For example, the feature spot detection unit C34 detects feature spots that are spots where feature patterns that are predetermined characteristic patterns are expressed, from map representation data, using an image recognition technique. It is preferable that the feature patterns are constituted by at least one kind of pattern of an intersection and a bridge.

For example, feature patterns of intersections, bridges, or the like are stored in the storage unit C1, and the feature spot detection unit C34, for example, cuts out a region that matches the size of the feature pattern from map representation data while shifting the starting pixel in the map representation data, calculates the degree of similarity between the cut out region and the feature patterns in the storage unit C1, and detects a region with a degree of similarity that is no less than a threshold value, as a feature spot.

Also, for example, the feature spot detection unit C34 performs object recognition processing regarding feature patterns on the map representation data to detect a feature spot. Note that object recognition processing is a well-known technique, and therefore the detailed description thereof will be omitted.

The coordinate information acquisition unit C35 acquires coordinate information (typically, (x,y)) that is information that specifies a coordinate position corresponding to the string acquired by the string acquisition unit C31, and that specifies a relative coordinate position in map representation data. A coordinate position corresponding to the string is coordinate position of a point that is representative of the region of the string in the map representation data, and is a representative point of the string. Examples of representative points include the center point of the region of the string in the map representation data, the upper left point of the region of the string in the map representation data, the lower right point of the region of the string in the map representation data, and so on. That is to say, the coordinate position corresponding to the string acquired by the string acquisition unit C31 may be the coordinate position of the center point of the region in which the string is located, the coordinate position of the upper left corner spot of the region in which the string is located, the coordinate position of the lower right corner spot of the region in which the string is located, or the like.

The coordinate information acquisition unit C35 may acquire coordinate information that specifies a coordinate position corresponding to the string corresponding to the position information determined by the grouping unit C33, of the strings acquired by the string acquisition unit C31. Even in such a case, it can be said that the coordinate information acquisition unit C35 acquires coordinate information that specifies the coordinate position corresponding to the string acquired by the string acquisition unit C31.

The coordinate information acquisition unit C35 acquires coordinate information corresponding to a feature pattern. The coordinate information acquisition unit C35 acquires information regarding the coordinates of the representative point in the region of the feature pattern detected by the feature spot detection unit C34.

The coordinate information acquisition unit C35 acquires, for example, the coordinate position of the center of gravity of the region of the feature pattern detected by the feature spot detection unit C34, as a feature spot. Alternatively, the coordinate information acquisition unit C35 acquires, for example, the coordinate position of the upper left point of the region of the feature pattern in the map representation data, as a feature spot. Alternatively, the coordinate information acquisition unit C35 acquires, for example, the coordinate position of the lower right point of the region of the feature pattern in the map representation data, as a feature spot.

The position information acquisition unit C36 acquires the position information corresponding to the location information that is the string acquired by the string acquisition unit C31, using the location dictionary. The position information acquisition unit C36 acquires the position information paired with the location information that is the string acquired by the string acquisition unit C31, from the location dictionary. Note that to acquire position information using the location dictionary typically is to acquire position information from the location dictionary.

For example, the position information acquisition unit C36 acquires the position information corresponding to the location information that is the string corresponding to the feature pattern, from the location dictionary. The string corresponding to the feature pattern is, for example, a string that is located at a position closest to the feature pattern. The string corresponding to the feature pattern is, for example, a string (for example, "ABC intersection") that is a combination of a string that is located at a position closest to the feature pattern (for example, "ABC") and the name of the feature pattern (for example, "intersection"). That is to say, the position information acquisition unit C36 acquires a string that is located at a position closest to the feature pattern and is a string that is located on the map representation data (for example, "ABC"), reads out the name of the feature pattern "for example "intersection") from the storage unit C1, combines these two strings to acquire a string (for example, "ABC intersection"), and acquires position information that is paired with the string (for example, "ABC intersection") from the location dictionary storage unit C11. Note that the position information acquisition unit C36 may acquire position information from a location dictionary storage unit C11 that is located in an external device (not shown).

For example, the position information acquisition unit C36 reads out a string (for example, "intersection") corresponding to the feature pattern from the storage unit C1, acquires a string that contains the string and is located at a position closest to the feature pattern, and acquires position information corresponding to the string from the location dictionary storage unit C11.

The region specification information acquisition unit C37 acquires region specification information that specifies a region that includes the positions indicated by the two or more pieces of position information determined by the grouping unit C33, and is a region in the accurate map information.

The region specification information acquisition unit C37 may acquire region specification information that specifies a region that includes the positions indicated by the two or more pieces of position information acquired by the position information acquisition unit C36, and is a region in the accurate map information.

The region specification information acquisition unit C37 acquires the region specification information through processing that is performed bb, for example, the first region specification information acquisition part C371, the outer string determination part C372, the size information acquisition part C373, the distance information acquisition part C374, and the second region specification information acquisition part C375.

The first region specification information acquisition part C371 acquires first region specification information that specifies a first region that includes the positions indicated by the two or more pieces of position information determined by the grouping unit C33, and is a region in the accurate map information. The first region specification information is, for example, position information regarding two points that specify a rectangle. However, the region specified by first region specification information need not necessarily be a rectangle, and may be a polygon, a circle, or the like.

It is preferable that the first region specification information acquisition part C371 acquires first region specification information that specifies a first region that is a rectangular region that includes all the positions indicated by the two or more pieces of position information determined by the grouping unit C33.

It is preferable that the first region specification information acquisition part C371 acquires first region specification information that specifies a first region that is a rectangular region that includes all the positions indicated by the two or more pieces of position information determined by the grouping unit C33, and has the smallest area.

The outer string determination part C372 determines strings corresponding to one or more pieces of position information that are located at the outermost positions, of the pieces of position information acquired by the position information acquisition unit C36. It is preferable that the outer string determination part C372 determines strings corresponding to four pieces of position information that are located at the outermost positions in four directions (up, down, left, and right on the map representation data). The pieces of position information acquired by the position information acquisition unit C36 need not necessarily be all the pieces of position information acquired by the position information acquisition unit C36. The position information acquired by the position information acquisition unit C36 may be position information determined by the position information acquisition unit C33.

The size information acquisition part C373 acquires size information that specifies the size to the corners of the map representation data outside the one or more strings determined by the outer string determination part C372. Note that size information is, for example, the number of pixels. Size information is, for example, a size on coordinates.

The distance information acquisition part C374 acquires distance information that specifies a distance corresponding to the size information acquired by the size information acquisition part C373, using two or more sets each consisting of the coordinate information acquired by the coordinate information acquisition unit C35 and the position information acquired by the position information acquisition unit C36. Distance information is information (in formation in units of m, km, or the like) that specifies the actual distance, or the distance in the real world.

The distance information acquisition part C374 acquires unit information (for example, m/pixel) that is information regarding a distance (for example, information in units of m) in a unit amount of coordinate information (for example, per pixel), using, for example, two or more sets each consisting of the coordinate information (for example, $(x_1,y_1)$ and $(x_2,y_2)$) acquired by the coordinate information acquisition unit C35 and the position information (for example, (X1,Y1) and (X2,Y2)) acquired by the position information acquisition unit C36. That is to say, for example, the distance information acquisition part C374 calculates the number of pixels A between $(x_1,y_1)$ and $(x_2,y_2)$ and the distance B between (X1,Y1) and (X2,Y2), and acquires unit information using the calculation formula "unit information=distance B divided by the number of pixels A". Thereafter, the distance information acquisition part C374 acquires distance information by, for example, multiplying the size information (for example, the number of pixels) acquired by the size information acquisition part C373 and the unit information (for example, the distance per pixel). It is preferable that the distance information acquisition part C374 acquires distance information in four directions, for example.

The second region specification information acquisition part C375 acquires second region specification information that specifies a second region that is expanded from the first region specified by the first region specification information, using the distance information acquired by the distance information acquisition part C374. For example, the second region specification information acquisition part C375 acquires second region specification information that specifies a second region that is the region expanded from the first region specification information by the pieces of distance information regarding the four directions, in the respective directions. The second region specification information is, for example, position information regarding two points that specify a rectangle. However, the region specified by first region specification information need not necessarily be a rectangle, and may be a polygon, a circle, or the like.

The direction information acquisition unit C38 acquires direction information regarding directions in the map representation data, using region specification information or second region specification information. It is preferable that, when region specification information or second region specification information indicates a rectangle, the direction information acquisition unit C38 acquires direction information regarding an angle formed by the rectangular figure indicated by the region specification information or the second region specification information and a reference angle (for example, true north). Direction information is, for example, an angle from true north (information from 0 degrees to 360 degrees, or from 180 degrees to 180 degrees). Note that direction information is, for example, information that specifies the direction of true north in map representation data (for example, a vector), or information that indicates the direction directly upward from the center of the map representation data. The information indicating the direction directly upward from the center of the map representation data is, for example, "0 degrees" when the direction directly upward from the center is true north, and "−90 degrees" or "270 degrees" when the direction directly upward from the center is true east.

For example, the direction information acquisition unit C38 acquires a pair from the pieces of position information regarding the two or more locations acquired by the position information acquisition unit C36, and calculates a first angle that is an actual angle to the reference direction (for example, north) regarding the two positions from the two pieces of position information of the pair. The direction information acquisition unit C38 acquires, for example, the coordinate information regarding the pair acquired by the coordinate information acquisition unit C35. Next, the direction information acquisition unit C38 calculates a second angle that is an angle in map representation data, from the two pieces of coordinate information. Next, the direction information acquisition unit C38 acquires direction information regarding the direction in the map representation data, using the first angle and the second angle. When the first angle is "0 degrees (the two locations are in the relationship of true north and true south) and the second angle is "90 degrees" (the y-axis values of the coordinate information regarding the two points are the same), the direction information acquisition unit C38 acquires direction information "90 degrees".

For example, when the positional relationship indicated by the pieces of location information of the pair regarding a location 1 and a location 2 indicates true north, the first angle between the location 1 and the location 2 is calculated as 0 degrees. The direction information acquisition unit C38 acquires, for example, the coordinate information regarding the pair acquired by the coordinate information acquisition unit C35. Next, the direction information acquisition unit C38 acquires direction information (for example, a vector from the location 1 to the location 2) that indicates the direction of true north in the map representation data, from the two pieces of coordinate information.

It is preferable that, for example, the direction information acquisition unit C38 acquires two or more pairs from location information regarding three or more locations, performs the same processing as described above on each of the two or more pairs to acquire two or more pieces of direction information, and calculates a representative value (for example, an average value, a median value, or the like) of the two or more pieces of direction information. The output unit C4 outputs various kinds of information. Examples of various kinds of information include correspondence information, map representation data, accurate map information, and direction information.

The correspondence output unit C41 outputs the coordinate information acquired by the coordinate information acquisition unit C35 and the position information acquired by the position information acquisition unit C36, in association with each other. To output coordinate information and position information in association with each other may be to output correspondence information that contains coordinate information and position information. Here, "output" typically means accumulation on a recording medium (for example, the correspondence information storage unit C14), but may be regarded as a concept that includes displaying on a display device, projection with a projector, printing with a printer, sound output, transmission to an external device, delivery of processing results to another processing apparatus or another program, and so on. It is preferable that the correspondence output unit C41 outputs location information that associates the coordinate information and position information as well in pair with the coordinate information and the position information.

The correspondence output unit C41 outputs the coordinate information and the position information corresponding to the string judged by the classification unit C32 as a string that specifies a location, in association with each other.

The correspondence output unit C41 outputs the coordinate information and the position information corresponding to the string classified by the classification unit C32 as location information, in association with each other.

The correspondence output unit C41 outputs the two or more pieces of position information determined by the grouping unit C33 and the two or more pieces of coordinate information acquired by the coordinate information acquisition unit C35, in association with each other.

For example, the accurate map information output unit C42 outputs accurate map information in a mode in which the region specified by the region specification information is discernable. Here, "output" may be regarded as a concept that includes displaying on a display device, projection with a projector, accumulation on a recording medium, printing with a printer, sound output, transmission to an external device, delivery of processing results to another processing apparatus or another program, and so on. A mode in which the region specified by the region specification information is discernable is, for example, a mode in which the region specified by the region specification information is enclosed with a frame, or the background color of the region specified by the region specification information is changed from that of other regions. However, there is no limitation of such a mode.

It is preferable that, for example, the accurate map information output unit C42 outputs accurate map information in a mode in which the region specified by two pieces of region specification information is discernable.

The direction information output unit C43 outputs the direction information acquired by the direction information acquisition unit C38. There is no limitation on the mode in which the direction information is output. Here, "output" may be regarded as a concept that includes displaying on a display device, projection with a projector, accumulation on a recording medium, printing with a printer, sound output, transmission to an external device, delivery of processing results to another processing apparatus or another program, and so on.

It is preferable that the storage unit C1, the location dictionary storage unit C11, the map representation data storage unit C12, the accurate map information storage unit C13, the learner storage unit A12, and the correspondence information storage unit C14 are realized using a non-volatile recording medium, but they may be realized using a volatile recording medium.

There is no limitation on the process in which information is stored in the storage unit C1 and so on. For example, information may be stored in the storage unit C1 or the like via a recording medium, or information transmitted via a communication line or the like may be stored in the storage unit C1 or the like, or information input via an input device may be stored in the storage unit C1 or the like.

The acceptance unit C2 and the map representation data acceptance unit C21 can be realized using a device driver for the input means such as a touch panel or a keyboard, or control software or the like for controlling the menu screen.

The processing unit C3, the string acquisition unit C31, the classification unit C32, the grouping unit C33, the feature spot detection unit C34, the coordinate information acquisition unit C35, the position information acquisition unit C36, the region specification information acquisition unit C37, the direction information acquisition unit C38, the first region specification information acquisition part C371, the outer string determination part C372, the size information acquisition part C373, the distance information acquisition part C374 and the second region specification information acquisition part C375 typically are realized using an MPU, a memory, and so on. The processing procedures performed by the processing unit C3 and so on typically are realized using software, and the software is recorded on a recording medium such as a ROM. However, such processing procedures may be realized using hardware (a dedicated circuit).

The output unit C4, the correspondence output unit C41, the accurate map information output unit C42, and the direction information output unit C43 may be regarded as including or not including an output device such as a display or a speaker. The output unit C4 can be realized using the driver software of the output device, the driver software of the output device and the output device, or the like.

Next, examples of operations of the map representation data processing device C will be described with reference to the flowchart shown in FIG. 8.

(Step S801) The acceptance unit C2 judges whether or not an operation start instruction has been accepted. If an operation start instruction has been accepted, processing proceeds to step S802, and if an operation start instruction has not been accepted, processing proceeds to step S821.

(Step S802) The processing unit C3 substitutes 1 for the counter i.

(Step S803) The processing unit C3 judges whether or not the $i^{th}$ piece of map representation data is present in the map representation data storage unit C12. If the $i^{th}$ piece of map representation data is present, processing proceeds to step S804, and otherwise processing returns to step S801.

(Step S804) The map representation data acceptance unit C21 acquires the $i^{th}$ piece of map representation data from the map representation data storage unit C12.

(Step S805) The string acquisition unit C31 acquires one or more strings expressed on the $i^{th}$ piece of map representation data acquired in step S804. For example, the string acquisition unit C31 acquires one or more strings that are expressed on the $i^{th}$ piece of map representation data, through character recognition processing.

(Step S806) The classification unit C32 substitutes 1 for the counter j.

(Step S807) The classification unit C32 judges whether or not the $j^{th}$ string is present in the strings acquired in step S805. If the $j^{th}$ string is present, processing proceeds to step S808, and if the $j^{th}$ string is not present, processing proceeds to step S813.

(Step S808) the classification unit C32 performs classification processing on the $j^{th}$ string to acquire a label. Note that classification processing is, for example, the processing performed by the classification device B described above, and is, for example, the processing from step S402 to step S409 in FIG. 4.

(Step S809) The coordinate information acquisition unit C35 judges whether or not the $j^{th}$ string is location information that is to be registered. If the $j^{th}$ string is location information that is to be registered, processing proceeds to step S810, and if the $j^{th}$ string is location information that is not to be registered, processing proceeds to step S812.

Note that location information to be registered is, for example, information indicating that the label acquired in step S808 is a label indicating that the string is a string to be registered. Also, a label that indicates that a string is the string to be registered is, for example, the first label.

(Step S810) The coordinate information acquisition unit C35 acquires coordinate information regarding a representative point of a region in which the $j^{th}$ string is located and is on the $i^{th}$ piece of map representation data. Note that the representative point may be the center of gravity of the region, the upper left point, the lower right point, or the like. It is assumed that information regarding the region in which the string is located is acquired when the string is acquired from map representation data.

(Step S811) The position information acquisition unit C36 acquires the position information paired with the location information that is the $i^{th}$ string, from location dictionary storage unit C11. Thereafter, the correspondence output unit C41 at least temporarily accumulates the position information in a buffer (not shown) in pair with the coordinate information acquired in step S810.

(Step S812) The classification unit C32 increments the counter j by 1. Processing returns to step S807.

(Step S813) The grouping unit C33 performs grouping processing on the two or more pieces of two or more accumulated in step S811. An example of grouping processing will be described with reference to the flowchart shown in FIG. 9.

(Step S814) The correspondence output unit C41 substitutes 1 for a counter k.

(Step S815) The correspondence output unit C41 judges whether or not the kth piece of position information is present in the pieces of position information acquired in step S813. If the kth piece of position information is present, processing proceeds to step S816, and if the kth piece of position information is not present, processing proceeds to step S818.

(Step S816) The correspondence output unit C41 acquires coordinate information that is paired with the kth piece of position information from a buffer (not shown). Thereafter, the correspondence output unit C41 accumulates the kth piece of position information and the acquired piece of coordinate information in association with each other, and in association with the $i^{th}$ piece of map representation data, in the correspondence information storage unit C14.

(Step S817) The correspondence output unit C41 increments the counter k by 1. Processing returns to step S807.

(Step S818) The region specification information acquisition unit C37 performs region specification processing. Region specification processing is processing that is performed to specify a region that corresponds to a region of the $i^{th}$ piece of map representation data and is included in accurate map information. An example of region specification processing will be described with reference to the flowchart shown in FIG. 10.

(Step S819) The direction information acquisition unit C38 performs direction acquisition processing. Direction acquisition processing is processing that is performed to acquire direction information that specifies the direction of the $i^{th}$ piece of map representation data. An example of direction acquisition processing will be described with reference to the flowchart shown in FIG. 11.

(Step S820) The processing unit C3 increments the counter i by 1. Processing returns to step S803.

(Step S821) The acceptance unit C2 judges whether or not an output instruction has been accepted. If an output instruction has been accepted, processing proceeds to step S822, and if an output instruction has not been accepted, processing returns to step S801.

(Step S822) The output unit C4 performs output processing.

Processing returns to step S801. Note that output processing is an instruction to output map representation data or the like corresponding to the output instruction. An example of output processing will be described with reference to the flowchart shown in FIG. 12.

Figure 8:
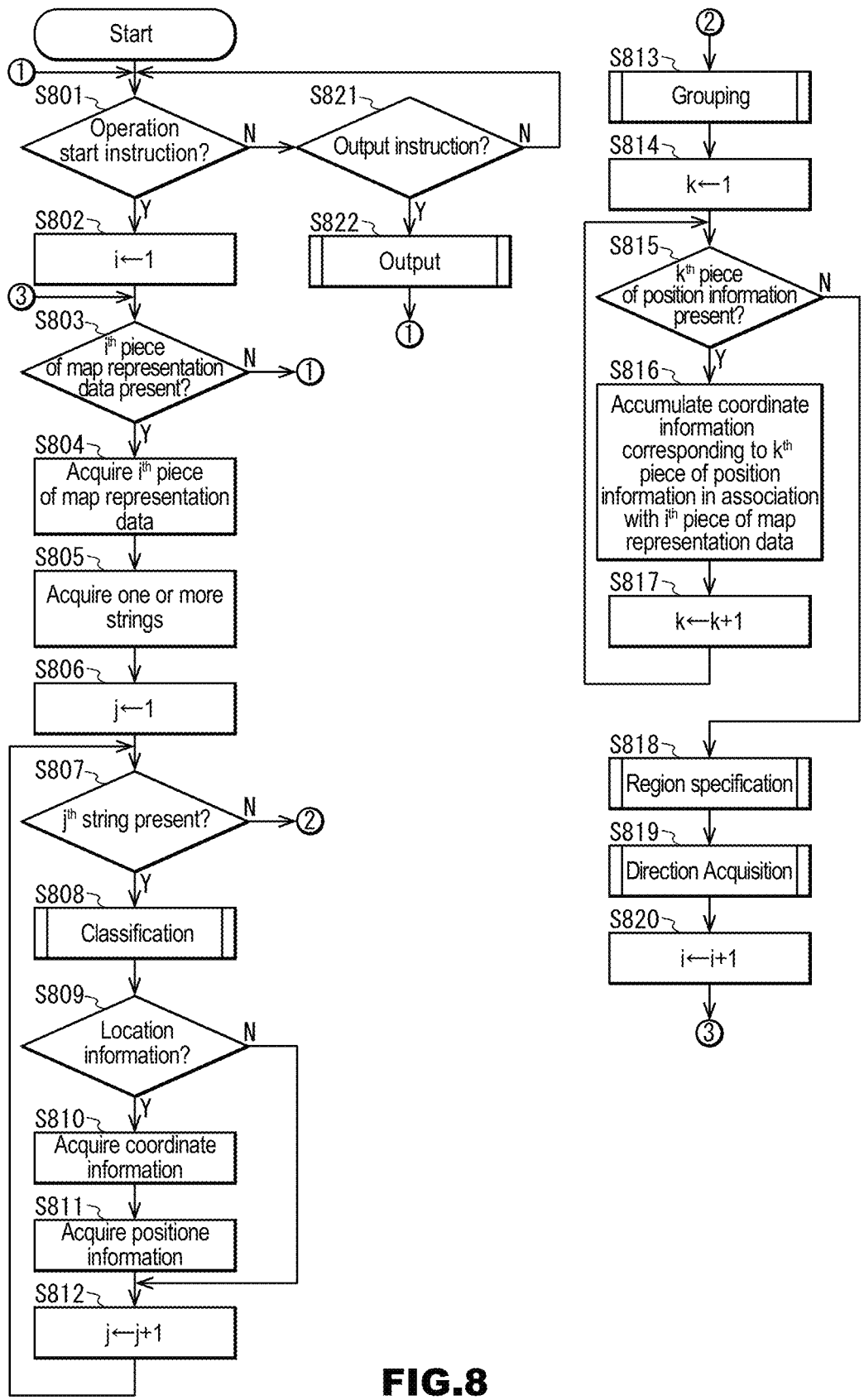
FIG. 8 is a flowchart illustrating examples of operations of the map representation data processing device C according to the same.

In the flowchart shown in FIG. 8, processing is terminated when power is turned off or an interruption is made to terminate the processing.

Figure 9:
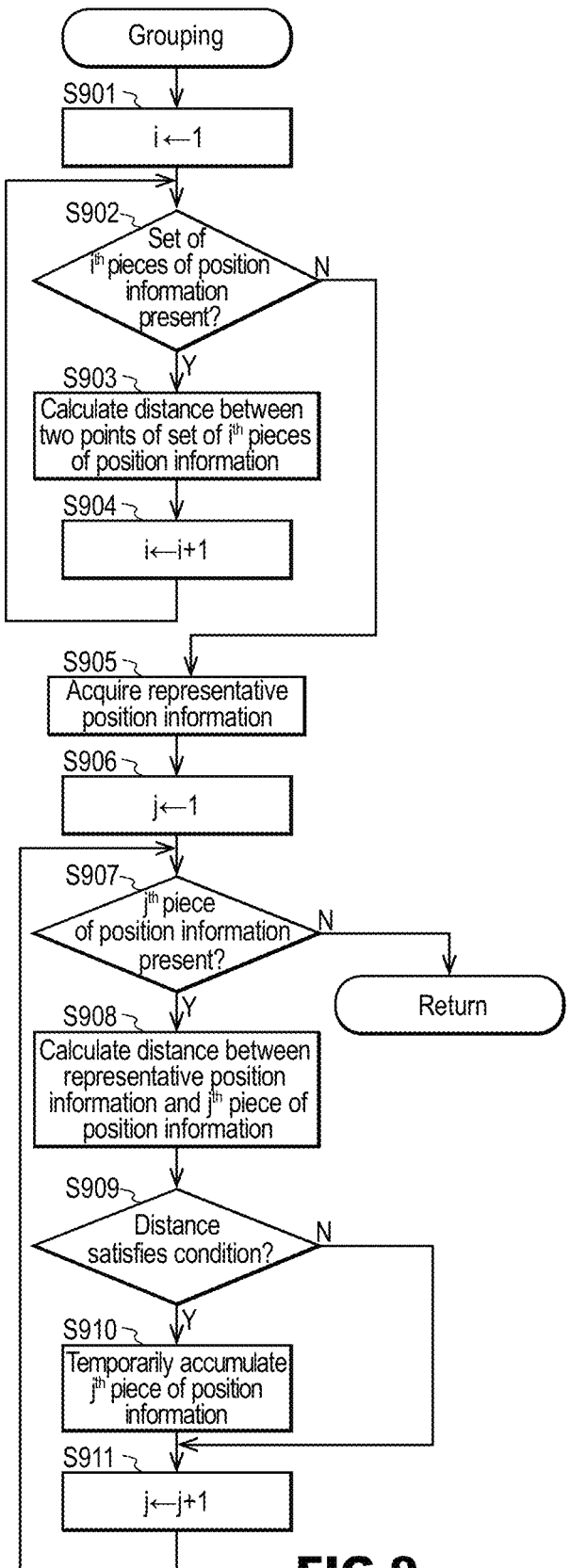
FIG. 9 is a flowchart illustrating an example of grouping processing according to the same.

Next, an example of the grouping processing in step S813 will be described with reference to the flowchart shown in FIG. 9.

(Step S901) The grouping unit C33 substitutes 1 for the counter i.

(Step S902) The grouping unit C33 judges whether or not a set of the $i^{th}$ two pieces of position information is present in the two or more pieces of position information acquired in step S811. If a set of the $i^{th}$ two pieces of position information is present, processing proceeds to step S903, and otherwise processing returns to step S905.

(Step S903) The grouping unit C33 calculates the distance between the two points specified by the $i^{th}$ two pieces of position information.

(Step S904) The grouping unit C33 increments the counter i by 1. Processing returns to step S807.

(Step S905) The grouping unit C33 acquires two pieces of position information corresponding to the smallest distance of the distances between two points calculated in step S903. Thereafter, the grouping unit C33 acquires any one piece of position information of the two pieces of position information as representative position information.

(Step S906) The grouping unit C33 substitutes 1 for the counter j.

(Step S907) The grouping unit C33 judges whether or not the $j^{th}$ piece of position information other than the representative position information is present in the two or more pieces of position information acquired in step S811. If the $j^{th}$ piece of position information is present, processing proceeds to step S908, and if the $j^{th}$ piece of position information is not present, processing returns to higher level processing.

(Step S908) The grouping unit C33 calculates the distance between each piece of position information other than the representative position information and the representative position information, of the two or more pieces of position information acquired in the step S811.

(Step S909) The grouping unit C33 judges whether or not the distance calculated in step S907 is a distance that is short enough to satisfy a predetermined condition (for example, whether or not the distance is less than a threshold value, or whether or not the distance is no greater than a threshold value. If the distance is short enough to satisfy the predetermined condition, processing proceeds to step S910, and if the distance is not short enough to satisfy the predetermined condition, processing proceeds to step S911.

(Step S910) The grouping unit C33 temporarily accumulates the $j^{th}$ piece of position information in a buffer (not shown). The position information accumulated in the buffer is the position information acquired by the grouping unit C33.

(Step S911) The grouping unit C33 increments the counter j by 1. Processing returns to step S807.

Figure 10:
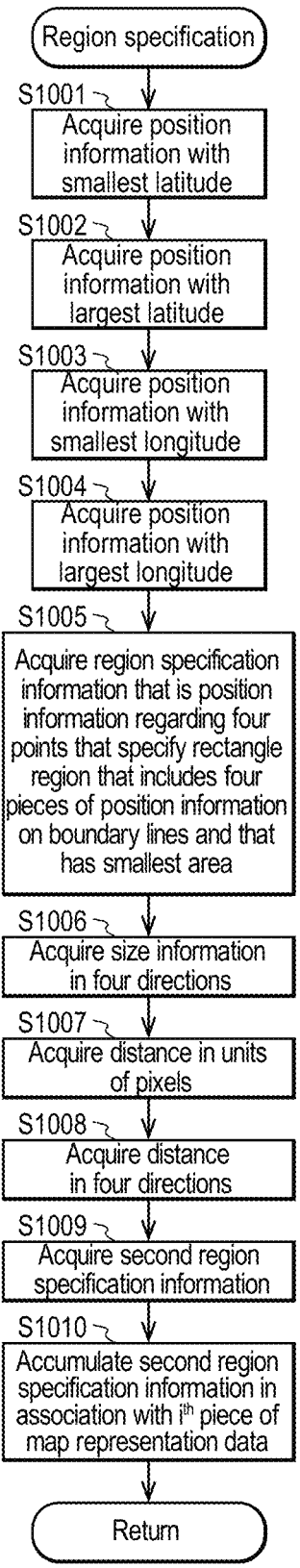
FIG. 10 is a flowchart illustrating an example of region specification processing according to the same.

Next, an example of the region specification processing in step S818 will be described with reference to the flowchart shown in FIG. 10.

(Step S1001) The first region specification information acquisition part C371 acquires position information with the smallest longitude from among the pieces of position information temporarily accumulated by the grouping unit C33 in the buffer (not shown) in step S910.

(Step S1002) The first region specification information acquisition part C371 acquires position information with the largest longitude from among the pieces of position information temporarily accumulated by the grouping unit C33 in the buffer (not shown) in step S910.

(Step S1003) The first region specification information acquisition part C371 acquires position information with the smallest latitude from among the pieces of position information temporarily accumulated by the grouping unit C33 in the buffer (not shown) in step S910.

(Step S1004) The first region specification information acquisition part C371 acquires position information with the largest latitude from among the pieces of position information temporarily accumulated by the grouping unit C33 in the buffer (not shown) in step S910.

(Step S1005) The first region specification information acquisition part C371 acquires region specification information that contains pieces of position information regarding four corner points that specify a region that includes the four pieces of position information acquired from step S1001 to step S1004 at boundaries, contains all the pieces of position information acquired by the grouping unit C33, and is a rectangular region. It is preferable that the first region specification information acquisition part C371 acquires region specification information that contains pieces of position information regarding four corner points that specify a region that includes the four pieces of position information acquired from step S1001 to step S1004 at boundaries, contains all the pieces of position information acquired by the grouping unit C33, and is a rectangular region with the smallest area.

(Step S1006) The outer string determination part C372 acquires the outermost strings in the four directions (up, down, left, and right) in the region specified by the region specification information. Thereafter, the size information acquisition part C373 acquires size information indicating the number of pixels between the four outermost strings and the outer edge of the map representation data.

(Step S1007) The distance information acquisition part C374 acquires the distance per pixel (per one coordinate point), using two or more sets each consisting of position information and coordinate information.

(Step S1008) The distance information acquisition part C374 multiplies the distance per pixel acquired in step S1007 by the four pieces of size information acquired in step S1006, to calculate the distance of expansion in the four directions. Note that the four directions of expansion are the directions respectively perpendicular to the four sides of the rectangle specified by the region specification information.

(Step S1009) The second region specification information acquisition part C375 acquires second region specification information that is information that specifies the region obtained by extending the widths of the first region specification information in the four directions by the distance acquired in step S1008. The second region specification information typically consists of two pieces of position information that specify a rectangle.

(Step S1010) The second region specification information acquisition part C375 accumulates the second region specification information acquired in step S1009, in association with the i$^{th}$ piece of map representation data. Processing returns to higher level processing.

Figure 11:
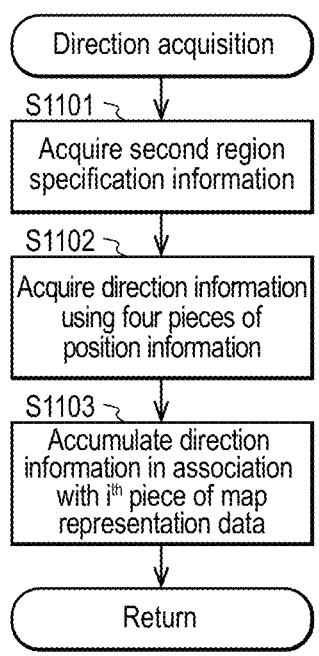
FIG. 11 is a flowchart illustrating an example of direction acquisition processing according to the same.

Next, an example of the direction acquisition processing in step S819 will be described with reference to the flowchart shown in FIG. 11.

(Step S1101) The direction information acquisition unit C38 acquires the second region specification information acquired by the second region specification information acquisition part C375.

(Step S1102) The direction information acquisition unit C38 acquires direction information, using four pieces of position information included in the second region specification information.

(Step S1103) The direction information acquisition unit C38 accumulates the direction information acquired in step S1102, in association with the i$^{th}$ piece of map representation data. Processing returns to higher level processing.

Next, an example of the output processing in step S822 will be described with reference to the flowchart shown in FIG. 12.

(Step S1201) The output unit C4 acquires the map representation data identifier contained in the accepted output instruction.

(Step S1202) The output unit C4 acquires the map representation data identified by the map representation data identifier acquired in step S1201, from the map representation data storage unit C12.

(Step S1203) The output unit C4 acquires one or more pieces of coordinate information that are paired with the map representation data identifier acquired in step S1201, from the correspondence information storage unit C14.

(Step S1204) The output unit C4 acquires direction information that is paired with the map representation data acquired in step S1202.

(Step S1205) The output unit C4 forms map representation data that explicitly indicates the spots respectively specified by the one or more pieces of coordinate information, and forms map representation data that explicitly indicates the direction information acquired in step S1204, on the map representation data acquired in step S1202.

(Step S1206) The output unit C4 acquires second region specification information that is paired with the map representation data acquired in step S1202.

(Step S1207) The output unit C4 acquires accurate map information regarding the region specified by the second region specification information acquired instep S1206, from the accurate map information storage unit C13.

(Step S1208) The output unit C4 acquires one or more pieces of position information that are paired with the map representation data identifier acquired in step S1201, from the correspondence information storage unit C14.

(Step S1209) The output unit C4 forms accurate map information that explicitly indicates the spots respectively specified by the one or more pieces of position information acquired in step S1208, on the accurate map information acquired in step S1207.

(Step S1210) The output unit C4 outputs the map representation data acquired in step S1205. Also, the output unit C4 outputs the accurate map information acquired in step S1209. Processing returns to higher level processing.

Figure 12:
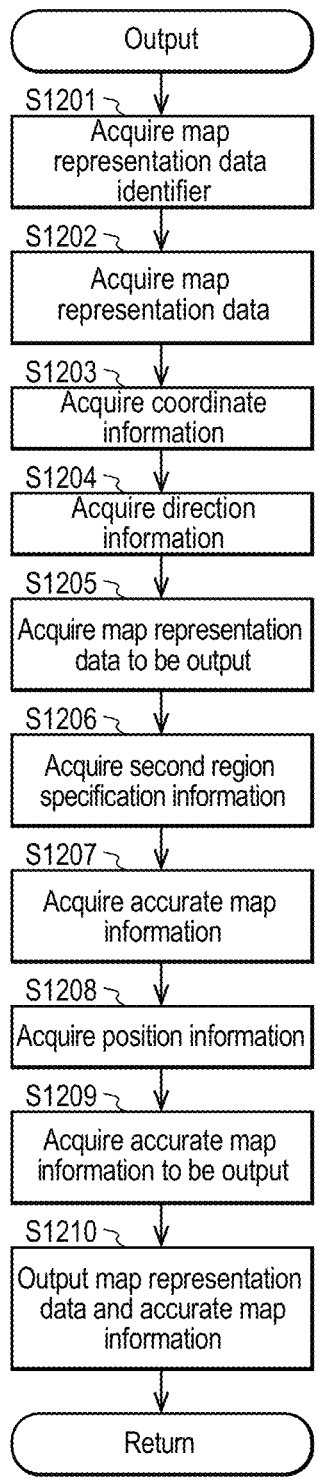
FIG. 12 is a flowchart illustrating an example of output processing according to the same.

In the flowchart shown in FIG. 12, only one of either map representation data or accurate may be output.

Also, in the flowchart shown in FIG. 12, the map representation data to be output may be map representation data that does not explicitly indicate the spots respectively specified by the one or more pieces of coordinate information.

Also, in the flowchart shown in FIG. 12, the map representation data to be output may be map representation data that does not explicitly indicate direction information.

Also, in the flowchart shown in FIG. 12, the accurate map information to be output may be map representation data that does not explicitly indicate second region specification information. Also, in the flowchart shown in FIG. 12, the accurate map information to be output may be map representation data that does not explicitly indicate the spots respectively specified by the one or more pieces of position information. Furthermore, in the flowchart shown in FIG. 12, the accurate map information to be output may be map representation data that explicitly indicates region specification information.

The following describes specific operations of the map representation data processing device C according to the present embodiment.

Figure 13:
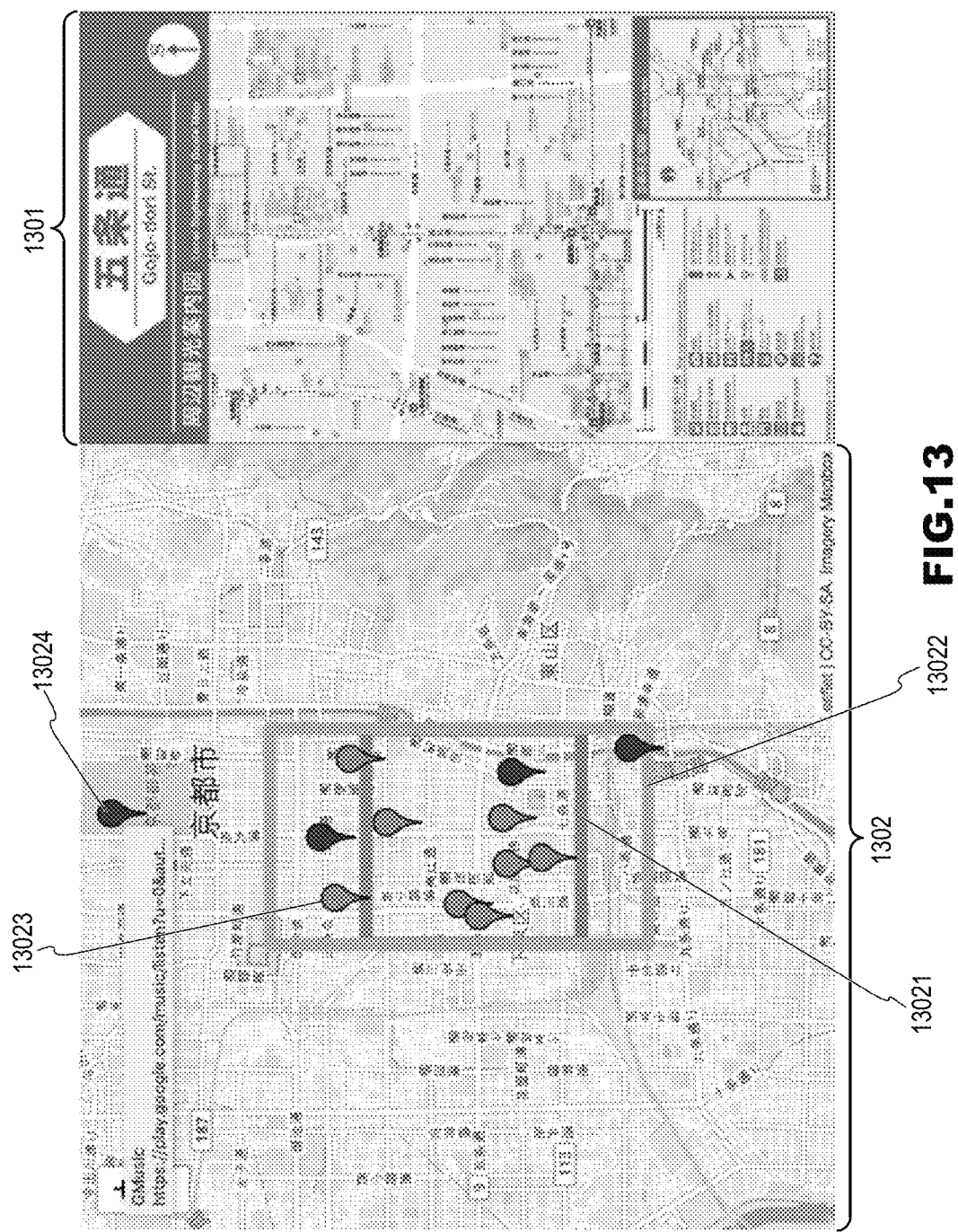
FIG. 13 is a diagram showing an example of map representation data and so on according to the same.
Figure 14:
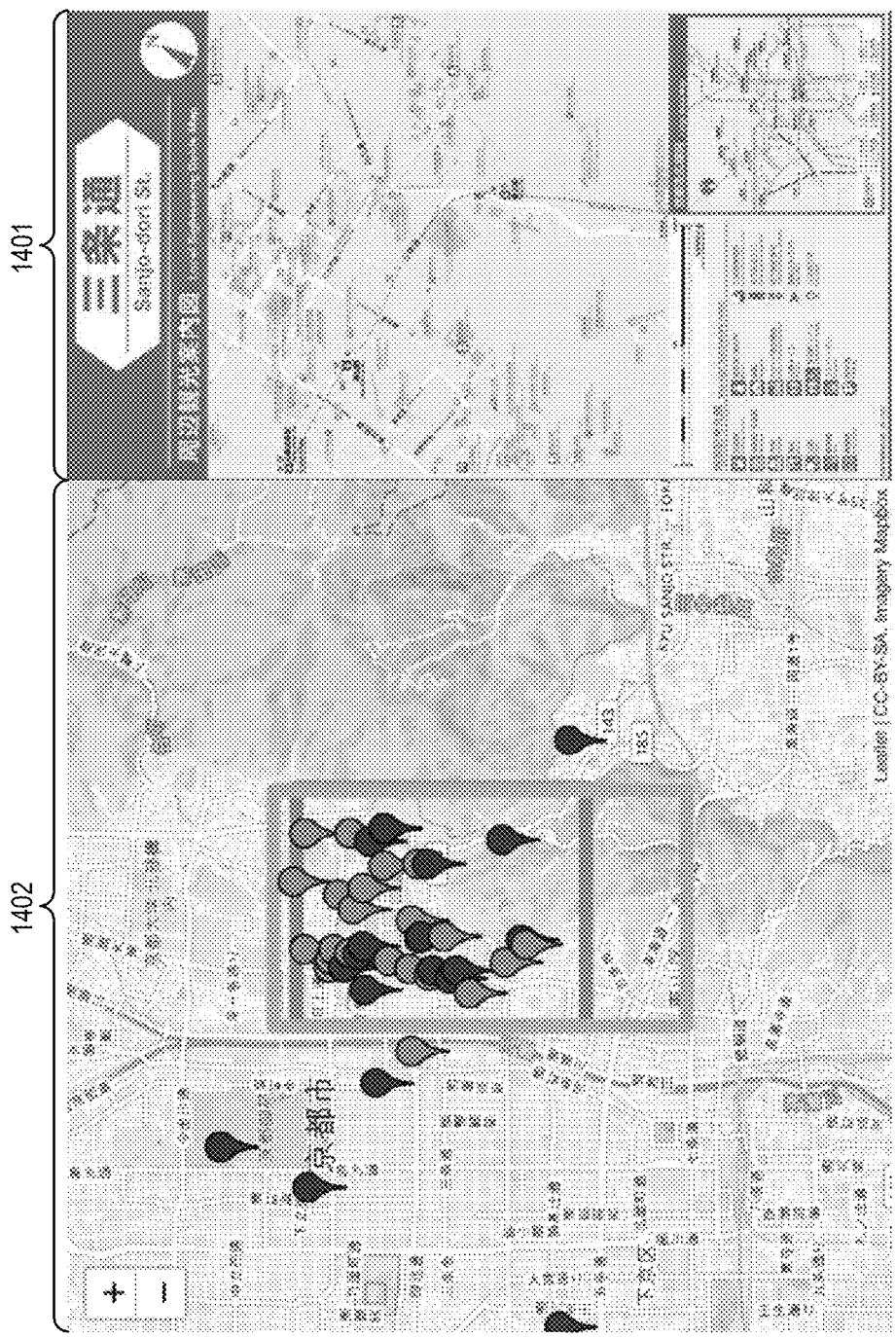
FIG. 14 is a diagram showing an example of map representation data and so on according to the same.

Now, for example, map representation data regarding Gojo-dori street in Kyoto, indicated by 1301 in FIG. 13, and map representation data regarding Sanjo-dori street indicated by 1401 in FIG. 14, are stored in the map representation data storage unit C12. The map representation data indicated by 1301 is stored in pair with a map representation data identifier "Gojo-dori street", and the map representation data indicated by 1401 is stored in pair with a map representation data identifier "Sanjo-dori street".

The location dictionary storage unit C11 stores the location dictionary shown in FIG. 15. The location dictionary stores two or more records that each contain "location information" and "position information". The "location information" here is a meaningless string, but typically is a location name. The "position information" here is (latitude, longitude).

Furthermore, the correspondence information storage unit C14 stores a correspondence information management table that has the structure shown in FIG. 16. The correspondence information management table stores one or more records that each contain "ID", "map representation data identifier", "coordinate information", "position information", and "location information". "ID" is information that identify the record. "Map representation data identifier" is information that identifies map representation data. "Coordinate information" is coordinate values that indicate the relative position on the map representation data. The "position information" here is (latitude, longitude). The "location information" here is a meaningless string, but typically is a location name.

In such a case, it is assumed that the user inputs an operation start instruction to the map representation data processing device C.

As a result, the acceptance unit C2 of the map representation data processing device C accepts the operation start instruction. The map representation data processing device C performs the above-described processing on the map representation data regarding "Gojo-dori street" and the map representation data regarding "Sanjo-dori street", and accumulates one or more pieces of correspondence information in the correspondence information in association with the pieces of map representation data. The record accumulated in this way are the records indicated by "ID=1, 2, 3, . . . , 38, . . . " in FIG. 16.

It is also assumed that the user next inputs an output instruction that contains the map representation data identifier "Gojo-dori street" to the map representation data processing device C.

As a result, the acceptance unit C2 of the map representation data processing device C accepts the output instruction. Next, the output unit C4 performs the above-described output processing. As a result, the map representation data indicated by 1301 and the accurate map information indicated by 1302 in FIG. 13 are output. Note that 13021 in FIG. 13 indicates a region that is specified by region specification information. 13022 indicates a region that is specified by second region specification information. 13023 is a pattern that specifies position information corresponding to the first label. Furthermore, 13024 is a pattern that specifies position information corresponding to the third label or has been excluded through grouping processing.

As described above, according to the present embodiment, it is possible to automatically acquire coordinate information and position information regarding a location name or the like on map representation data, in association with each other.

Also, according to the present embodiment, it is possible to extract a string such as an appropriate location name on map representation data and automatically acquire coordinate information and position information regarding the location name or the like in association with each other.

Also, according to the present embodiment, it is possible to accurately extract a string such as an appropriate location name on map representation data and automatically acquire coordinate information and position information regarding the location name or the like in association with each other.

Also, according to the present embodiment, it is possible to acquire a graphic feature point on map representation data and automatically acquire coordinate information and position information regarding the graphic feature point in association with each other.

Also, according to the present embodiment, it is possible to clarify the range of accurate map information corresponding to map representation data.

Also, according to the present embodiment, it is possible to clarify the appropriate range of accurate map information corresponding to map representation data.

Furthermore, according to the present embodiment, it is possible to acquire direction information regarding a direction in map representation data.

Note that the essential components in the present embodiment are the location dictionary storage unit C11, the map representation data acceptance unit C21, the string acquisition unit C31, the coordinate information acquisition unit C35, the position information acquisition unit C36 and the correspondence output unit C41. The other constituent elements of the map representation data processing device C need not necessarily be present.

Also, in the present embodiment, another output example other than that shown in FIG. 13 is shown in FIG. 14.

The software that realizes the map representation data processing device C in the present embodiment is the program described below. That is to say, the program is a program that enables a computer that can access a location dictionary storage unit that stores a location dictionary that contains one or more pieces of location position information each being information that associates location information that specifies a location and position information that specifies a position of the location with each other, to function as: a map representation data acceptance unit that accepts map representation data that is one or more types of maps of an illustration map, a handwritten map, and a sketch map; a string acquisition unit that acquires a string from the map representation data; a coordinate information acquisition unit that acquires coordinate information that is information that specifies a coordinate position corresponding to the string acquired by the string acquisition unit and is information that specifies a relative coordinate position in the map representation data; a position information acquisition unit that acquires position information corresponding to location information that is the string acquired by the string acquisition unit, using the location dictionary; and a correspondence output unit that outputs the coordinate information acquired by the coordinate information acquisition unit and the position information acquired by the position information acquisition unit in association with each other.

Embodiment 3

The present embodiment describes a map representation data processing device D that can explicitly indicate a current position on map representation data, using the correspondence information acquired in Embodiment 2.

Figure 17:
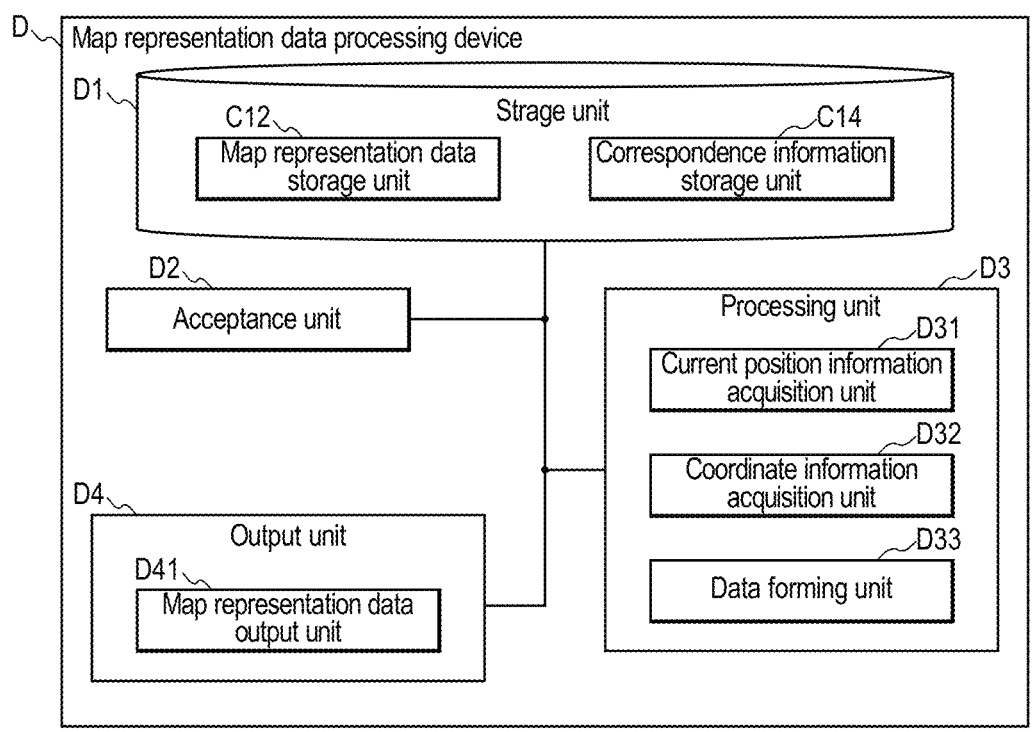
FIG. 17 is a block diagram for a map representation data processing device D according to Embodiment 3.

FIG. 17 is a block diagram for the map representation data processing device D according to the present embodiment.

The map representation data processing device D includes a storage unit D1, an acceptance unit D2, a processing unit D3, and an output unit D4. The storage unit D1 includes the map representation data storage unit C12 and the correspondence information storage unit C14.

The processing unit D3 includes a current position information acquisition unit D31, a coordinate information acquisition unit D32, and a data forming unit D33. The output unit D4 includes a map representation data output unit D41.

The storage unit D1 stores various kinds of information. Examples of various kinds of information include map representation data and correspondence information.

The map representation data storage unit C12 stores one or more pieces of map representation data.

The correspondence information storage unit C14 stores two or more pieces of correspondence information. It is preferable that correspondence information is associated with map representation data.

The acceptance unit D2 accepts various kinds of information and instructions. Examples of various kinds of information include an operation start instruction.

Here, "acceptance" means, for example, acceptance of a user input, reception from an external device (for example, a terminal device, which is not shown in the drawings), or the like. It suffices if various information and instructions can be acquired through acceptance. Any input means, such as a touch panel, a keyboard, a mouse, a menu screen, or the like, may be employed to input various kinds of information and instructions.

The processing unit D3 performs various kinds of processing. Examples of various kinds of processing include processing that is performed by the current position information acquisition unit D31, the coordinate information acquisition unit D32, and the data forming unit D33.

The current position information acquisition unit D31 acquires current position information that specifies the current position. The current position information acquisition unit D31 can be realized using a GPS receiver, for example. The current position information acquisition unit D31 is a well-known technique, and therefore the detailed description thereof will be omitted.

The coordinate information acquisition unit D32 acquires coordinate information corresponding to current position information, using two or more pieces of correspondence information that are paired with the target map representation data. Coordinate information indicates coordinate values that specify the relative position on the map representation data that is displayed.

For example, the coordinate information acquisition unit D32 reads out correspondence information 2 (coordinate information 1 ($x_1,y_1$), position information 1 (X1,Y1)) and correspondence information 2 (coordinate information2($x_2$, $y_2$), position information 2(X2,Y2)) that are paired with the target map representation data, from the correspondence information storage unit C14. Thereafter, the coordinate information acquisition unit D32 acquires the current position information (X3,Y3) acquired by the current position information acquisition unit D31. Next, the coordinate information acquisition unit D32 calculates (X1−X2), (Y1−Y2), using the position information 1 (X1,Y1) and position information 2 (X2,Y2). Also, the coordinate information acquisition unit D32 calculates ($x_1-x_2$), ($y_1-y_2$), using the coordinate information 1 ($x_1,y_1$) and the coordinate information 2 ($x_2,y_2$). Next, the coordinate information acquisition unit D32 calculates the number of pixels for a unit distance (for example, 100 m) on the x axis, using (X1−X2) and ($x_1-x_2$). Also, the coordinate information acquisition unit D32 calculates the number of pixels for a unit distance (for example, 100 m) on the y axis, using (Y1−Y2) and ($y_1-y_2$). Next, the coordinate information acquisition unit D32 calculates the number of pixels for the unit distance on the x axis using (X1−X3) and adds the number of pixels and $x_1$, to acquire a x coordinate ($x_3$) for the current position information. Also, the coordinate information acquisition unit D32 calculates the number of pixels for the unit distance on the y axis using (Y1−Y3) and adds the number of pixels and $y_1$, to acquire a y coordinate ($y_3$) for the current position information.

The data forming unit D33 forms current position-added map representation data that is map representation data on which the position indicated by the coordinate information acquired by the coordinate information acquisition unit D32 is explicitly indicated. Note that there is no limitation on the mode in which the position indicated by the coordinate information is explicitly indicated. The data forming unit D33 places a predetermined pattern at a position indicated by the coordinate information, for example.

The output unit D4 outputs various kinds of information. Examples of various kinds of information include current position-added map representation data.

The map representation data output unit D41 outputs the current position-added map representation data acquired by the data forming unit D33.

It is preferable that the storage unit D1, the map representation data storage unit C12, and the correspondence information storage unit C14 are realized using a nonvolatile recording medium, but they may be realized using a volatile recording medium.

There is no limitation on the process in which information is stored in the storage unit D1 and so on. For example, information may be stored in the storage unit D1 or the like via a recording medium, or information transmitted via a communication line or the like may be stored in the storage unit D1 or the like, or information input via an input device may be stored in the storage unit D1 or the like.

The acceptance unit D2 can be realized using a device driver for the input means such as a touch panel or a keyboard, or control software or the like for controlling the menu screen.

The processing unit D3, the current position information acquisition unit D31, the coordinate information acquisition unit D32, and the data forming unit D33 typically are realized using an MPU, a memory, and so on. The processing procedures performed by the processing unit D3 and so on typically are realized using software, and the software is recorded on a recording medium such as a ROM. However, such processing procedures may be realized using hardware (a dedicated circuit).

The output unit D4 and the map representation data output unit D41 may be regarded as including or not including an output device such as a display or a speaker. The output unit D4 can be realized using the driver software of the output device, the driver software of the output device and the output device, or the like.

Figure 18:
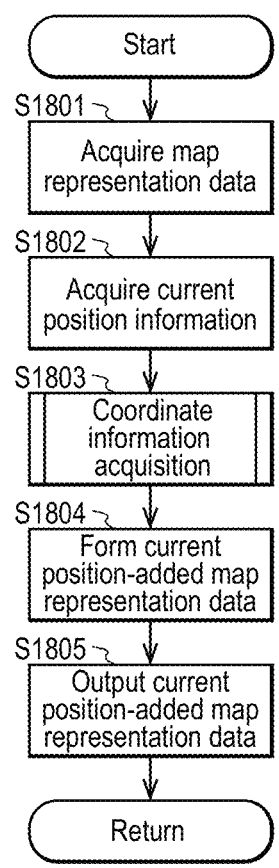
FIG. 18 is a flowchart illustrating examples of operations of the map representation data processing device D according to the same.

Next, examples of operations of the map representation data processing device D will be described with reference to the flowchart shown in FIG. 18.

(Step S1801) The acceptance unit D2 acquires the map representation data to be displayed, from the map representation data storage unit C12.

(Step S1802) The current position information acquisition unit D31 acquires current position information.

(Step S1803) The coordinate information acquisition unit D32 acquires two or more pieces of correspondence information that are paired with the map representation data identifier that identifies the map representation data acquired in step S1801, from the correspondence information storage unit C14. Next, the coordinate information acquisition unit D32 acquires coordinate information corresponding to current position information, using the two or more pieces of correspondence information.

(Step S1804) The data forming unit D33 forms current position-added map representation data that is map representation data acquired in step S1801 on which the position indicated by the coordinate information acquired in step S1803 is explicitly indicated.

(Step S1805) The map representation data output unit D41 outputs the current position-added map representation data formed in step S1804. Processing is terminated.

As described above, according to the present embodiment, it is possible to indicate the current position on map representation data, using two or more pieces of correspondence information that have been automatically acquired.

The software that realizes the map representation data processing device D in the present embodiment is the program described below. That is to say, the program is a program that enables a computer that can access: a map representation data storage unit that stores map representation data; and a correspondence information storage unit that stores two or more pieces of correspondence information that each are a set of coordinate information output by the map representation data processing device C and position information acquired by the position information acquisition unit, to function as: a current position information acquisition unit that acquires current position information that specifies a current position; a coordinate information acquisition unit that acquires coordinate information corresponding to the current position information, using the two or more pieces of correspondence information; a data forming unit that forms current position-added map representation data that is the map representation data on which a position indicated by the coordinate information is explicitly indicated; and a map representation data output unit that outputs the current position-added map representation data.

Embodiment 4

The present embodiment describes a map representation data processing device that acquires three or more location names from map representation data, acquires pieces of coordinate information respectively corresponding to the location names, from the map representation data, acquires pieces of real position information respectively corresponding to the location names, from a location dictionary, and outputs correspondence information that is a set of appropriate coordinate information and position information, using the coordinate information and the position information.

The present embodiment also describes a map representation data processing device that determines an inappropriate location based on relationship information regarding a relationship between correspondence information between two locations, and outputs two or more pieces of correspondence information that do not include inappropriate piece of correspondence information corresponding to the inappropriate location. Note that, in the present embodiment, distance relationship information regarding a distance and angle relationship information regarding an angle, for example, are used to determine an inappropriate location. An inappropriate location is a location corresponding to correspondence information that is considered as an error.

Also, the present embodiment describes a map representation data processing device that acquires and outputs scale information regarding map representation data.

Also, the present embodiment describes a map representation data processing device that acquires and outputs the range of map representation data.

Also, the present embodiment describes a map representation data processing device that adds location names or the like included in the range of map representation data, to the map representation data.

Furthermore, the present embodiment describes a map representation data processing device that acquires and outputs information regarding a direction in map representation data.

Figure 19:
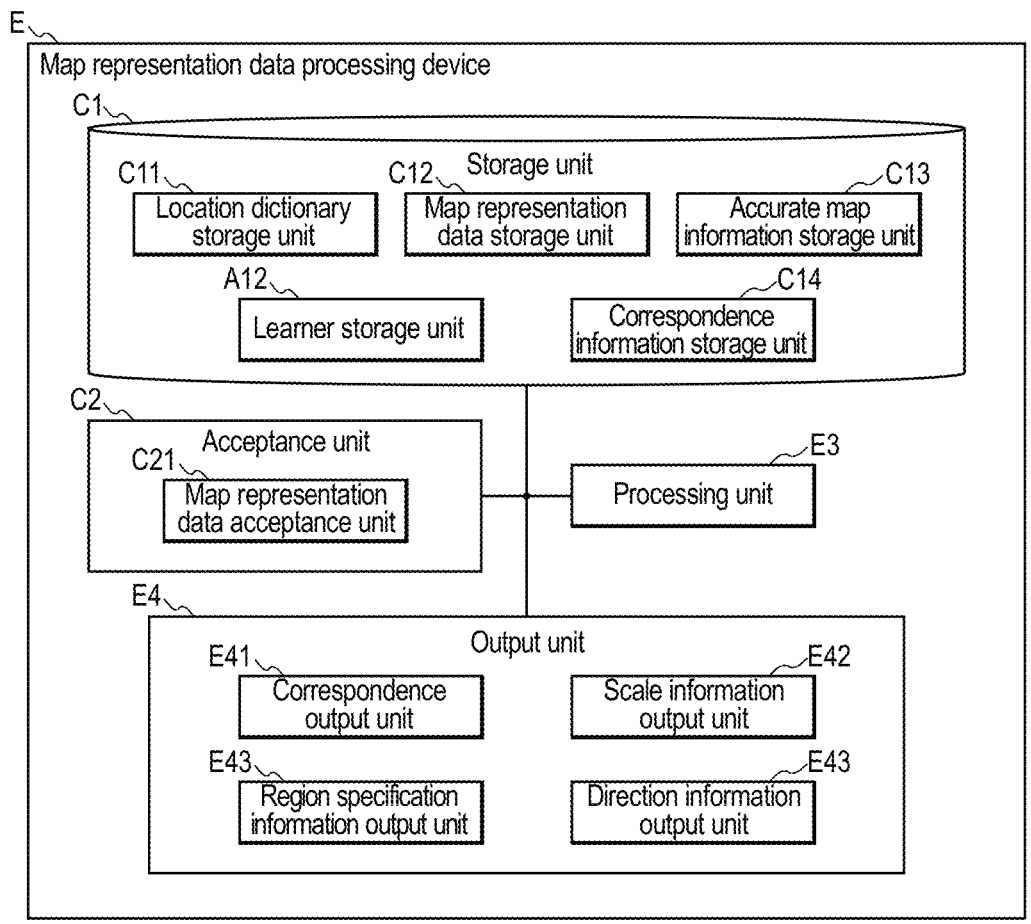
FIG. 19 is a block diagram for a map representation data processing device E according to Embodiment 4.
Figure 20:
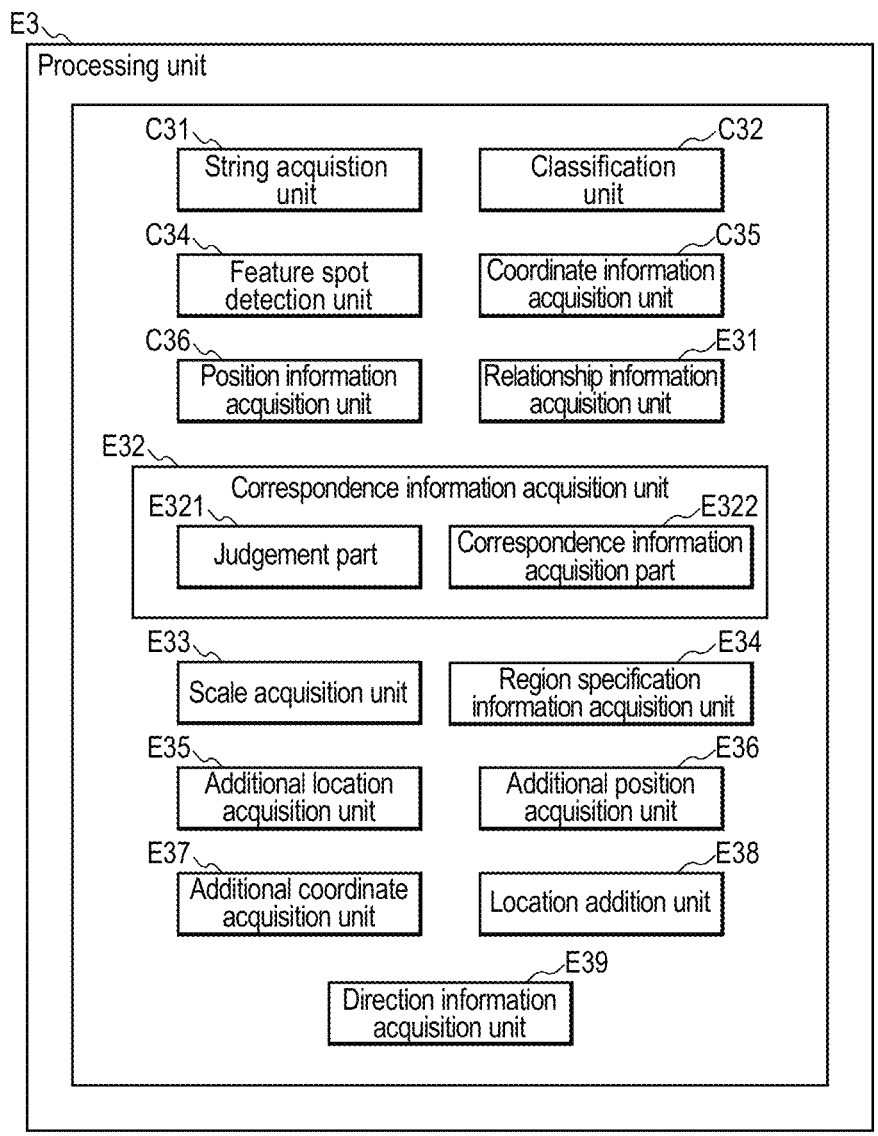
FIG. 20 is a block diagram for a processing unit E3 that is included in the map representation data processing device E according to the same.

FIG. 19 is a block diagram for a map representation data processing device E according to the present embodiment. FIG. 20 is a block diagram for a processing unit E3 that is included in the map representation data processing device E.

The map representation data processing device E includes a storage unit C1, an acceptance unit C2, a processing unit E3, and an output unit E4.

The storage unit C1 includes a location dictionary storage unit C11, a map representation data storage unit C12, an accurate map information storage unit C13, a learner storage unit A12, and a correspondence information storage unit C14. The acceptance unit C2 includes a map representation data acceptance unit C21. The processing unit E3 includes a string acquisition unit C31, a classification unit C32, a feature spot detection unit C34, a coordinate information acquisition unit C35, a position information acquisition unit C36, a relationship information acquisition unit E31, a correspondence information acquisition unit E32, a scale acquisition unit E33, a region specification information acquisition unit E34, an additional location acquisition unit E35, an additional position acquisition unit E36, an additional coordinate acquisition unit E37, a location addition unit E38, and a direction information acquisition unit E39. The correspondence information acquisition unit E32 includes a judging part E321 and a correspondence information acquisition part E322. The output unit E4 includes a correspondence output unit E41, a scale information output unit E42, a region specification information output unit E43, and a direction information output unit E44.

The processing unit E3 performs various kinds of processing. Examples of the various kinds of processing include processing that is performed by the string acquisition unit C31, the classification unit C32, the feature spot detection unit C34, the coordinate information acquisition unit C35, the position information acquisition unit C36, the relationship information acquisition unit E31, the correspondence information acquisition unit E32, the scale acquisition unit E33, the region specification information acquisition unit E34, the additional location acquisition unit E35, the additional position acquisition unit E36, the additional coordinate acquisition unit E37, the location addition unit E38, and the direction information acquisition unit E39.

The relationship information acquisition unit E31 acquires relationship information. Relationship information is information regarding relationship between three or more pieces of correspondence information. The relationship information acquisition unit E31 acquires relationship information, using three or more pieces of correspondence information. Relationship information is, for example, distance relationship information described alter, or angle relationship information described later. Note that correspondence information is a set of coordinate information and position information corresponding to a string acquired by the string acquisition unit C31. Coordinate information corresponding to a string acquired by the string acquisition unit C31 is information acquired by the coordinate information acquisition unit C35. Position information corresponding to a string acquired by the string acquisition unit C31 from map representation data is information acquired by the position information acquisition unit C36. A string typically is the name of a location. A location is, for example, a station, a landscape, a scenic spot, a building, a prefecture, a municipality, an intersection, a park, or the like.

It is preferable that the relationship information acquisition unit E31 acquires relative relationship information between pieces of correspondence information respectively corresponding to two strings of the three or more strings acquired by the string acquisition unit C31, for each set of two strings.

For example, the relationship information acquisition unit E31 acquires distance relationship information, using correspondence information regarding two strings, for each set of two strings. Distance relationship information is information indicating a relationship between a relative distance that is a difference between pieces of coordinate information regarding the two strings and an absolute distance that is a difference between pieces of position information regarding the two strings. Note that the set of two strings is a set of two strings of the three or more strings acquired by the string acquisition unit C31.

Distance relationship information is, for example, MPP. MPP is meters per pixel (m/pixel). When he pieces of correspondence information respectively corresponding to the two strings are correspondence information "coordinate information $1(x_1,y_1)$, position information $1(X_1,Y_1)$" and correspondence information 2 "coordinate information $2(x_2, y_2)$, position information $2(X_2,Y_2)$", MPP="(distance (meters) between position information 1 and position information 2)/(the number of pixels between coordinate information 1 and coordinate information 2). Distance relationship information is, for example, PPM. PPM is "PPM= (the number of pixels between coordinate information 1 and coordinate information 2)/(the distance (meters) between location information 1 and location information 2)". The method of calculating the distance between location information 1 $(X_1,Y_1)$ and location information 2 $(X_2,Y_2)$ and the method of calculating the number of pixels between coordinate information $1(x_1,y_1)$ and coordinate information 2 $(x_2,y_2)$ are well-known techniques, and therefore the descriptions thereof are omitted here.

For example, the relationship information acquisition unit E31 acquires angle relationship information, using correspondence information regarding two strings, for each set of two strings.

Angle relationship information is information that indicates a relative angle and an absolute angle. The relative angle is an angle that can be obtained from coordinate information regarding two strings. The relative angle is the angle of a straight line connecting two pieces of coordinate information to a reference line (for example, the straight line on the lower side of the rectangular map representation data or the straight line on the right side of the rectangular map representation data). The absolute angle is, for example, the angle between the straight line in a reference direction (for example, east or north) and a straight line obtained by connecting pieces of position information regarding two strings.

Angle relationship information is, for example, information regarding the difference between the relative angle and the absolute angle (for example, "the relative angle–the absolute angle", "the absolute angle–the relative angle", or "|the relative angle–the absolute angle|"). Information regarding the difference between the relative angle and the absolute angle may be, for example, (cos (the relative angle–the absolute angle), sin(the relative angle–the absolute angle)), (cos(the absolute angle–the relative angle), sin(the absolute angle–the relative angle)), or the like. Note that information regarding the difference between the relative angle and the absolute angle is referred to as Rotation as appropriate.

The correspondence information acquisition unit E32 only acquires two or more pieces of correspondence information corresponding to relationship information that satisfies a predetermined relationship, of three or more pieces of correspondence information, using three or more pieces of correspondence information.

The correspondence information acquisition unit E32 judges whether or not each of three or more pieces of distance relationship information satisfies a predetermined relationship, excludes a piece of correspondence information corresponding to a piece of distance relationship information that does not satisfy the predetermined relationship from the pieces of correspondence information respectively corresponding to the three or more strings acquired by the string acquisition unit C31, and only acquires the remaining two or more pieces of correspondence information.

The correspondence information acquisition unit E32 judges whether or not each of three or more pieces of angle relationship information satisfies a predetermined relationship, excludes a piece of correspondence information corresponding to a piece of angle relationship information that does not satisfy the predetermined relationship from the pieces of correspondence information respectively corresponding to the three or more strings acquired by the string acquisition unit C31, and only acquires the remaining two or more pieces of correspondence information.

It is preferable that, when both the distance relationship information and the angle relationship information satisfy the predetermined conditions, the correspondence information acquisition unit E32 acquires only two or more pieces of correspondence information corresponding to the distance relationship information and the angle relationship information.

The judging part E321 included in the correspondence information acquisition unit E32 groups the three or more pieces of relationship information acquired by the relationship information acquisition unit E31, and determines a piece of relationship information that is not included in the group. Note that, for example, Hierarchical Agglomerative Clustering [HAC] can be used as an algorithm for clustering pieces of relational information. For more information regarding HAC, see the Internet URLs "http://pub.ist.ac.ati~edels/Papers/1984-J-05-HierarchicalClustering.pdf" and "http://citeseerx.ist.psu.edu/viewdoc/download?doi=10.1.1.299.7703&rep=rep1&type=pdf".

There is no limitation on the algorithm used for clustering the set of pieces of information.

The correspondence information acquisition part E322 excludes a piece of correspondence information corresponding to the piece of relationship information that is not included in the group from the pieces of correspondence information respectively corresponding to the three more strings acquired by the string acquisition unit C31, and only acquires the remaining two or more pieces of correspondence information.

The scale acquisition unit E33 acquires a representative value of distance relationship information from the three or more pieces of relationship information, and acquires scale information regarding map representation data, using the representative value of distance relationship information. The representative value is, for example, a mean value or a median value. For example, when the representative value of the distance relationship information (for example, MPP here) is a, the scale acquisition unit E33 acquires scale information "a", for example.

The region specification information acquisition unit E34 acquires relative vertical distances that are vertical distances between the pieces of coordinate information corresponding to the strings acquired by the string acquisition unit C31 and the four sides of the map representation data, respectively, and acquires region specification information that specifies the range of the map representation data in the real world, using the relative vertical distances and the scale information (for example, MPP). The range in the real world is the range in the accurate map information.

The region specification information acquisition unit E34 calculates, for example, the relative vertical distances between the pieces of coordinate information contained in the two or more correspondence information ultimately acquired by the correspondence information acquisition unit E32 and the sides (the top side, the bottom side, the left side, and the right side) of the map representation data, respectively. Note that the technique for calculating the vertical distance between a point and a straight line is a well-known technique.

Thereafter, the region specification information acquisition unit E34 acquires, for example, the representative value (for example, a median value or an average value) of the two or more relative vertical distances, for each side. Next, the region specification information acquisition unit E34 acquires, for example, position information regarding the location of the representative value of the relative vertical distances for each side. Next, for example, the region specification information acquisition unit E34 acquires, for each side, the latitude or the longitude of the side, through "distance relationship information (MPP)×the representative value of the relative vertical distances".

The additional location acquisition unit E35 acquires location information in the range indicated by the region specification information, from the location dictionary. It is preferable that the additional location acquisition unit E35 acquires two or more pieces of location information in the range indicated by the region specification information from the location dictionary, and acquires a piece of location information by excluding the strings acquired by the string acquisition unit C31, from the acquired pieces of location information. The location dictionary to be used may be a location dictionary that is present in the location dictionary storage unit C11, or a location dictionary that is present in an external device (not shown).

It is also preferable that the additional location acquisition unit E35 acquires location information in the range indicated by region specification information and one or more attribute values of the location information (for example, a station name, whether or not it is a landscape, an intersection name, or the like), and acquires location information that is paired with the one or more attribute values that satisfy the predetermined condition, from the location dictionary.

The additional position acquisition unit E36 acquires position information corresponding to the location information acquired by the additional location acquisition unit E35, from the location dictionary.

The additional coordinate acquisition unit E37 acquires coordinate information corresponding to the position information acquired by the additional position acquisition unit E36. The additional coordinate acquisition unit E37, for example, acquires the difference between position information that is contained in one piece of correspondence information and the position information acquired by the additional position acquisition unit E36, acquires the difference from the coordinate information contained in the one piece of correspondence information, using the difference from the position information and the distance relationship information (MPP), and acquires coordinate information corresponding to the position information acquired by the additional position acquisition unit E36, using the difference between the coordinate information contained in the one correspondence information and the coordinate information.

The location addition unit E38 places the location information (string) acquired by the additional location acquisition unit E35 at the position indicated by the coordinate information acquired by the additional coordinate acquisition unit E37. Note that location information is added on the map representation data.

The direction information acquisition unit E39 acquires the representative value of angle relationship information from three or more pieces of angle relationship information, and acquires direction information that indicates the direction in the map representation data, using the representative value of angle relationship information.

When angle relationship information (in this case, for example, "a relative angle–an absolute angle") is "−30", north in the real world is 30 degrees from the directly upward direction to the direction upward and rightward in the map representation data, and the direction information acquisition unit E39 acquires, for example, direction information "30 degrees". Here, direction information is a clockwise angle from the direction directly upward in the map representation data. The direction information may be a pattern corresponding to the acquired angle.

The output unit E4 outputs various kinds of information. Examples of various kinds of information include correspondence information, scale information, map representation data, accurate map information, and direction information. Here, "output" typically means accumulation on a recording medium, but may be regarded as a concept that includes displaying on a display device, projection with a projector, printing with a printer, sound output, transmission to an external device, delivery of processing results to another processing apparatus or another program, and so on.

The correspondence output unit E41 accumulates the two or more pieces of correspondence information acquired by the correspondence information acquisition unit E32. The correspondence output unit E41 may display the two or more pieces of correspondence information or transmit them to another device.

The scale information output unit E42 outputs the scale information acquired by the scale acquisition unit E33. "Output" here typically means displaying, but may be accumulation in a recording medium, transmission to an external device, or the like.

The region specification information output unit E43 outputs the region specification information acquired by the region specification information acquisition unit E34. "Output" here typically means display, but may be accumulation in a recording medium, transmission to an external device, or the like.

The direction information output unit E44 outputs the direction information acquired by the direction information acquisition unit E39. "Output" here typically means display, but may be accumulation in a recording medium, transmission to an external device, or the like.

The processing unit E3, the string acquisition unit C31, the classification unit C32, the feature spot detection unit C34, the coordinate information acquisition unit C35, the position information acquisition unit C36, the relationship information acquisition unit E31, the correspondence information acquisition unit E32, the scale acquisition unit E33, the region specification information acquisition unit E34, the additional location acquisition unit E35, the additional position acquisition unit E36, the additional coordinate acquisition unit E37, the location addition unit E38, and the direction information acquisition unit E39 typically are realized using an MPU, a memory, and so on. The processing procedures performed by the processing unit E3 typically are realized using software, and the software is recorded on a recording medium such as a ROM. However, such processing procedures may be realized using hardware (a dedicated circuit).

The output unit E4, the correspondence output unit E41, the scale information output unit E42, the region specification information output unit E42, and the direction information output unit E44 may be regarded as including or not including an output device such as a display or a speaker. The output unit E4 and so on can be realized using the driver software of the output device, the driver software of the output device and the output device, or the like.

Figure 21:
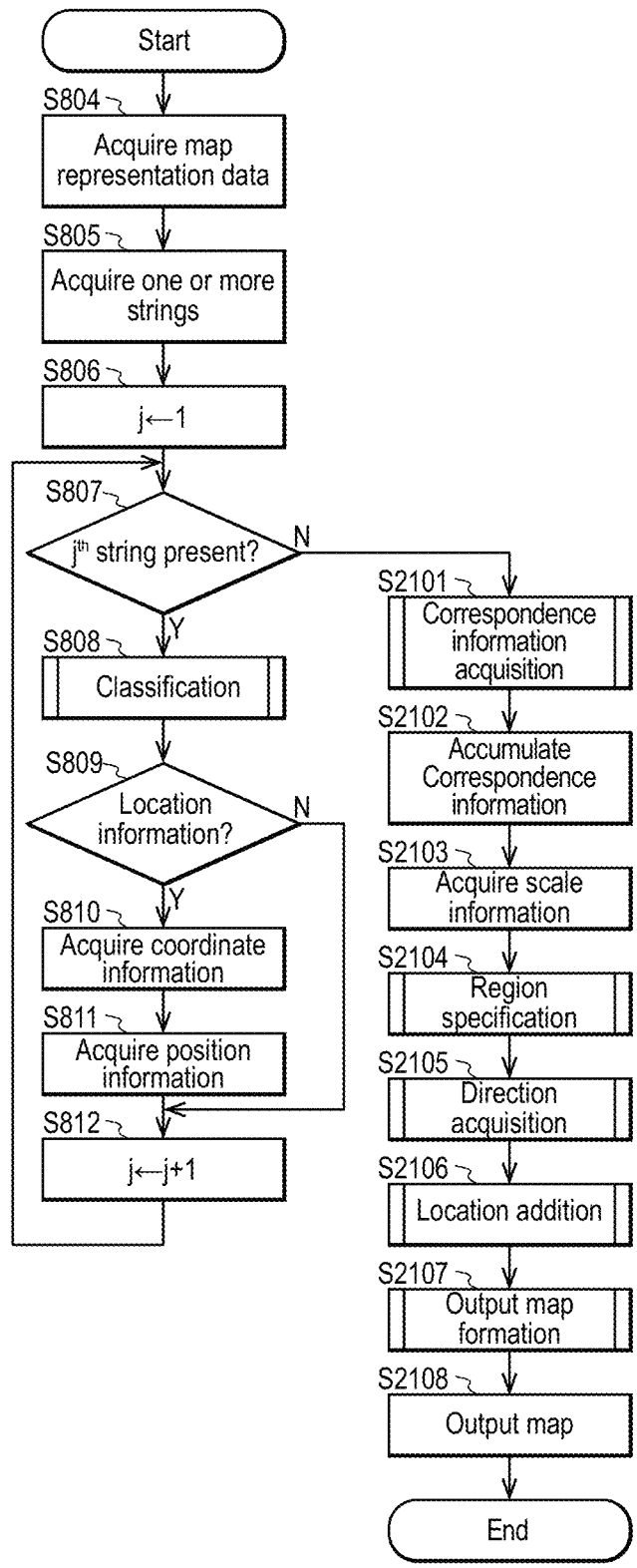
FIG. 21 is a flowchart illustrating examples of operations of the map representation data processing device E according to the same.

Next, examples of operations of the map representation data processing device E will be described with reference to the flowchart shown in FIG. 21. In the flowchart in FIG. 21, descriptions of the same steps as in the flowchart in FIG. 8 are omitted. Note that the flowchart in FIG. 21 has steps S804 to S812.

(Step S2101) The processing unit E3 performs correspondence information acquisition processing, using the map representation data acquired in step S804. An example of correspondence information acquisition processing will be described with reference to the flowchart shown in FIG. 22. Note that correspondence information acquisition processing is processing that is performed to acquire one or more pieces of correspondence information that are to be accumulated. The map representation data to be processed typically is map representation data that is in the map representation data storage unit C12, but may be map representation data that has been received from an external device.

(Step S2102) The correspondence output unit E41 accumulates the one or more pieces of correspondence information acquired in step S2101. Note that the pieces of correspondence information are accumulated in the storage unit C1, for example, but may be in another device. The correspondence output unit E41 accumulates the one or more pieces of correspondence information acquired in step S2101, in association with the map representation data acquired in step S804.

(Step S2103) The scale acquisition unit E33 acquires scale information, using the representative value (for example, MPP) of the distance relationship information acquired in step S2101, and accumulates the scale information in association with the map representation data acquired in step S804. Note that pieces of scale information are accumulated in the storage unit C1, for example, but may be in another device.

(Step S2104) The region specification information acquisition unit E34 performs region specification processing. An example of region specification processing will be described with reference to the flowchart shown in FIG. 25. Note that region specification processing is processing that is performed to acquire information indicating a region in the real world corresponding to the map region indicated by the map representation data.

(Step S2105) The direction information acquisition unit E39 performs direction information acquisition processing. An example of direction information acquisition processing will be described with reference to the flowchart shown in FIG. 26. Note that direction information acquisition processing is processing that is performed to acquire information regarding a direction (may be referred to as an inclination) in the map representation data.

(Step S2106) The additional location acquisition unit E35 and so on performs location addition processing. An example of location addition processing will be described with reference to the flowchart shown in FIG. 27. Location addition processing is processing that is performed to add location information (strings) not shown on the map representation data.

(Step S2107) The processing unit E3 performs processing to form a map that is to be output. An example of such output map forming processing will be described with reference to the flowchart shown in FIG. 28.

(Step S2108) The output unit E4 outputs the map representation data formed in step S2107 and the accurate map information formed in step S2107. Processing is terminated. Here, the output unit E4 may output only one map of either map representation data or accurate map information.

Next, an example of the correspondence information acquisition processing in step S2101 will be described with reference to the flowchart shown in FIG. 22.

(Step S2201) The correspondence information acquisition unit E31 performs distance relationship information acquisition processing. An example of the distance relationship information acquisition processing will be described with reference to the flowchart shown in FIG. 23. Note that distance correspondence information acquisition processing is processing that is performed to acquire one or more pieces of distance relationship information for a set of two or more pieces of correspondence information.

(Step S2202) The judging part E321 groups the three more pieces of distance relationship information acquired in step S2201. Thereafter, the judging part E321 acquires one or more groups for the pieces of distance relationship information. Note that the above-described HAC is used for grouping, for example.

(Step S2203) The correspondence information acquisition part E322 substitutes 1 for the counter i.

(Step S2204) The correspondence information acquisition part E322 judges whether or not the $i^{th}$ group acquired in step S2202 is present. If the $i^{th}$ group is present, processing proceeds to step S2205, and if the $i^{th}$ group is not present, processing returns to higher level processing.

(Step S2205) The correspondence information acquisition part E322 judges whether or not the $i^{th}$ group satisfies a predetermined condition regarding the number of locations in the group. If the condition is satisfied, processing proceeds to step S2206, and if the condition is not satisfied, processing proceeds to step S2209. Note that the predetermined condition is, for example, that the number of locations (which may also be referred to as strings) corresponding to the $i^{th}$ group is no less than a threshold value, the number of locations corresponding to the $i^{th}$ group is greater than the threshold value, the percentage of locations corresponding to the $i^{th}$ group is no less than the threshold value, the percentage of locations corresponding to the $i^{th}$ group is greater than the threshold value, or the like. Note that the percentage is "the number of locations corresponding to the $i^{th}$ group/the number of locations belonging to one of the groups".

(Step S2206) The correspondence information acquisition part E322 acquires correspondence information regarding two or more locations corresponding to the $i^{th}$ group.

(Step S2207) The relationship information acquisition unit E31 performs angle relationship information acquisition processing on the correspondence information regarding the two or more locations acquired in step S2206. An example of the angle relationship information acquisition processing will be described with reference to the flowchart shown in FIG. 24.

(Step S2208) The judging part E321 groups the three more pieces of angle relationship information acquired in step S2207. Thereafter, the judging part E321 acquires one or more groups regarding the pieces of angle relationship information. Note that the above-described HAC is used for grouping, for example.

(Step S2209) The correspondence information acquisition part E322 substitutes 1 for the counter j.

(Step S2210) The correspondence information acquisition part E322 judges whether or not the $j^{th}$ group is present in the groups acquired in step S2208. If the $j^{th}$ group is present, processing proceeds to step S2211, and if the $j^{th}$ group is not present, processing proceeds to step S2214.

(Step S2211) The correspondence information acquisition part E322 judges whether or not the $j^{th}$ group satisfies a predetermined condition regarding the number of locations in the group. If the condition is satisfied, processing proceeds to step S2212, and if the condition is not satisfied, processing proceeds to step S2213. Note that the predetermined condition is, for example, that the number of locations (which may also be referred to as strings) corresponding to the $j^{th}$ group is no less than a threshold value, the number of locations corresponding to the $j^{th}$ group is greater than the threshold value, the percentage of locations corresponding to the $j^{th}$ group is no less than the threshold value, the percentage of locations corresponding to the $j^{th}$ group is greater than the threshold value, or the like. Note that the percentage is "the number of locations corresponding to the $j^{th}$ group/the number of locations belonging to one of the groups".

(Step S2212) The correspondence information acquisition part E322 acquires correspondence information regarding two or more locations corresponding to the $j^{th}$ group.

(Step S2213) The correspondence information acquisition part E322 increments the counter j by 1. Processing returns to step S2210.

(Step S2214) The correspondence information acquisition part E322 increments the counter i by 1. Processing returns to step S2204.

Figure 22:
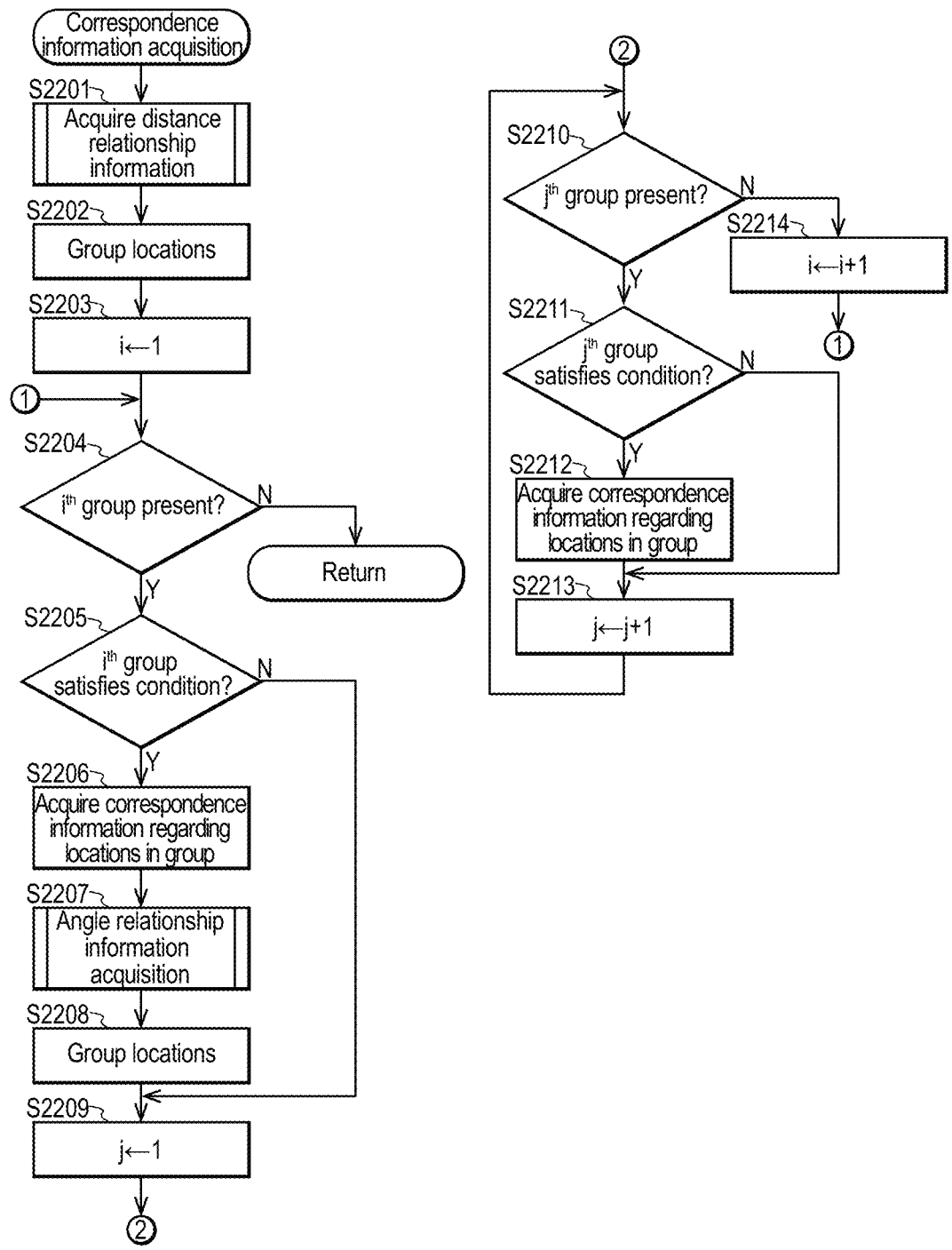
FIG. 22 is a flowchart illustrating an example of correspondence information acquisition processing according to the same.

Note that, in the flowchart in FIG. 22, the correspondence information acquisition part E322 may select only one group that includes the largest number of locations when multiple groups are detected in step S2202 or step S2208.

Figure 23:
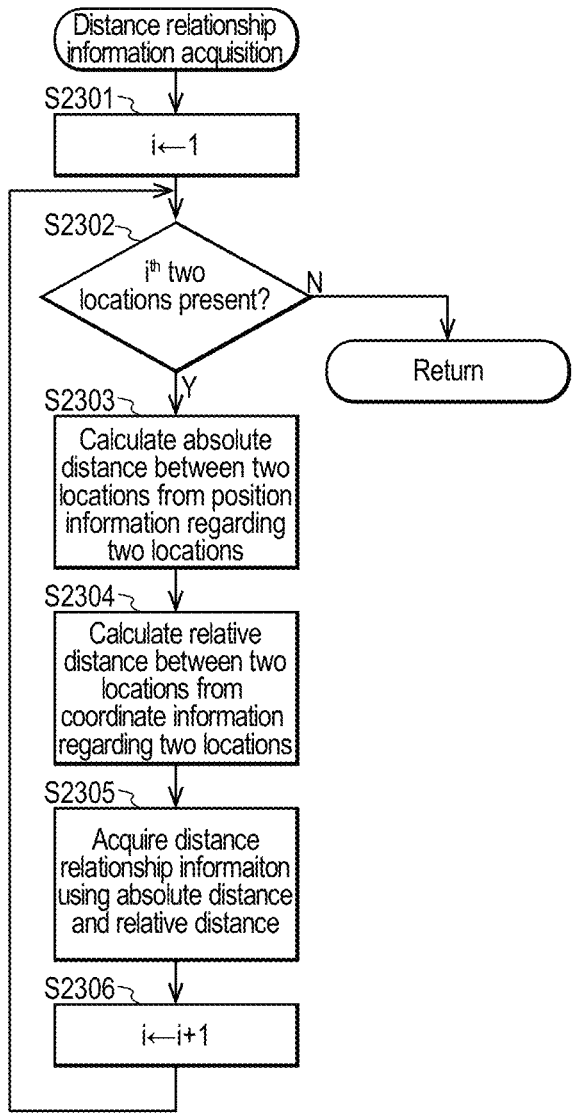
FIG. 23 is a flowchart illustrating an example of distance relationship information acquisition processing according to the same.

Next, an example of the distance relationship information acquisition processing in step S2201 will be described with reference to the flowchart shown in FIG. 23.

(Step S2301) The relationship information acquisition unit E31 substitutes 1 for the counter i.

(Step S2302) The relationship information acquisition unit E31 judges whether or not a set of the $i^{th}$ two locations is present in the three or more locations that are to be processed. If a set of the $i^{th}$ two locations is present, processing proceeds to step S2303, and otherwise processing returns to higher level processing.

(Step S2303) The relationship information acquisition unit E31 acquires pieces of position information regarding the two locations in the $i^{th}$ set, and calculates an absolute distance between the two locations from the two pieces of position information.

(Step S2304) The relationship information acquisition unit E31 acquires pieces of coordinate information regarding the two locations in the $i^{th}$ set, and calculates a relative distance between the two locations from the two pieces of coordinate information.

(Step S2305) The relationship information acquisition unit E31 acquires distance relationship information (for example, MPP), using the absolute distance calculated in step S2303 and the relative distance calculated in step S2304, and temporarily accumulates the distance relationship information in association with information regarding the $i^{th}$ set.

(Step S2306) The relationship information acquisition unit E31 increments the counter i by 1. Processing returns to step S2302.

Figure 24:
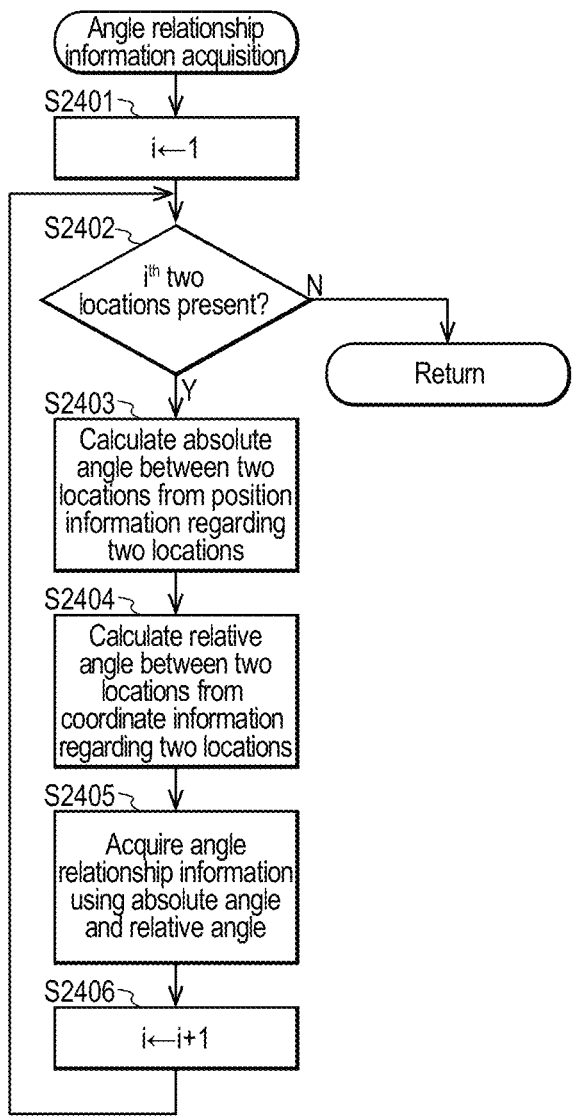
FIG. 24 is a flowchart illustrating an example of angle relationship information acquisition processing according to the same.

Next, an example of the angle relationship information acquisition processing in step S2207 will be described with reference to the flowchart shown in FIG. 24.

(Step S2401) The relationship information acquisition unit E31 substitutes 1 for the counter i.

(Step S2402) The relationship information acquisition unit E31 judges whether or not a set of the $i^{th}$ two locations is present in the three or more locations that are to be processed. If a set of the $i^{th}$ two locations is present, processing proceeds to step S2403, and otherwise processing returns to higher level processing.

(Step S2403) The relationship information acquisition unit E31 acquires pieces of position information regarding the two locations in the $i^{th}$ set, and calculates an absolute angle between the two locations from the two pieces of position information.

(Step S2404) The relationship information acquisition unit E31 acquires pieces of coordinate information regarding the two locations in the $i^{th}$ set, and calculates a relative angle between the two locations from the two pieces of coordinate information.

(Step S2405) The relationship information acquisition unit E31 acquires angle relationship information (for example, Rotation), using the absolute angle calculated in step S2403 and the relative angle calculated in step S2404, and temporarily accumulates the angle relationship information in association with information regarding the $i^{th}$ set.

(Step S2406) The relationship information acquisition unit E31 increments the counter i by 1. Processing returns to step S2402.

Figure 25:
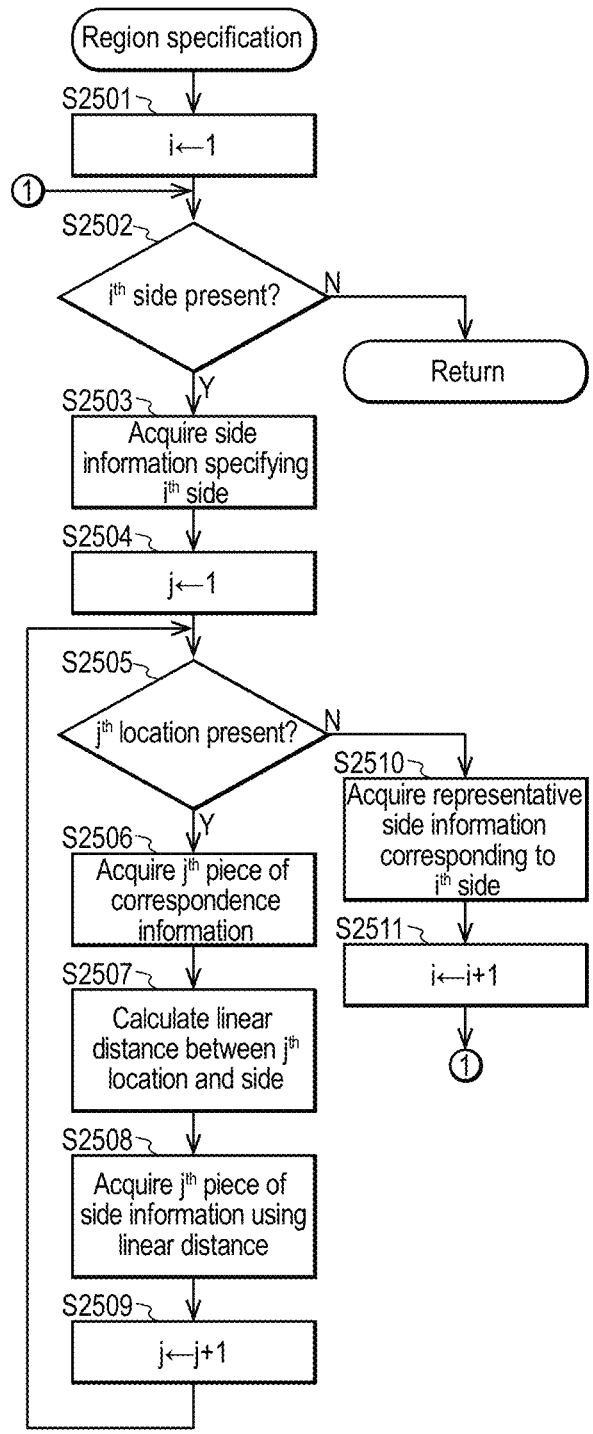
FIG. 25 is a flowchart illustrating an example of region specification processing according to the same.

Next, an example of the region specification processing in step S2104 will be described with reference to the flowchart shown in FIG. 25.

(Step S2501) The relationship information acquisition unit E34 substitutes 1 for the counter i.

(Step S2502) The region specification information acquisition unit E34 judges whether or not the $i^{th}$ side that is to be processed is present. If the $i^{th}$ side is present, processing proceeds to step S2503, and otherwise processing returns to higher level processing. Note that map representation data typically is a rectangle, and the sides to be processed typically are four sides, namely the top side, the bottom side, the left side, and the right side.

(Step S2503) The region specification information acquisition unit E34 acquires side information that specifies the $i^{th}$ side of the map representation data. Side information is, for example, the coordinates $(x_1, y_1)$ and $(x_2, y_2)$ of two end points that form a side. Also, for example, the region specification information acquisition unit E34 acquires coordinate information regarding the two end points of a side of a map representation data file, assuming that the entire map representation data (typically an image file) is map data. The region specification information acquisition unit E34 may, for example, perform contour extraction processing on the map representation data and acquire information regarding the contour lines between regions other than the map (for example, blank regions) and the region of the map. The processing performed to acquire information regarding such contour lines is processing that is performed to acquire side information.

(Step S2504) The region specification information acquisition unit E34 substitutes 1 for the counter j.

(Step S2505) The region specification information acquisition unit E34 judges whether or not the $j^{th}$ piece of target information that is to be processed is present. If the $j^{th}$ target information is present, processing proceeds to step S2506, and if the $j^{th}$ target information is not present, processing proceeds to step S2510. Note that the target information that is to be processed corresponds to a location.

(Step S2506) The region specification information acquisition unit E34 acquires the $j^{th}$ piece of target information that is to be processed.

(Step S2507) The region specification information acquisition unit E34 calculates the linear distance (for example, the number of pixels) in the map representation data between the $j^{th}$ location and the $i^{th}$ side, using the coordinate information contained in the $j^{th}$ piece of target information and the side information regarding the $i^{th}$ side.

(Step S2508) The region specification information acquisition unit E34 acquires the position information regarding the two end points of the $i^{th}$ side, using the position information contained in the $j^{th}$ target information, the linear distance calculated in step S2507, and the representative value (for example, MPP) of the distance relationship information. Note that position information regarding such two end points is referred to as side information.

(Step S2509) The region specification information acquisition unit E34 increments the counter j by one. Processing returns to step S2505.

(Step S2510) The region specification information acquisition unit E34 acquires the representative value (for example, a median value or an average value) of the two or more pieces of side information regarding the $i^{th}$ side. Note that such a representative value is representative side information. Representative side information is, for example, information regarding the middle line of the two or more pieces of side information. Representative edge information is, for example, the average value of the two end points contained in each of the two or more pieces of side information. For example, when the two pieces of side information are side information 1 $(x_{11},y_{11})(x_{12},y_{12})$ and side information 2 $(x_{21},y_{21})(x_{22},y_{22})$, the representative side information regarding the average value is $((x_{11}+x_{21/2}),(y_{11}-y_{21}/2))((x_{12}+x_{22}/2),(y_{12}+y_{22}/2))$.

(Step S2511) The region specification information acquisition unit E34 increments the counter i by one. Processing returns to step S2502.

Figure 26:
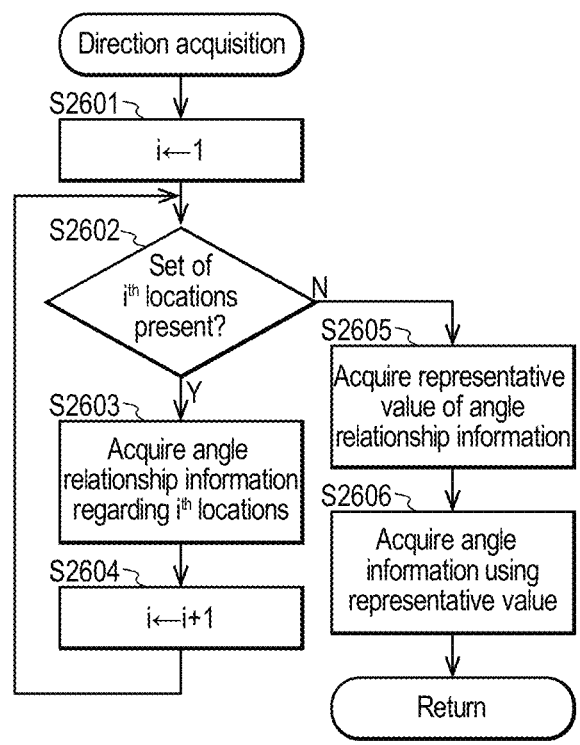
FIG. 26 is a flowchart illustrating an example of direction information acquisition processing according to the same.

Next, an example of the direction information acquisition processing in step S2105 will be described with reference to the flowchart shown in FIG. 26.

(Step S2601) The direction information acquisition unit E39 substitutes 1 for the counter i.

(Step S2602) The direction information acquisition unit E39 judges whether or not a set of the $i^{th}$ locations is present. If a set of the $i^{th}$ locations is present, processing proceeds to step S2603, and if a set of the $i^{th}$ locations is not present, processing proceeds to step S2605.

(Step S2603) The direction information acquisition unit E39 acquires angle relationship information regarding the $i^{th}$ locations.

(Step S2604) The direction information acquisition unit E39 increments the counter i by 1. Processing returns to step S2602.

(Step S2605) The direction information acquisition unit E39 acquires the representative value (for example, the average value or the median value) of the two or more pieces of angle relationship information acquired in step S2603.

(Step S2606) The direction information acquisition unit E39 acquires angle information, using the representative value of the pieces of angle relationship information acquired in step S2605. Processing returns to higher level processing. Note that the direction information acquisition unit E39 acquires angle information, using a calculation formula "angle information=f (the representative value of angle relationship information)". Note that the calculation formula is, for example, "angle information=−1×(the representative value of angle relationship information)".

Next, an example of the location addition processing in step S2106 will be described with reference to the flowchart shown in FIG. 27.

(Step S2701) The additional location acquisition unit E35 substitutes 1 for the counter i.

(Step S2702) The additional location acquisition unit E35 judges whether or not the $i^{th}$ piece of location position information is present in the location dictionary. If the $i^{th}$ piece of location position information is present, the processing proceeds to step S2703, and if the $i^{th}$ piece of location position information is not present, processing returns to higher level processing.

(Step S2703) The additional position acquisition unit E36 acquires the position information contained in the $i^{th}$ piece of location position information from the location dictionary.

(Step S2704) The additional location acquisition unit E35 judges whether or not the position information acquired in step S2703 is within the range of the region indicated by the region specification information. If the position information is within the range of the region, processing proceeds to step S2705, and if the position information is not within the range of the region, processing proceeds to step S2711. Note that the processing performed to determine whether or not a piece of position information is position information regarding a location in the region when region specification information that indicates the range of the region is present is a well-known technique.

(Step S2705) The additional coordinate acquisition unit E37 acquires coordinate information corresponding to the position information acquired in step S2703.

(Step S2706) The additional position acquisition unit E35 acquires location information that is contained in the $i^{th}$ piece of location position information, from the location dictionary.

(Step S2707) The additional location acquisition unit E35 judges whether or not to place the location information acquired in step S2706 on the map representation data. If the location information is to be placed, processing proceeds to step S2708, and if the location information is not to be placed, processing proceeds to step S2709. Note that the additional location acquisition unit E35 judges that the location information is to be placed when, for example, one or more attribute values corresponding to the location information acquired in step S2706 satisfy a predetermined condition.

(Step S2708) The location addition unit E38 places the strings of the location information acquired in S2706 at the position that is on the map representation data and is indicated by the coordinate information acquired in step S2705.

(Step S2709) The correspondence information acquisition unit E32 forms correspondence information that contains the correspondence information acquired in step S2703 and the coordinate information acquired in step S2705.

(Step S2710) The correspondence output unit E41 accumulates the correspondence information acquired in step S2709.

(Step S2711) The counter i is incremented by 1. Processing returns to step S2702.

Next, an example of the output map forming processing in step S2107 will be described with reference to the flowchart shown in FIG. 28.

(Step S2801) The output unit E4 acquires map representation data that is to be processed. It is preferable that the map representation data here is data to which locations have been added through the above-described location addition processing.

(Step S2802) The processing unit E3 acquires current position information. Note that the processing unit E3 may include the current position information acquisition unit D31.

(Step S2803) The processing unit E3 acquires coordinate information corresponding to the current position information acquired in step S2802, using two or more pieces of correspondence information. Note that processing unit E3 may include the coordinate information acquisition unit D32.

(Step S2804) The processing unit E3 forms current position-added map representation data that is map representation data on which the position indicated by the coordinate information acquired in step S2803 is explicitly indicated. Note that the processing unit E3 may include the data forming unit D33.

(Step S2805) The processing unit E3 acquires the region specification information acquired through the above-described region specification processing.

(Step S2806) The processing unit E3 acquires accurate map information that includes the region indicated by the region specification information acquired in step S2805.

(Step S2807) The processing unit E3 forms accurate map information that explicitly indicates the range of the region indicated by the region specification information. Processing returns to higher level processing.

Figure 28:
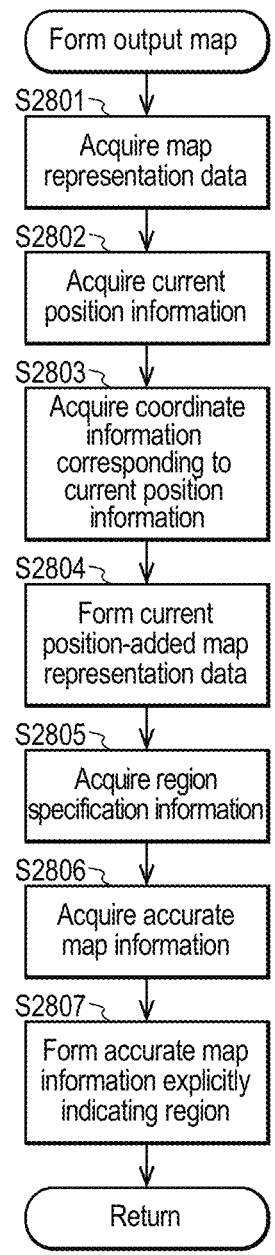
FIG. 28 is a flowchart illustrating an example of output map forming processing according to the same.

Note that, in the flowchart in FIG. 28, direction information and scale information may be added to the current position-added map representation data.

The following describes examples of specific operations of the map representation data processing device E according to the present embodiment.

Figure 29:
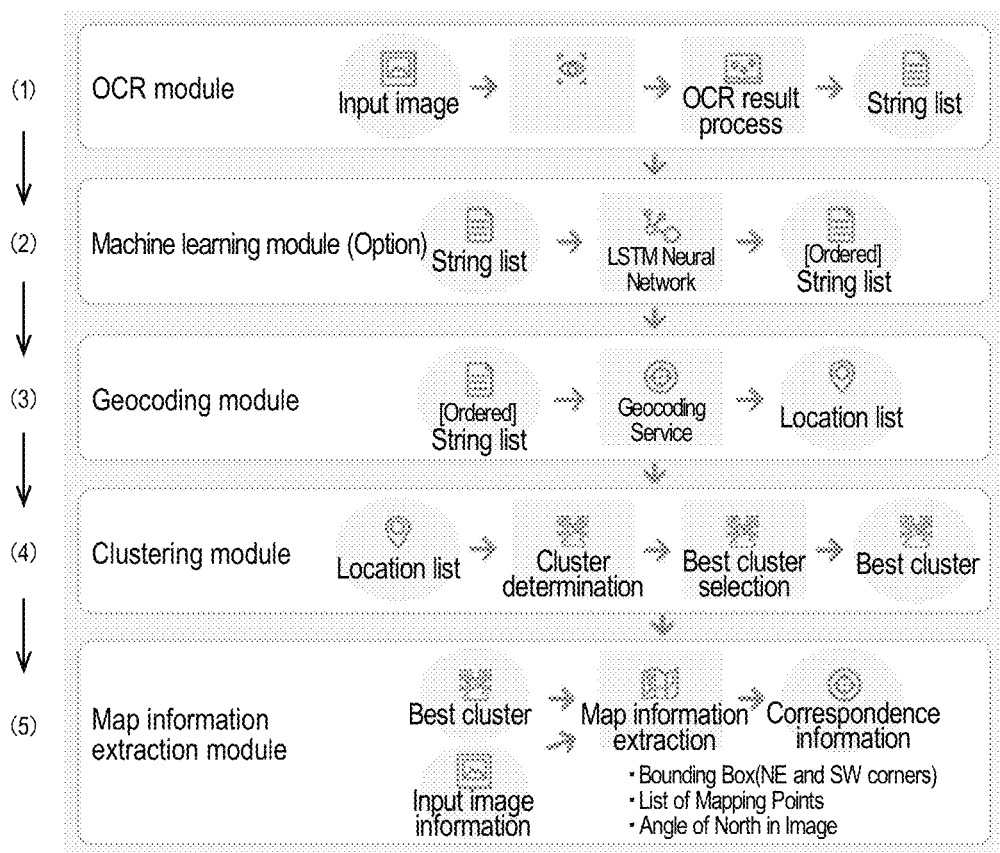
FIG. 29 is a diagram showing a specific example of processing that is performed by the map representation data processing device E according to the same.

In these specific examples, the map representation data processing device E performs the processing shown in FIG. 29. Specifically, the map representation data processing unit E sequentially performs (1) an operation through an OCR module, (2) an operation through a machine learning module, (3) an operation through a geocoding module, (4) an operation through a clustering module, and (5) an operation through a map information extraction module. Note that the processing in (2) is an option in FIG. 29.

Figure 30:
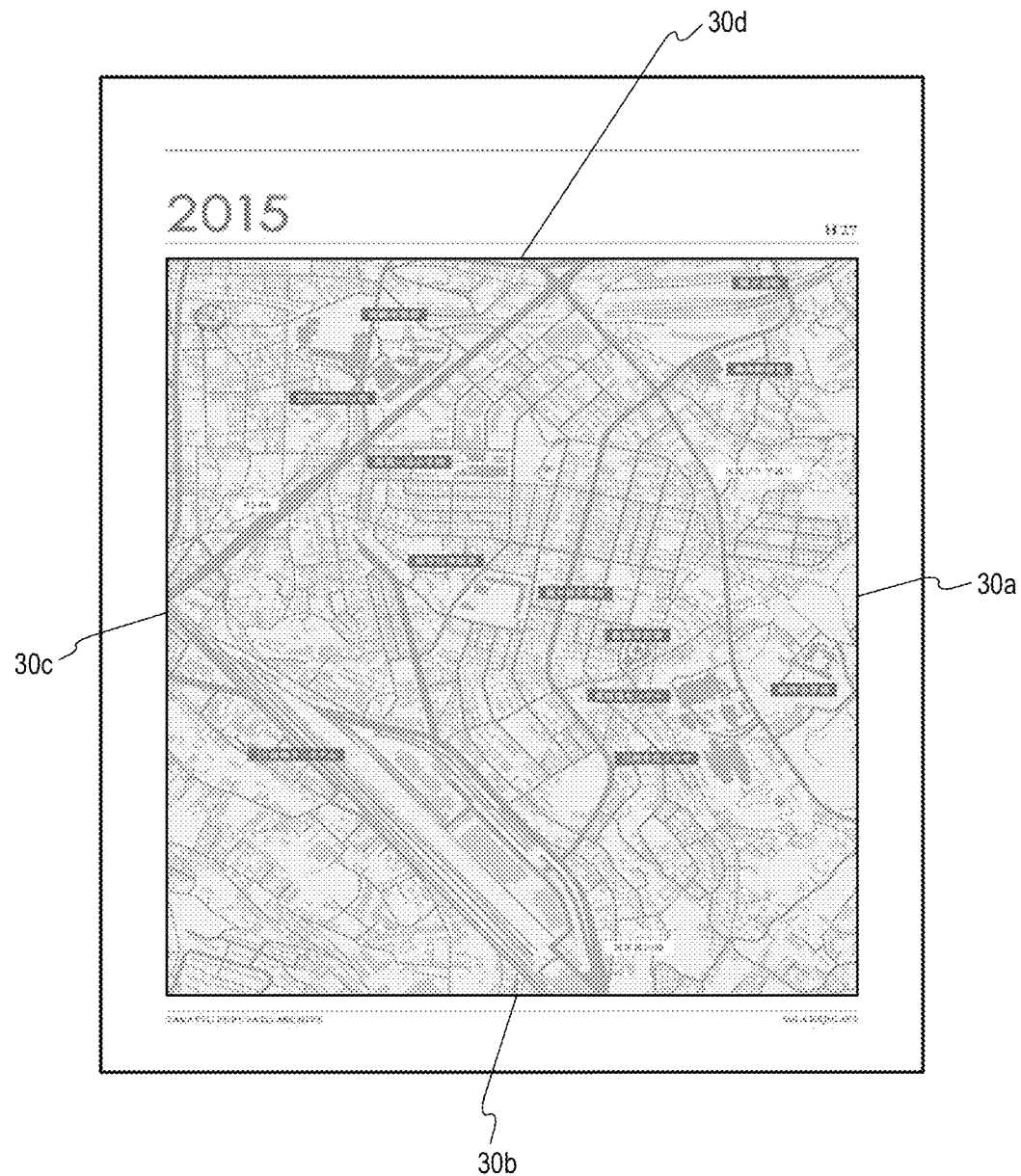
FIG. 30 is a diagram showing an example of map representation data according to the same.

Now, it is assumed that the map representation data shown in FIG. 30 is stored in the map representation data storage unit C12. Note that map representation data is referred to as an input image when necessary.

In such a situation, it is assumed that the map representation data acceptance unit C21 reads out the input image from the map representation data storage unit C12.

It is assumed that the string acquisition unit C31 has performed character recognition processing (OCR) on an input image, and has acquired a list of strings, namely "Takatsu Post Office", "Kajigaya Station", "2015", "Kawasaki Shimin Plaza", "Toranomon Hospital Branch", and "Cargo Terminal".

Also, the coordinate information acquisition unit C35 acquires coordinate information regarding each of the strings acquired by the string acquisition unit C31. This coordinate information is the relative coordinates (x,y) in the input image. The coordinate information acquisition unit C35 acquires coordinate information regarding the center of gravity of the region in which the strings are arranged, for example.

Next, the classification unit C32 judges whether or not each string acquired by the string acquisition unit C31 is location information, using a machine learning technique (LSTM Neural Network in this example), and judges that "2015" is not location information, and writes a location information flag "−1". Through the above-described processing, the information shown in FIG. 31 can be acquired, for example. Note that the location information flag is a flag that is used to determine whether or not a string is location information.

Next, the position information acquisition unit C36 searches the location dictionary, using the strings "Takatsu Post Office", "Kajigaya Station", "Kawasaki Shimin Plaza", "Toranomon Hospital Branch", and "Cargo Terminal" as keys, to acquire pieces of position information (latitude, longitude) respectively corresponding to the strings. Thus, the information shown in FIG. 32 are acquired, for example.

Figure 33:
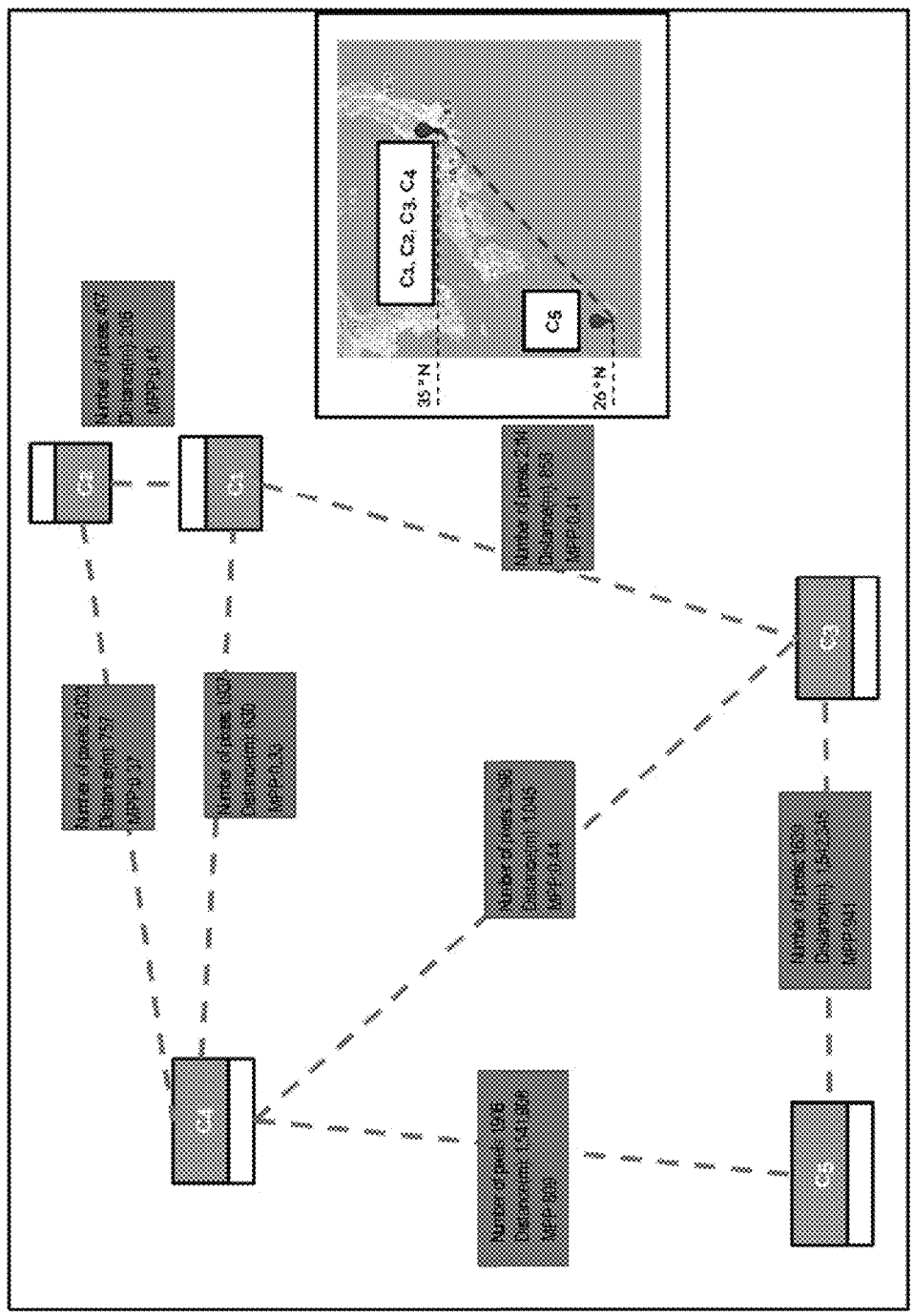
FIG. 33 is a diagram showing an image of information that is acquired by the map representation data processing device E according to the same in the middle of processing.
Figure 34:
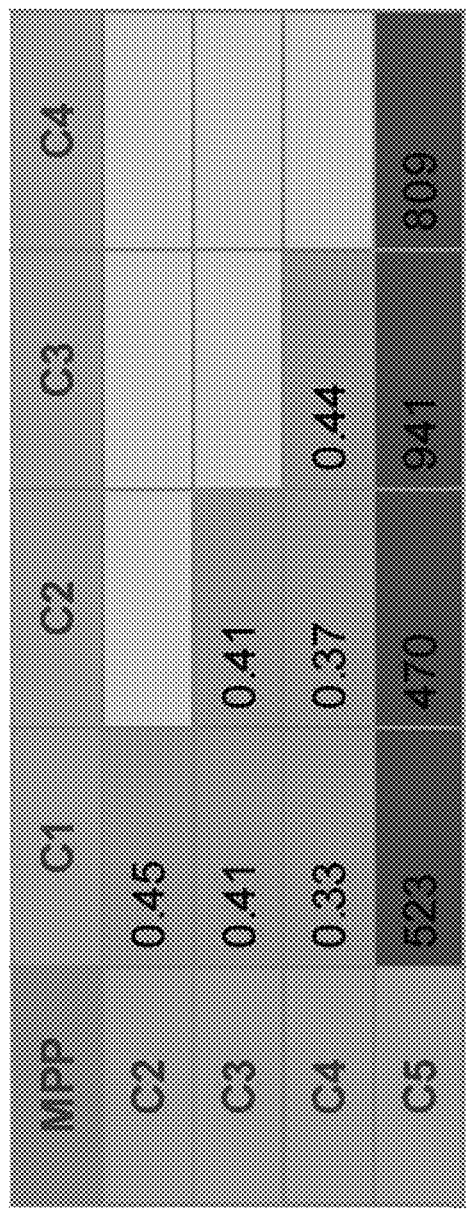
FIG. 34 is a diagram showing an example of information that is acquired by the map representation data processing device E according to the same in the middle of processing.

Next, the correspondence information acquisition unit E31 performs inspection processing using distance relationship information, as described below. That is to say, the relationship information acquisition unit E31 calculates the relative distance (the number of pixels in this example) that is the difference in coordinate information between the locations that belong to pairs of locations "C1-C2", "C1-C3", "C2-C4", "C3-C4", "C3-C5", and "C4-C5" of the locations C1 "Takatsu Post Office", C2 "Kajigaya Station", C3 "Kawasaki Shimin Plaza", C4 "Toranomon Hospital Branch", and C5 "Cargo Terminal", from the coordinate information of each location. Also, the relationship information acquisition unit E31 calculates the absolute distance (meters in this example) that is the difference in position information between the locations that belong to the pairs of locations "C1-C2", "C1-C3", "C2-C4", "C3-C4", "C3-C5", and "C4-C5", from the position information of each location. Thereafter, the relationship information acquisition unit E31 calculates the distance relationship information (MPP in this example) for each pair of two locations, using the relative distance and the absolute distance through "absolute distance/relative distance" (see FIG. 33). As a result of such processing, the distance relationship information table shown in FIG. 34 is acquired.

next, the correspondence information acquisition unit E32 performs clustering on the distance relationship information in FIG. 34 to divide it into a group consisting of "0.45", "0.41", "0.33", "0.41", "0.37", and "0.44", and a group consisting of "523", "470", "941", and "809". Thereafter, the correspondence information acquisition unit E32 acquires location identifiers "C1", "C2", "C3", and "C4" corresponding to the group consisting of "0.45", "0.41", "0.33", "0.41", "0.37", and "0.44", and a location identifier "C5" corresponding to the group consisting of "523", "470", "941", and "809".

Figure 35:
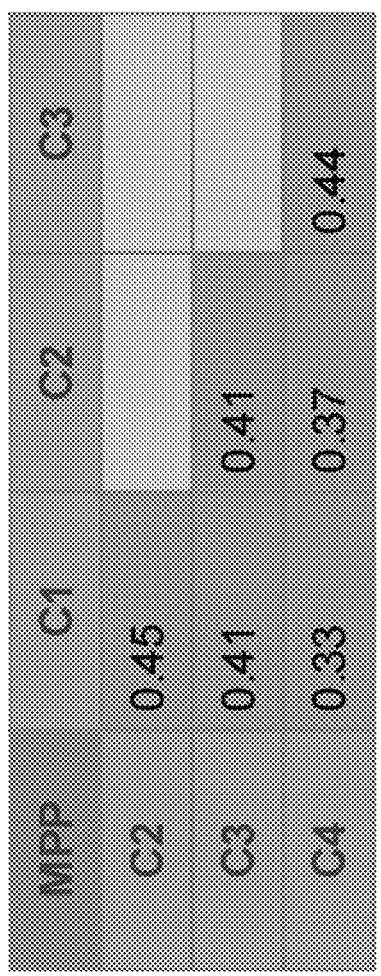
FIG. 35 is a diagram showing an example of information that is acquired by the map representation data processing device E according to the same in the middle of processing.

Thereafter, the correspondence information acquisition unit E32 selects the location identifiers of the group for which the number of location identifiers is large enough to satisfy a predetermined condition. Here, the predetermined condition is, for example, "the number of location identifiers is the largest", "the number of location identifiers is no less than a threshold value (3, for example)", "the number of location identifiers is greater than a threshold value (5, for example)", or the like. Thereafter, the correspondence information acquisition unit E32 acquires the location identifiers "C1", "C2", "C3", and "C4". That is to say, the correspondence information acquisition unit E32 selects "Takatsu Post Office", "Kajigaya Station", "Kawasaki Shimin Plaza", and "Toranomon Hospital Branch", and excludes (deletes) "Cargo Terminal". Through the above-described processing, the distance relationship information table shown in FIG. 35 is acquired. That is to say, as a result of the inspection processing performed using distance relationship information, "Cargo Terminal" is excluded.

Figure 36:
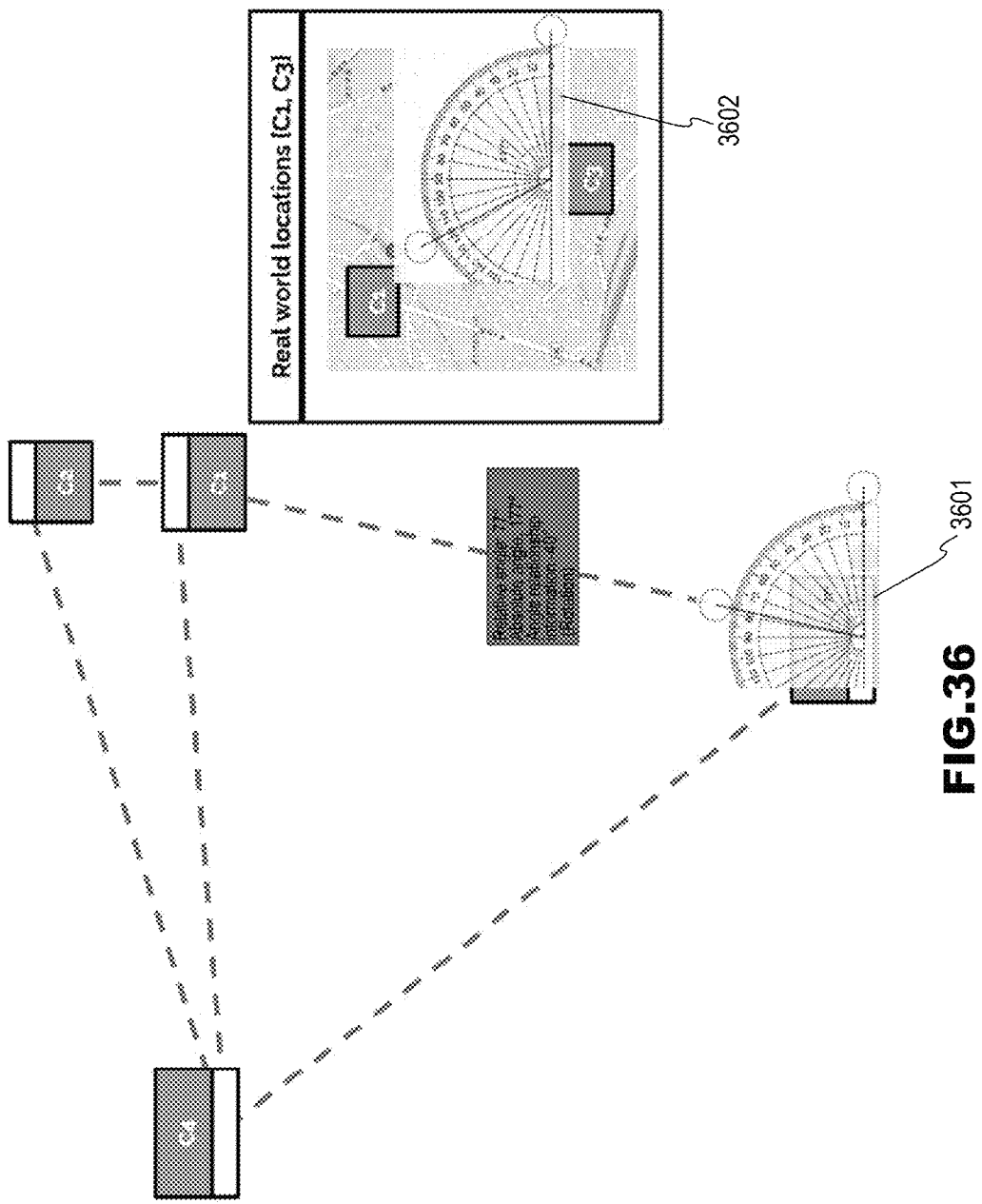
FIG. 36 is a diagram showing an image of information that is acquired by the map representation data processing device E according to the same in the middle of processing.

Next, the correspondence information acquisition unit E31 performs inspection processing using angle relationship information, as described below. That is to say, the relationship information acquisition unit E31 calculates the relative angle and the absolute angle between the locations that belong to pairs of locations "C1-C2", "C1-C3", "C2-C4", and "C3-C4", of the locations C1 "Takatsu Post Office", C2 "Kajigaya Station", C3 "Kawasaki Shimin Plaza", and C4 "Toranomon Hospital Branch". Note that the relationship information acquisition unit E31 uses coordinate information regarding two locations that constitute a pair to calculate the relative angle between the two locations. Also, the relationship information acquisition unit E31 uses coordinate information regarding two locations that constitute a pair to calculate the absolute angle between the two locations. 3601 in FIG. 36 indicates an image of the relative angle (an angle with respect to the base in a rectangular input image) between C1 and C3. 3602 in FIG. 36 indicates an image of the absolute angle (an angle with respect to the east-west direction in the real world) between C1 and C3. Thereafter, the relationship information acquisition unit E31 calculates angle relationship information (Rotation) using the relative angle and the absolute angle. Here, the relationship information acquisition unit E31 calculates angle relationship information through "angle relationship information=the relative angle−the absolute angle".

Figure 37:
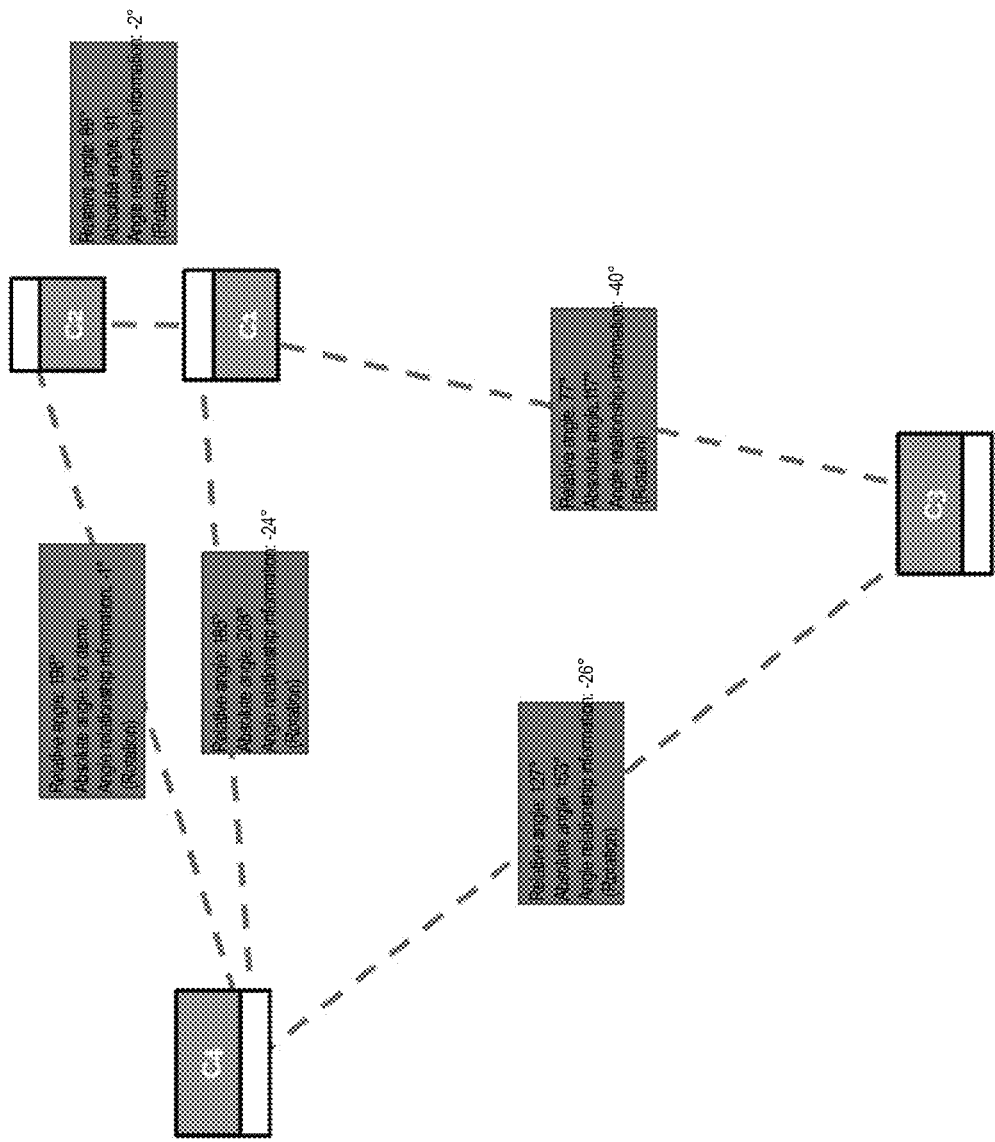
FIG. 37 is a diagram showing an image of information that is acquired by the map representation data processing device E according to the same in the middle of processing.
Figure 38:
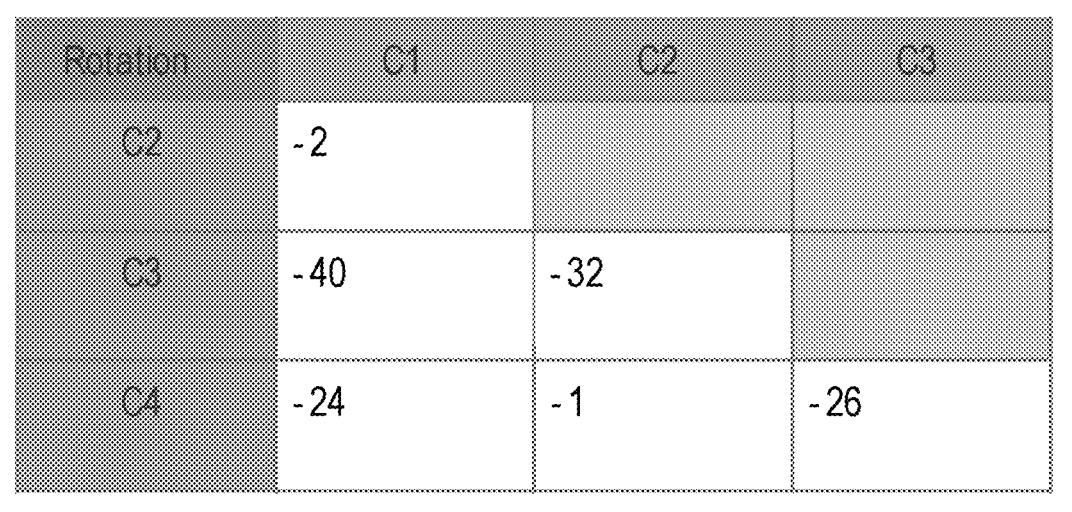

Through the above-described processing, the relationship information acquisition unit E31 acquires the information shown in FIG. 37. FIG. 38 shows a table formed from the information shown in FIG. 37. The relationship information acquisition unit E31 calculates (cos(angle relationship information),sin(angle relationship information)) from the angle relationship information in FIG. 38, and calculates vector data for each pair of locations (see FIG. 39). Note that vector data may be considered as angle relationship information.

Next, the correspondence information acquisition unit E32 performs clustering on the vectors shown in FIG. 39, to acquire a group 1 "(cos(−2),sin(−2)) (cos(−1),sin(−2))", and a group 2 "(cos(−40),sin(−40)) (cos(−24),sin(−24)) (cos(−32),sin(−32)) (cos(−26),sin(−26))". Thereafter, the correspondence information acquisition unit E32 acquires the location identifier "C2" corresponding to the group 1 and the location identifiers "C1", "C3", and "C4" corresponding to the group 2.

Thereafter, the correspondence information acquisition unit E32 selects the location identifiers of the group for which the number of location identifiers is large enough to satisfy a predetermined condition. Thereafter, the correspondence information acquisition unit E32 acquires the location identifiers "C1", "C3," and "C4". That is to say, the correspondence information acquisition unit E32 selects "Takatsu Post Office", "Kawasaki Shimin Plaza", and "Toranomon Hospital Branch", and excludes (deletes) "Kajigaya Station".

Figure 40:
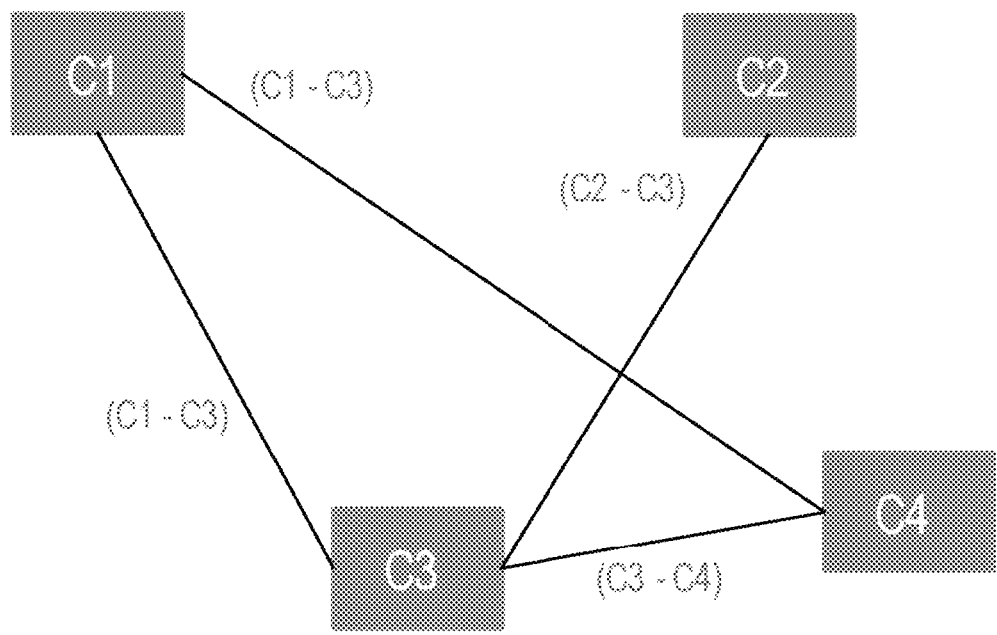
FIG. 40 is an image diagram illustrating processing that is performed by the map representation data processing device E according to the same.

Note that, as shown in FIG. 40, the correspondence information acquisition unit E32 may create links between the locations corresponding to the appropriate values "(cos (−40),sin(−40)) (cos(−24),sin(−24)) (cos(−32),sin(−32)) (cos(−26),sin(−26))" in the group 2, and acquire the location identifiers "C1", "C3", and "C4" in the largest closed space. Also, the correspondence information acquisition unit E32 may create links between the locations corresponding to the appropriate values in the group 2, and perform processing to delete the location identifier "C2" that is not a closed space, for example.

Through the above-described processing, the correspondence information acquisition unit E32 selects three locations "Takatsu Post Office", "Kawasaki Shimin Plaza", and "Toranomon Hospital Branch" as locations of the pieces of correspondence information to be accumulated. Thereafter, the correspondence information acquisition unit E32 acquires the pieces of correspondence information (coordinate information, position information) regarding the three locations. Note that the pieces of correspondence information may be linked with strings (the names of the locations).

Next, the correspondence output unit E41 accumulates the three pieces of correspondence information thus acquired. Note that the pieces of correspondence information are accumulated in the correspondence information storage unit C14 or an external device (not shown), for example.

Figure 41:
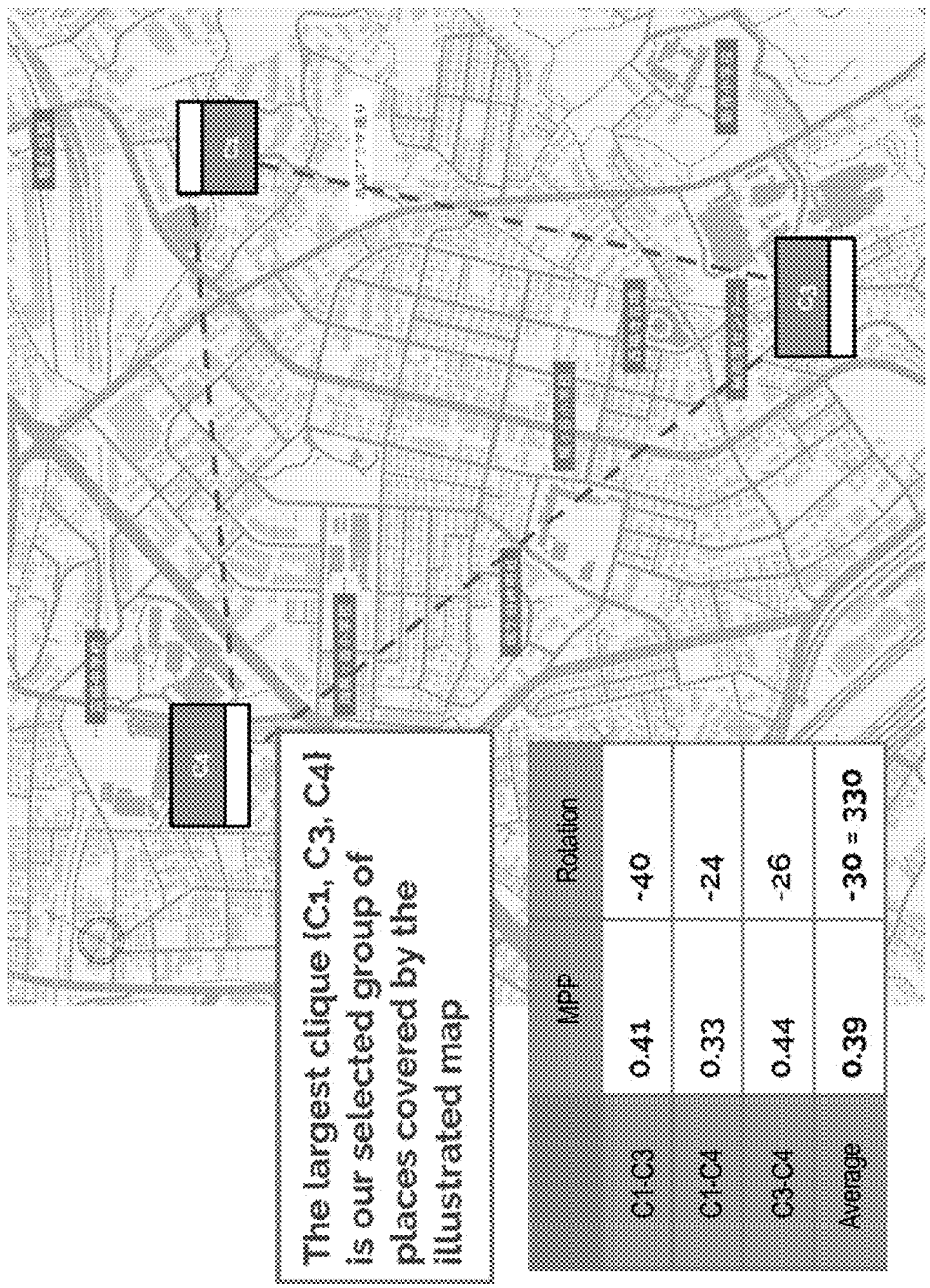
FIG. 41 is an image diagram illustrating processing that is performed by the map representation data processing device E according to the same.

Next, the correspondence information acquisition unit E32 acquires MPPs "0.41", "0.33", and "0.44" corresponding to the three locations "C1", "C3", and "C4". Next, the correspondence information acquisition unit E32 calculates the representative value (the average value in this example) of the three MPPs to obtain "0.39" (see FIG. 41).

Next, the scale acquisition unit E33 acquires scale information (for example, "0.39"), using the representative value (MPP "0.39") of the distance relationship information thus acquired, and accumulates it in association with the input image.

Figure 42:
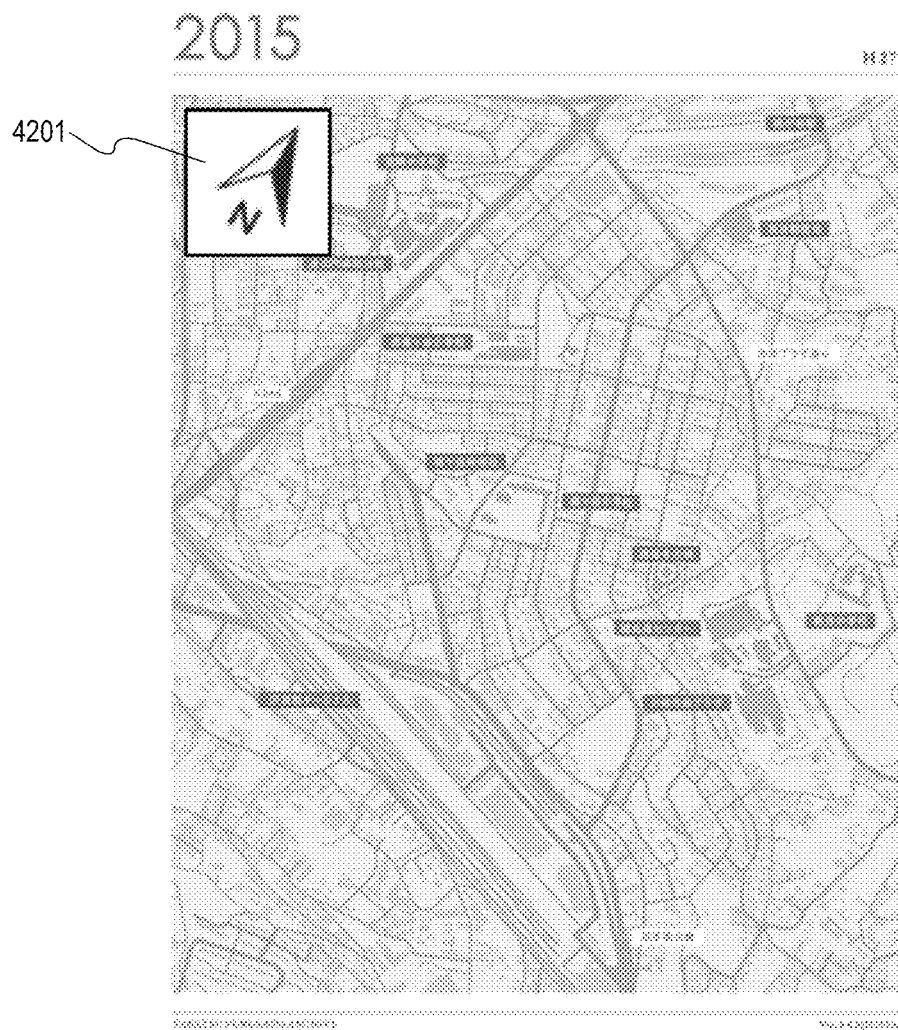
FIG. 42 is a diagram showing an example of an output from the map representation data processing device E according to the same.

Next, the direction information acquisition unit E39 performs direction information acquisition processing as described below. That is to say, the direction information acquisition unit E39 acquires pieces of angle relationship information "−40", "−24", and "−26" of the pairs of the location identifiers "C1", "C3,", and "C4". Next, the direction information acquisition unit E39 acquires the representative value (the average value in this example) "−30" of the pieces of angle relationship information. Next, the direction information acquisition unit E39 acquires "30 degrees", using a calculation formula "angle information=1×(the representative value of angle relationship information)". Thereafter, the direction information acquisition unit E39 acquires a pattern (angle information in this example) that indicates a direction that is tilted from true north to the east by 30 degrees (30 degrees clockwise). Thereafter, the direction information output unit E44 adds a pattern (angle information) indicating the angle, to the input image, and outputs it. Such an output example is shown in FIG. 42. 4201 in FIG. 42 indicates an example of angle information.

Next, the region specification information acquisition unit E34 performs region specification processing as described below. For example, first, the region specification information acquisition unit E34 detects the sides (30a,30b,30c,30d) of the region of the map in the input image shown in FIG. 30, using a contour extraction technique. Note that the technique of detecting a region through a contour extraction technique is a known technique.

Figure 43:
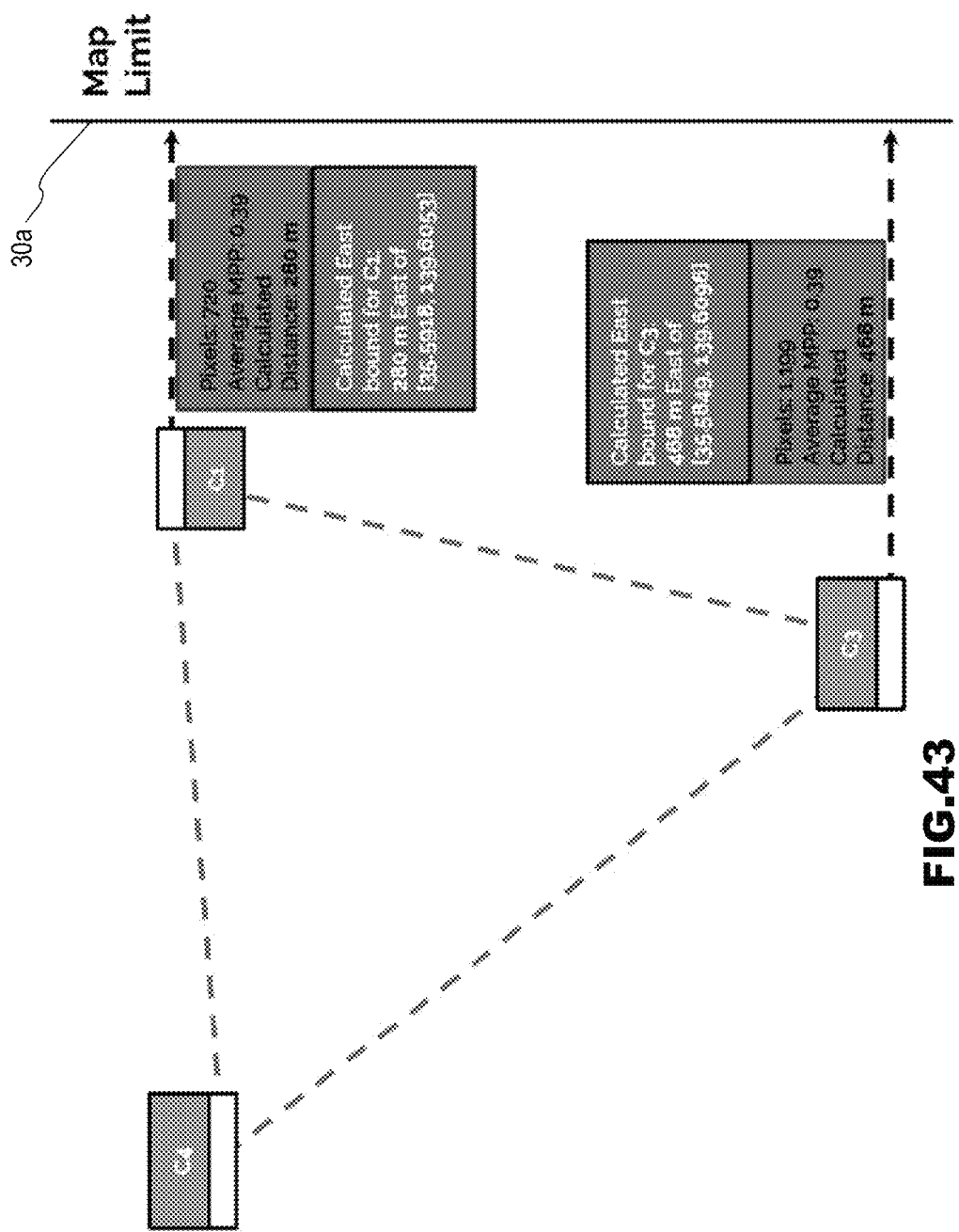
FIG. 43 is an image diagram illustrating processing that is performed by the map representation data processing device E according to the same.

Next, the region specification information acquisition unit E34 acquires the relative distance (the number of pixels in this example) "720" from the location indicated by the location identifier "C1" to the right side 30a. Note that the relative distance is the number of pixels in an orthogonal line from the location indicated by "C1" to the right side 30a. Next, the region specification information acquisition unit E34 calculates the absolute distance "280 m" to the right side 30a through a calculation "720×0.39", using the representative value (0.39) of the MPPs and the number of pixels "720". Next, it is assumed that the region specification information acquisition unit E34 acquires position information "]35.5918,139.6053] regarding the location directly rightward of the location indicated by "C1", in the right side 30a, using the position information regarding "C1" and the absolute distance "280 m" (see FIG. 43).

Similarly, the region specification information acquisition unit E34 acquires the number of pixels "1199" from the location indicated by the location identifier "C3" to the right side 30a. Also, the region specification information acquisition unit E34 multiplies the number of pixels "1199" by the representative value (0.39) of the MPPs to calculate the absolute distance "468 m" from the location indicated by the location identifier "C3" to the right side 30a. Also, the region specification information acquisition unit E34 acquires position information [35.5849,139.6096] regarding the location directly rightward of the location indicated by "C3", in the right side 30a, using the position information regarding "C3" and the absolute distance "468 m" (see FIG. 43). Similarly, the region specification information acquisition unit E34 acquires position information regarding the location directly rightward of the location indicated by "C4", in the right side 30a.

Next, the region specification information acquisition unit E34 "acquires information regarding the right side from the locations "C1", "C3", and "C4", (straight line information)

Figure 44:
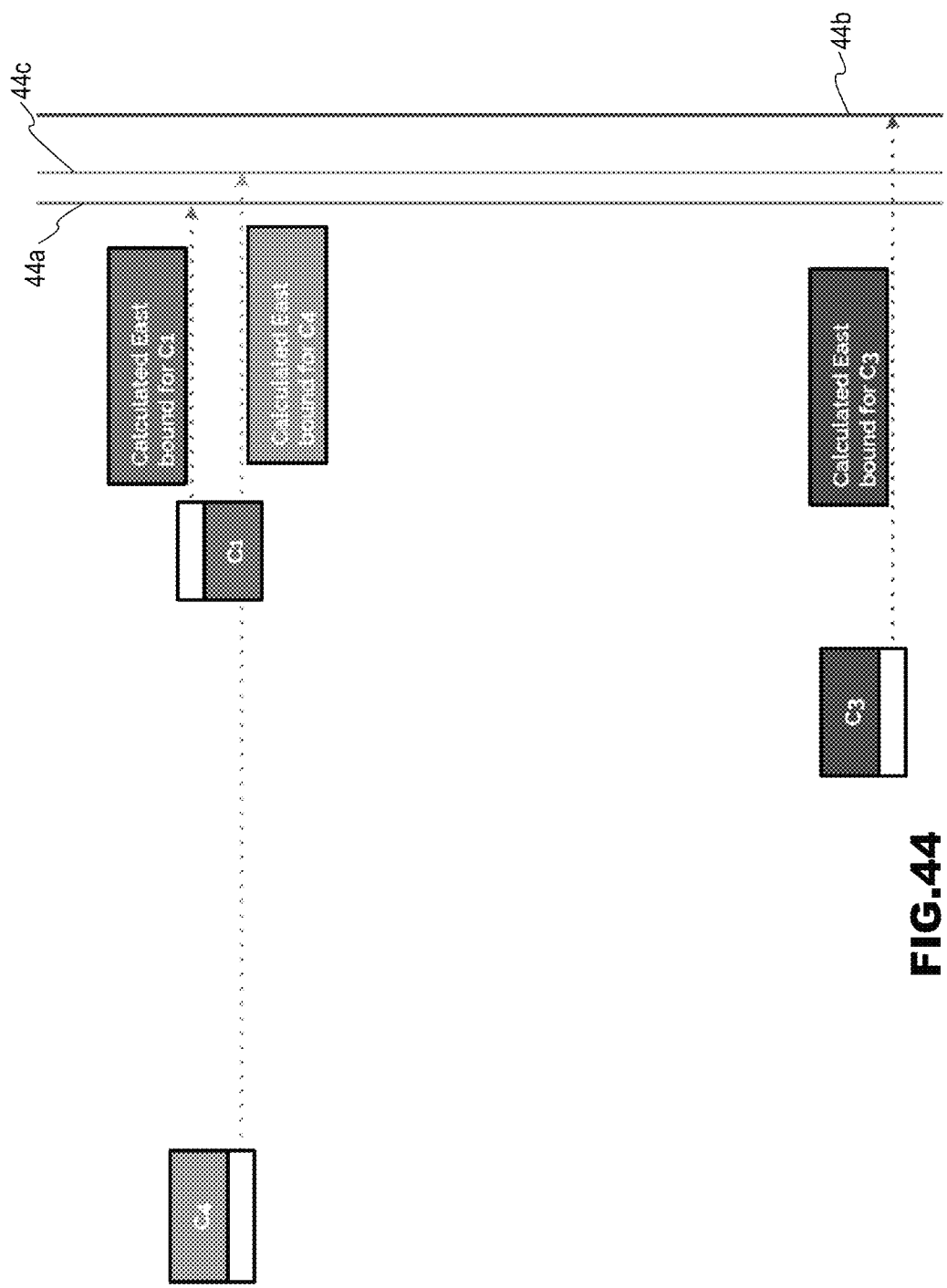
FIG. 44 is an image diagram illustrating processing that is performed by the map representation data processing device E according to the same.

[44a,44b,44c], using positional information regarding the locations on the right side corresponding to the locations "C1", "C3", and "C4" and angle information. Such a conceptual diagram is shown in FIG. 44. Next, the region specification information acquisition unit E34 acquires the representative value (the median value 44c in this example) for the right side using the three pieces of information regarding the right side. This representative value for the right side is determined as the boundary line of the right side in the accurate map information. The representative value for the right side may be an average value.

Figure 45:
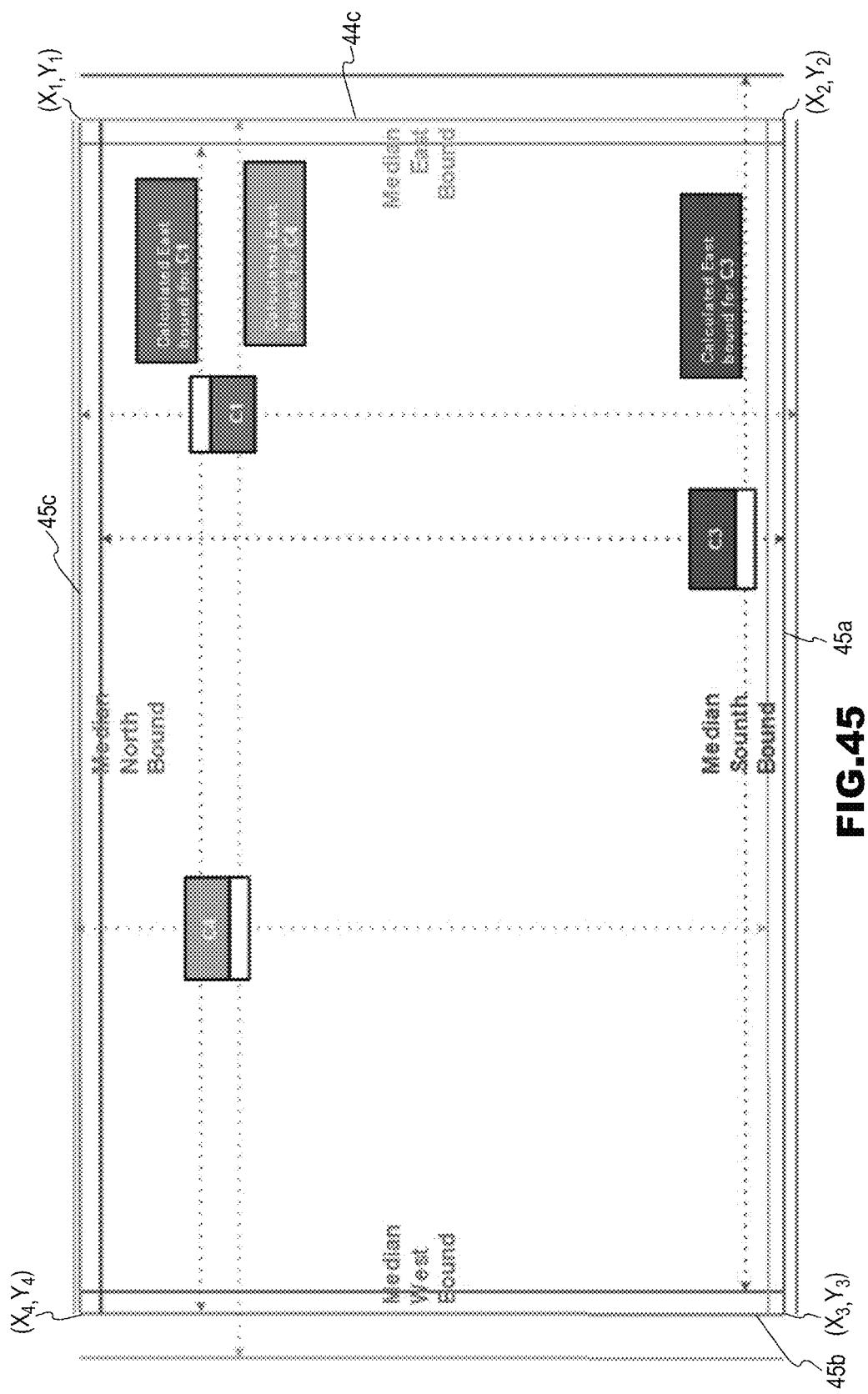
FIG. 45 is an image diagram illustrating processing that is performed by the map representation data processing device E according to the same.

The region specification information acquisition unit E34 performs the same processing as the acquisition processing performs to acquire the boundary line of the light side in the accurate map information, to acquire information regarding the bottom side (45a), the left side (45b), and the top side (45c) in the accurate map information. Next, the region specification information acquisition unit E34 acquires the intersections $(X_1,Y_1)$, $(X_2,Y_2)$, $(X_3,Y_3)$, and $(X_4,Y_4)$ of the four sides (44c, 45a, 45b, and 45c) (see FIG. 45). Note that each intersection is (latitude, longitude).

Through the above-described processing, the region specification information acquisition unit E34 acquires region specification information that corresponds to region in the map in the input image, and specifies the region in the accurate map information. Note that region specification information is information regarding four intersections, or information regarding two points $(X_1,Y_1)$ and $(X_3,Y_3)$, or information regarding two points $(X_2,Y_2)$ and $(X_4,Y_4)$.

Figure 46:
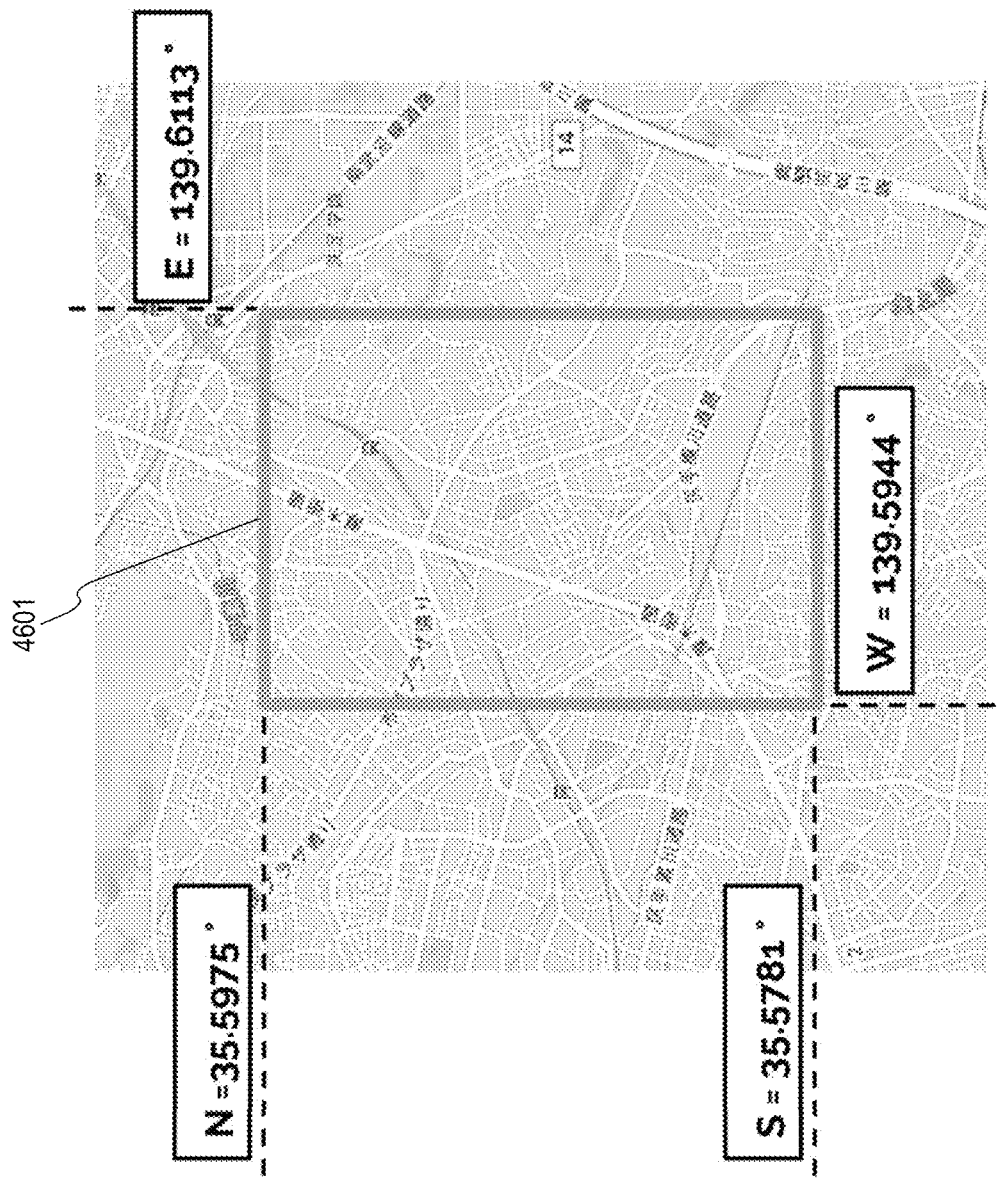
FIG. 46 is a diagram showing an example of an output of accurate map information from the map representation data processing device E according to the same.

Next, the processing unit E3 reads out accurate map information including the region specified by the region specification information. Next, the processing unit E3 forms accurate map information that explicitly indicates the region specified by the region specification information. Next, the output unit E4 outputs accurate map information that explicitly indicates the region specified by the region specification information. An output example of such accurate map information is shown in FIG. 46. The region is a rectangle and is indicated by 4601.

Figure 27:
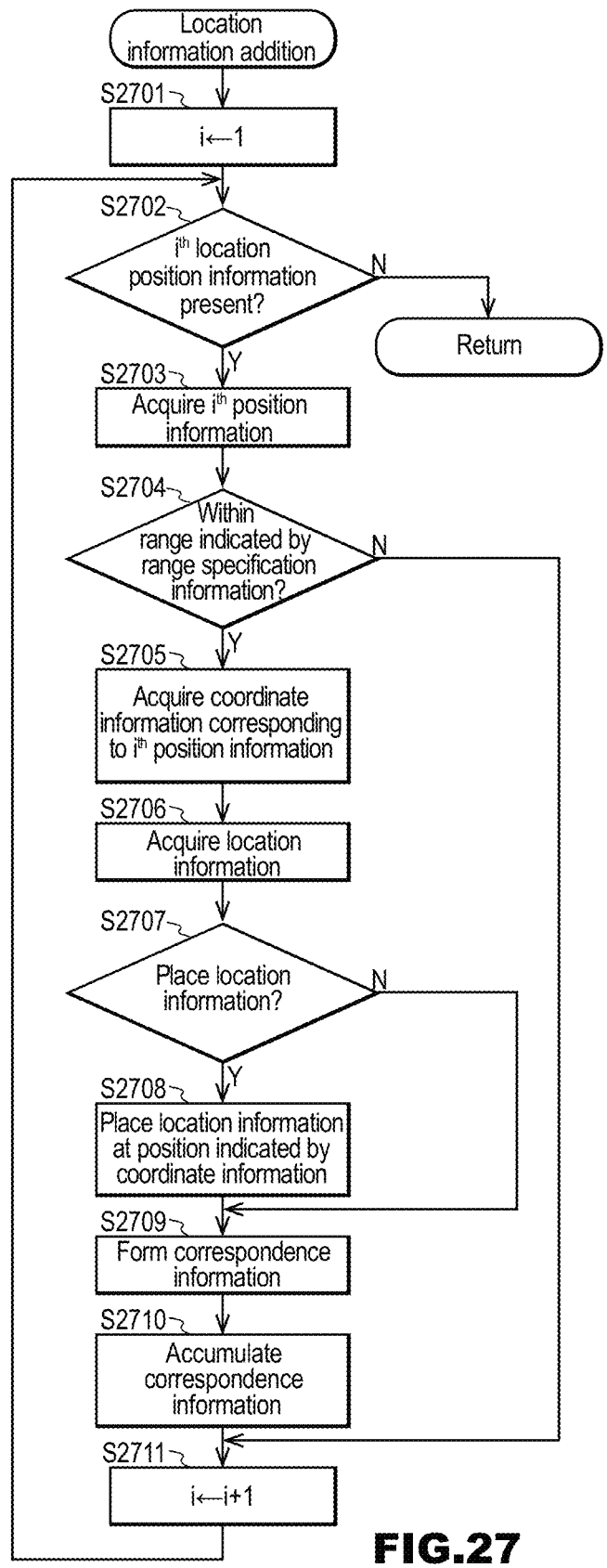
FIG. 27 is a flowchart illustrating an example of location addition processing according to the same.

Next, through the processing according to the flowchart in FIG. 27, the additional location acquisition unit E35 searches the location dictionary to acquire one or more pieces of location position information located within the region specified by the region specification information. Next, the additional location acquisition unit E35 acquires location information contained in each of the one or more pieces of location position information. Next, the additional coordinate acquisition unit E37 acquires coordinate information corresponding to the location information contained in each of the one or more pieces of location position information. Next, the location addition unit E38 places the strings of the acquired location information on the input image at positions indicated by the acquired coordinate information. Through the above-described processing, accurate map information that is to be output is formed.

Next, the output unit E4 outputs the formed accurate map information. As described above, according to the present embodiment, it is possible to automatically acquire appropriate correspondence information that associates coordinate information and position information regarding a location name or the like on map representation data, with each other.

Also, according to the present embodiment, it is possible to acquire a range in the real world supported by map representation data.

Also, according to the present embodiment, it is possible to add new location information to map representation data.

Furthermore, according to the present embodiment, it is possible to acquire direction information regarding map representation data.

Note that the map representation data processing device D described in Embodiment 3 can explicitly indicate the current position on map representation data, using one or more pieces of correspondence information automatically acquired in the present embodiment.

In such a case, it is possible to indicate the current position on map representation data, using two or more pieces of correspondence information that have been automatically acquired by the map representation data processing device E.

Furthermore, the processing in the present embodiment may be realized using software. This software may be distributed through software downloading or the like. Also, this software may be recorded on a recording medium such as a CD-ROM and distributed. Note that the same applies to the other embodiments in the present description. The software that realizes the information processing device in the present embodiment is the program described below. That is to say, the program enables a computer to function as: a map representation data acceptance unit that accepts map representation data that is one or more types of maps of an illustration map, a handwritten map, and a sketch map; a string acquisition unit that acquires three or more strings from the map representation data; a coordinate information acquisition unit that acquires pieces of coordinate information that are pieces of coordinate information corresponding to the three or more strings acquired by the string acquisition unit and are pieces of coordinate information in the map representation data; a position information acquisition unit that acquires pieces of position information corresponding to pieces of location information that are three or more strings acquired by the string acquisition unit, using a location dictionary that contains one or more pieces of location position information that associate the pieces of location information that specify locations and pieces of position information that specify positions of the locations with each other; a relationship information acquisition unit that acquires relationship information regarding a relationship between pieces of correspondence information that are sets of the pieces of coordinate information and the pieces of position information corresponding to the three or more strings acquired by the string acquisition unit; a correspondence information acquisition unit that acquires only two or more pieces of correspondence information corresponding to a piece of relationship information that satisfies a predetermined relationship, of the three or more pieces of correspondence information, using the relationship information; and a correspondence output unit that accumulates the two or more pieces of correspondence information acquired by the correspondence information acquisition unit.

Embodiment 5

The present embodiment describes an information system that includes a map representation data processing device that receives a map photograph, searches for one or more pieces of map representation data using the map photograph, and transmits navigation information that includes the one or more pieces of map representation data, to a terminal device. Note that the map representation data processing device searches for map representation data using one or more similarity situations of: an image similarity between the map photo and the map representation data; a string similarity between a set of strings expressed in the map photograph and a set of strings corresponding to the map representation data; and a range similarity between a range supported by the map photo and a range supported by the map representation data. Note that the supported range is the range of a map region.

The present embodiment also describes first pre-processing that is performed to cut a map region from a map photograph to acquire a map cut image. The present embodiment also describes second pre-processing that is performed to correct a map cut image to be a rectangle to acquire a corrected map image.

The present embodiment also describes an information system that includes a map representation data processing device that, when a map photograph that satisfies a first condition is not found through a search performed using a map photograph, searches for one or more pieces of map representation data, using current position information regarding a terminal device that has been received.

The present embodiment also describes an information system that includes a map representation data processing device that, when two or more pieces of map representation data are determined, transmits two or more selection images to select map representation data that is to be used by a terminal device, and transmits two or more pieces of correspondence information corresponding to the selected selection images. Note that a selection image is an image that is to be selected by a user, and is a thumbnail image for map representation data or map representation data.

The present embodiment also describes an information system that includes a map representation data processing device that transmits coordinate information regarding the current position of a terminal device instead of map representation data. Note that coordinate information is coordinate information in map representation data that is to be used by a terminal device.

Furthermore, the present embodiment describes a terminal device that takes a map photograph, transmits the map photograph to a map representation data processing device, thereafter receives navigation information, and outputs current position-added map representation data, using the navigation information.

Figure 47:
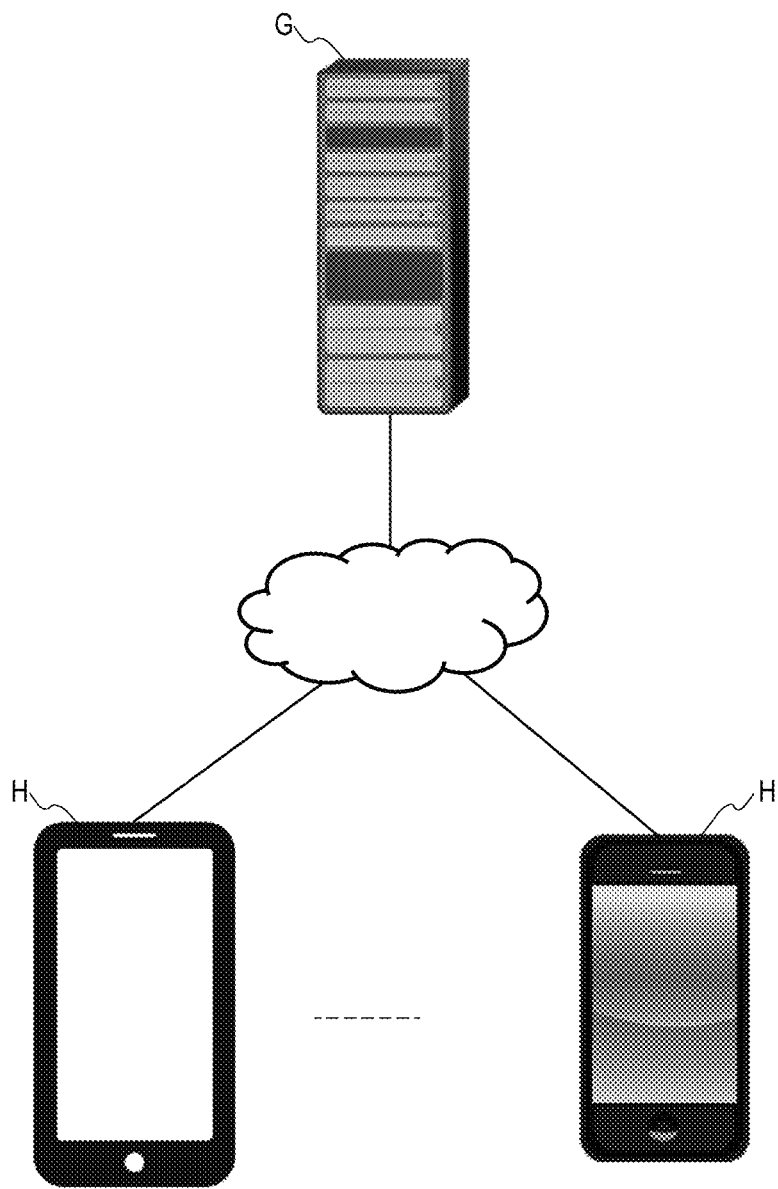
FIG. 47 is a conceptual diagram for an information system F according to Embodiment 5.

FIG. 47 is a conceptual diagram for an information system F according to the present embodiment. The information system F includes a map representation data processing device G and one or more terminal devices H. The map representation data processing device G is a so-called server. The server is, for example, a so-called cloud server, an ASP server, or the like, but there is no limitation on the type thereof. The terminal devices H is, for example, a so-called personal computer, a tablet terminal, a smartphone, or the like, but there is no limitation on the type thereof. The map representation data processing device G and the one or more terminal devices H can communicate with each other via a network such as the Internet.

Figure 48:
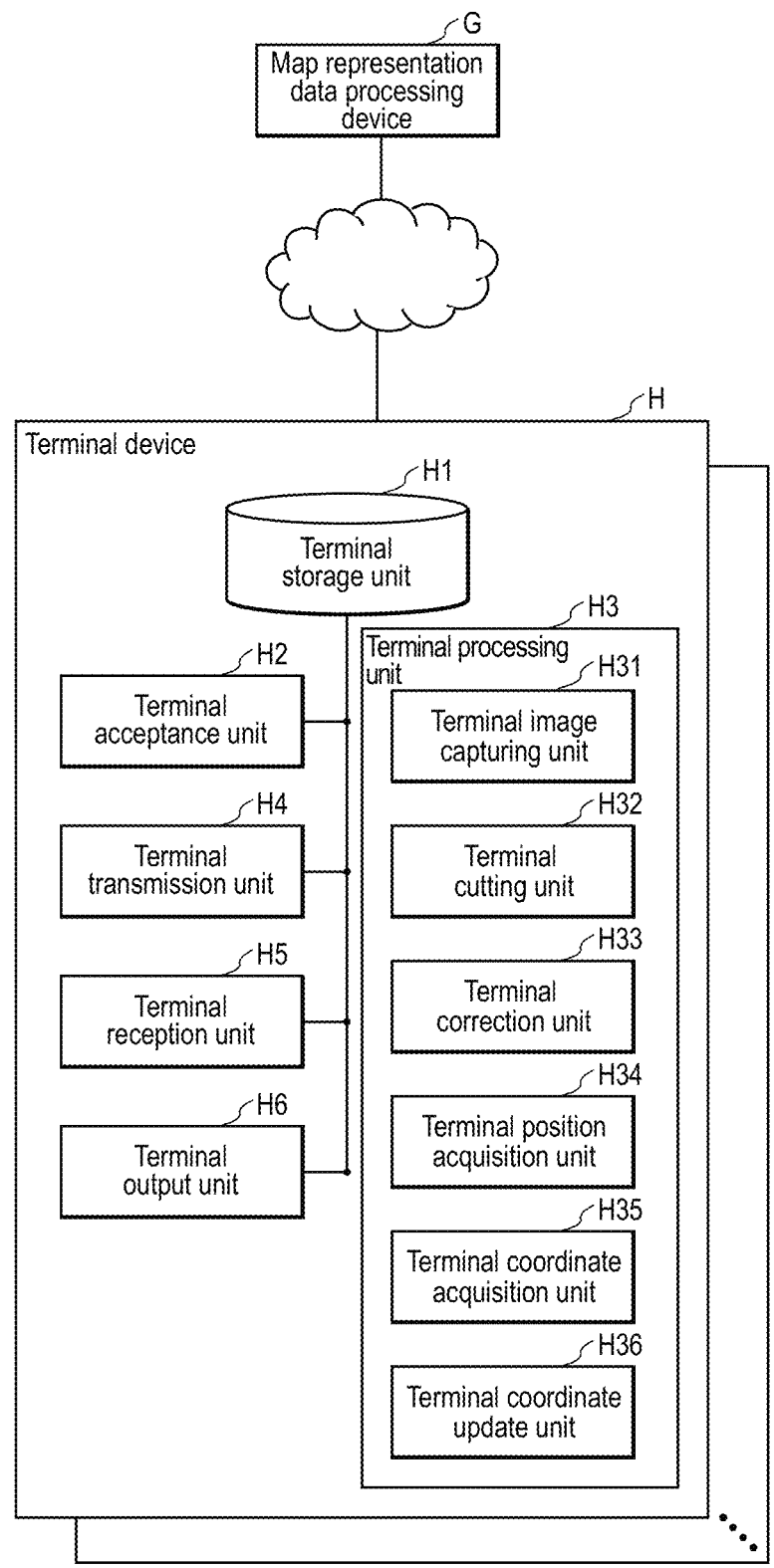
FIG. 48 is a block diagram for the information system F according to the same.
Figure 49:
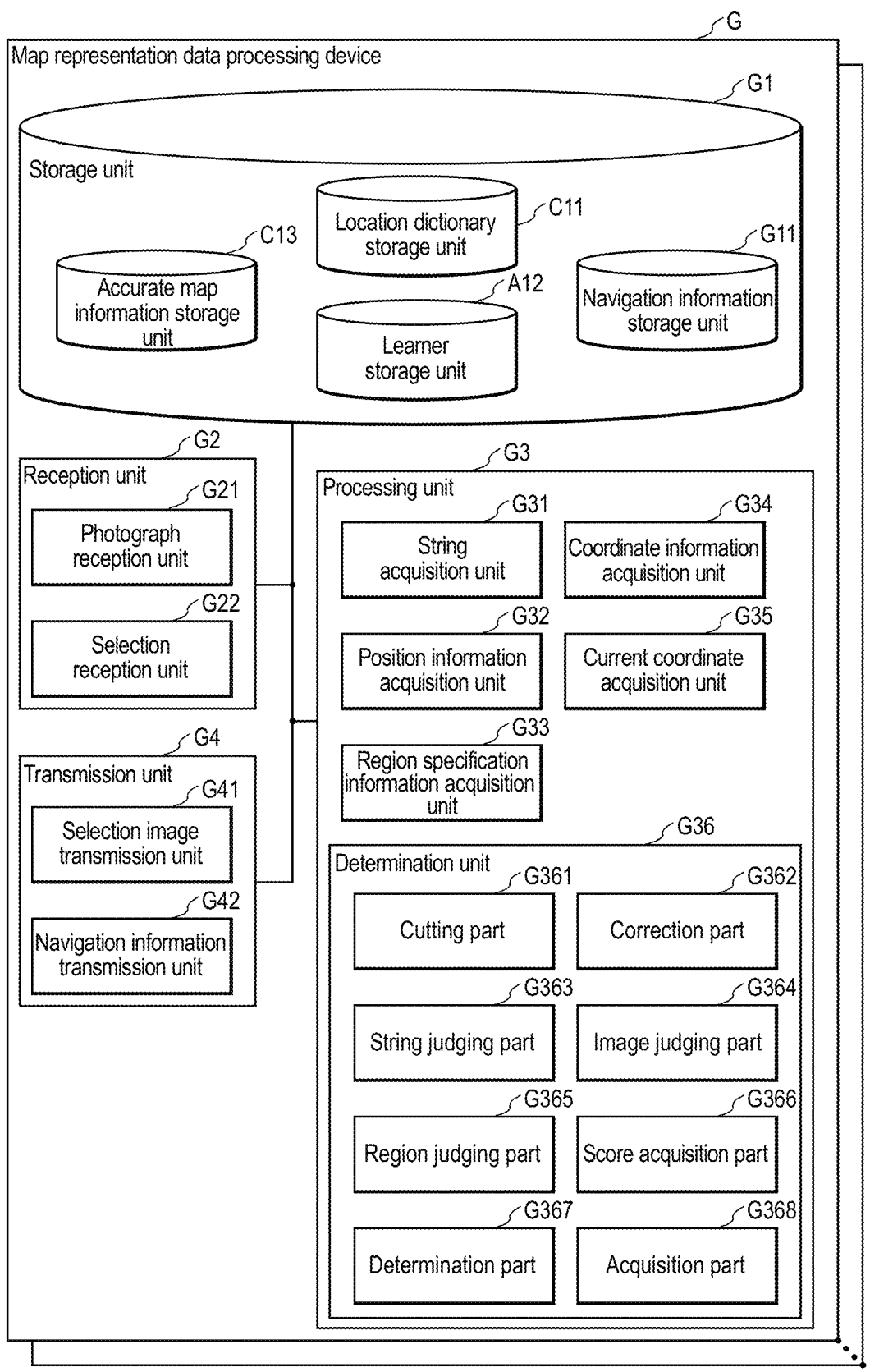
FIG. 49 is a block diagram for a map representation data processing device G according to the same.

FIG. 48 is a block diagram for the information system F according to the present embodiment. FIG. 49 is a block diagram for the map representation data processing device G included in the information system F.

The map representation data processing device G includes a storage unit G1, a reception unit G2, a processing unit G3, and a transmission unit G4. The storage unit G1 includes a location dictionary storage unit C11, an accurate map information storage unit C13, a learner storage unit A12, and a navigation information storage unit G11. The location dictionary storage unit C11, the accurate map information storage unit C13, the learner storage unit A12, and the navigation information storage unit G11 may be located in an external device (not shown). The reception unit G2 includes a photograph reception unit G21 and a selection reception unit G22. The processing unit G3 includes a string acquisition unit G31, a position information acquisition unit G32, a region specification information acquisition unit G33, a coordinate information acquisition unit G34, a current coordinate acquisition unit G35, and a determination unit G36. The determination unit G36 includes a cutting part G361, a correction part G362, a string judging part G363, an image judging part G364, a region judging part G365, a score acquisition part G366, a determination part G367, and an acquisition part G368. The transmission unit G4 includes a selection image transmission unit G41 and a navigation information transmission unit G42.

Note that the processing unit G3 may be able to realize the same functions as the processing unit E3. That is to say, the processing unit G3 may further include one or more of: the classification unit C32; the feature spot detection unit C34; the relationship information acquisition unit E31; the correspondence information acquisition unit E32; the scale acquisition unit E33; the additional location acquisition unit E35; the additional position acquisition unit E36; the additional coordinate acquisition unit E37; the location addition unit E38; and the direction information acquisition unit E39.

the terminal devices H includes a terminal storage unit H1, a terminal acceptance unit H2, a terminal processing unit H3, a terminal transmission unit H4, a terminal reception unit H5, and a terminal output unit H6. The terminal processing unit H3 includes a terminal image capturing unit H31, a terminal cutting unit H32, a terminal correction unit H33, a terminal position acquisition unit H34, and a terminal coordinate acquisition unit H35.

The storage unit G1 included in the map representation data processing device G stores various kinds of information. Examples of various kinds of information include location dictionary, a learner, and navigation information described later.

The navigation information storage unit G11 stores a navigation information group. The navigation information group contains two or more pieces of navigation information. Each piece of navigation information contains two or more pieces of correspondence information and map representation data. Correspondence information contains coordinate information and position information. Coordinate information is information that specifies coordinates in the map representation data. Position information is, for example, (latitude, longitude).

The reception unit G2 receives various kinds of information. Examples of various kinds of information include a map photograph described later and a selection instruction described later.

The photograph reception unit G21 receives a map photograph from a terminal device H. The map photograph is a captured photograph of a map. It is preferable that the map is an illustration map, a handwritten map, a sketch map, or the like. the map is, for example, a map drawn on a billboard, a wall, real estate, or the like in the city, a map drawn on a billboard in an amusement park, a theme park, a leisure spot, or the like, or a map drawn in a pamphlet or a guidebook. However, the map to be photographed may be an accurate map. It is also preferable that a map photograph is a photograph taken by the terminal device H. However, the map photograph may be taken by another device and stored in the terminal device H. Note that a map photograph typically is an image. A map photograph is, for example, jpeg, gif, ping, or the like, but there is no limitation on the data structure thereof.

It is preferable that the photograph reception unit G21 also receives terminal position information that specifies the current position of the terminal device H. Terminal position information may be information embedded in a map photograph, or information that is independent of the map photograph. For example, the photograph reception unit G21 receives terminal position information in pair with a map photograph.

The selection reception unit G22 receives a selection instruction from the terminal device H. The selection instruction is information generated as a result of a selection image being selected by the terminal device H. Selection instruction contains an image identifier that identifies the selection image.

The processing unit G3 performs various kinds of processing. Examples of various kinds of processing include processing that is performed by the string acquisition unit G31, the position information acquisition unit G32, the region specification information acquisition unit G33, the coordinate information acquisition unit G34, the current coordinate acquisition unit G35, and the determination unit G36.

Examples of various kinds of processing include processing that is performed to determine whether or not to perform pre-processing. For example, the processing unit G3 judges whether or not preprocessing has been performed by the terminal device H on the captured map photograph. For example, the processing unit G3 judges whether or not a flag indicating pre-processing has been performed has been received.

For example, the processing unit G3 acquires one or more pieces of correspondence information from the received map photograph. The processing performed to acquire one or more pieces of correspondence information from a map photograph is the same as the processing performed to acquire correspondence information from map representation data described in Embodiment 4. That is to say, the processing unit G3 acquires one or more location names (strings) from a map photograph, acquires pieces of coordinate information respectively corresponding to the location names from the map photograph, acquires pieces of real position information corresponding to the location names from the location dictionary, and forms one or more pieces of correspondence information that contain coordinate information and position information.

The string acquisition unit G31 acquires one or more strings from the map photograph received by the photograph reception unit G21. It is preferable that the string acquisition unit G31 acquires three or more strings from the map photograph. For example, the string acquisition unit C31 acquires one or more strings from the map photograph through character recognition processing. The string acquisition unit G31 need only perform the same processing as the string acquisition unit C31. It is preferable that the above-described classification unit C32 judges whether or not the one or more strings acquired by the string acquisition unit G31 are strings that specify locations, and only acquires strings that specify locations.

The position information acquisition unit G32 acquires pieces of position information respectively corresponding to the pieces of location information that are the three or more strings acquired by the string acquisition unit G31, using the location dictionary. The location dictionary may be located in the storage unit G1 or an external device (not shown). The position information acquisition unit G32 performs the same processing as the position information acquisition unit C36. It is preferable that the above-described grouping unit C33 performs processing to exclude position information regarding a location that is considered as not being located in the map photograph, from the pieces of position information acquired by the position information acquisition unit G32.

The region specification information acquisition unit G33 acquires region specification information that specifies a region that is covered by the map photograph, using the three or more pieces of position information acquired by the position information acquisition unit G32. For example, the region specification information acquisition unit G33 performs the same processing as the region specification information acquisition unit C37. It is preferable that position information regarding a location that is considered as not being located in the map photograph has been excluded by the grouping unit C33 from the three or more pieces of position information acquired by the position information acquisition unit G32.

The coordinate information acquisition unit G34 acquires pieces of coordinate information of the three or more strings expressed in the map photograph. Coordinate information is information that specifies coordinates in the map photograph. The coordinate information acquisition unit G34 performs the same processing as the coordinate information acquisition unit C35.

The current coordinate acquisition unit G35 acquires current coordinate information that specifies the coordinates corresponding to the terminal position information, using three or more pieces of correspondence information and the received terminal position information. The current coordinate acquisition unit G35 performs the same processing as the coordinate information acquisition unit D32. Note that correspondence information contains coordinate information and position information. Current coordinate information is information that specifies coordinates in the map photograph.

The determination unit G36 searches the navigation information group and determines navigation information that has a relationship that satisfies a first condition, with the map photograph. Note that the navigation information group may be located in the navigation information storage unit G11 or an external device (not shown).

The first condition is constituted by one or more conditions of an image similarity condition, a string similarity condition, and a range similarity condition. The image similarity condition is a condition regarding the degree of similarity between images.

The image similarity condition typically is a condition regarding the degree of similarity between a map photograph that is an image and map representation data that is an image. The image similarity condition is, for example, that (a) the degree of similarity is the largest of the degrees of similarity between the map photograph and two or more pieces of map representation data, (b) the degree of similarity between two images of the map photograph and the map representation data is no less than a threshold value, (c) the degree of similarity between two images is greater than the threshold value, or (d) a sub score that employs the degree of similarity between two images is large enough to satisfy a condition. The sub score is a score regarding the degree of similarity between two images, and may be the similarity itself or a value calculated using an increasing function that employs the degree of similarity as a parameter. Note that the processing performed to calculate the degree of similarity between two images is a well-known technique, and therefore the description thereof will be omitted.

The string similarity condition is a condition regarding the degree of match between a first string group that is a group of one or more strings that are expressed on the map photograph, and a second string group that is a group of one or more strings corresponding to the map representation data. The string similarity condition is, for example, that (a) the number or percentage of the strings that match between the first string group and the second string group corresponding to two or more pieces of map representation data is the largest, (b) the number or percentage of the strings that match between the first string group and the second string group is no less than or greater than a threshold value, or (c) a sub score that employs the degree of match between the strings included in the first string group and the strings included in the second string group is large enough to satisfy a condition. The sub score may be the number or percentage of strings that match between the strings included in the first string group and the strings included in the second string group, or a value calculated using an increasing function that employs the number or percentage as a parameter.

The second string group that includes one or more strings corresponding to the map representation data may be one or more strings expressed on the map representation data, or one or more strings expressed on the map representation data and one or more pieces of location information (typically the names of locations) in the region of the map representation data.

The range similarity condition is a condition regarding the relationship between a first range of the region supported by the map photograph and a second region of the region supported by the map representation data. The range similarity condition is, for example, that (a) the first range is included in the second range, (b) the percentage of the first range included in the second range is no less than or greater than a threshold value, (c) the first range matches the second range, (d) the overlap of the first range and the second range is no less than or greater than a threshold value, (e) the overlap of the first range and the second range is the largest, or (f) a sub score that employs information regarding the overlap of the first range and the second range is large enough to satisfy a condition. The sub score may be the percentage of the first range included in the second range, the area or the like of the overlap of the first range and the second range, or a value calculated using an increasing function that employs the percentage or area as a parameter.

The first condition may be conditions that employ a sub score for the degree of satisfying two or more conditions of the image similarity condition, the string similarity condition, and the range similarity condition. The conditions that employ a sub score are, for example, that a score acquired using two or more sub scores is large enough to satisfy a predetermined condition, or that all of the two or more sub scores are greater than or no less than a threshold value. Note that the score acquired using sub scores is a value calculated using an increasing function that employs the sub scores as parameters, such as the sum of two or more sub scores, the average of two or more sub scores, the weighted average of two or more sub scores, or the like.

The determination unit G36 determines a piece of navigation information that satisfies the first condition, using one or more strings. To use one or more strings is, for example, to use one or two conditions of the string similarity condition and the range similarity condition.

The determination unit G36 judges whether or not the one or more strings match location information, and determines a piece of navigation information that satisfies the first condition, using the result of the determination regarding the match between the strings and the location information.

The determination unit G36 determines a piece of navigation information corresponding to the region specification information acquired by the region specification information acquisition unit G33 and the region specification information that satisfies the first condition. Note that the region specification information acquisition unit G33 acquires region specification information, using the strings acquired by the string acquisition unit G31.

It is preferable that the determination unit G36 cuts a map region from the map photograph to acquire a map cut image, searches the navigation information group, using the map cut image, and determines a piece of navigation information that is to be transmitted. Note the processing of cutting the map region from the map photograph is performed using, for example, the contour extraction technique in image processing, and is a known technique. The map cut image is an example of a map photograph.

It is preferable that the determination unit G36 corrects the map cut image to be a rectangle to acquire a corrected map image, searches the navigation information group, using the corrected map image, and determines a piece of navigation information that is to be transmitted. Note that the map cut image may have a shape other than a rectangle. In such a case, the determination unit G36 performs correction processing on the map cut image, and acquires a corrected map image that is a rectangle (a quadrate shape or a square). Note that performing processing to correct a distorted image so as to have a rectangular shape is a well-known technique. The corrected map image is an example of a map photograph as well.

It is preferable that, if the determination unit G36 fails to determine a piece of navigation information that satisfies the first condition, the determination unit G36 determines a piece of navigation information that contains a piece of position information that indicates a position that is close to the received terminal position information enough to satisfy a second condition. The second condition is, for example, that (a) the region supported by the map representation data includes the position indicated by the terminal position information, (b) the position information regarding the center point of the map representation data and the terminal position information are close enough to satisfy a predetermined condition, and (c) the region supported by the map representation data includes the position indicated by the terminal position information and the region supported by the map representation data has an areas no less than a threshold value.

The cutting part G361 cuts the map region from the map photograph to acquire a map cut image.

The correction part G362 corrects the map cut image to be a rectangle to acquire a corrected map image.

The string judging part G363 judges whether or not the one or more strings acquired by the string acquisition unit G31 from the map photograph and the one or more pieces of location information that are paired with the map representation data match each other. The string judging part G363 may acquire a string sub score that is a score related to similarity between strings, based on the result of the determination regarding whether or not the strings match each other. Note that the higher the number or percentage of matching strings, the higher the string sub score is. The string sub score is, for example, calculated using an increasing function that employs the number or percentage of matching strings as a parameter.

The image judging part G364 acquires the degree of similarity between the map photograph that is an image and the map representation data that is an image. The image judging part G364 may use the degree of similarity between images to acquire an image sub score that is a score regarding similarity between images. Typically, the higher the degree of similarity between images is, the higher the image sub score is. For example, the image sub score is calculated using an increasing function that employs the similarity between images as a parameter.

The region judging part G365 acquires information regarding the relationship between the first range of the region supported by the map photograph and the second region of the region supported by the map representation data. Information regarding the relationship is, for example, information indicating whether or not the first range is included in the second range, the percentage of the first range included in the second range, information indicating whether or not the first range and the second range match each other, information specifying the overlap of the first range and the second range, and a sub score that employs information regarding the overlap of the first range and the second range. Note that such a sub score is a range sub score. Typically, the larger the overlap of the first range and the second range is, the higher the range sub score is. For example, the range sub score is calculated using an increasing function that employs the value (for example, the area) of the overlap of the first range and the second range as a parameter.

The score acquisition part G366 calculates the above-described score, using two or more sub scores. The two or more sub scores are the sub scores respectively acquired by two or more parts of the string judging part G363, the image judging part G364, and the region judging part G365.

The determination part G367 determines a piece of map representation data that is similar to the map photograph enough to satisfy the first condition. Note that similarity is one or more of image similarity, string similarity, and region similarity. The first condition is, for example, that the score acquired by the score acquisition part G366 is the largest, or that the score is no less than or greater than a threshold value. The first condition is stored in the storage unit G1, for example. To determine the map representation data is the same as to determine the navigation information.

The acquisition part G368 acquires a piece of navigation information that includes the map representation data determined by the determination part G367, from the navigation information group.

The transmission unit G4 transmits various kinds of information. Examples of various kinds of information include a selection image, navigation information, and correspondence information.

When the determination unit G36 determines two or more pieces of navigation information, the selection image transmission unit G41 transmits two or more selection images to the terminal device H. The selection image is map representation data or a thumbnail image. It is preferable that the thumbnail image is stored in advance in association with the map representation data. However, the thumbnail image may be dynamically formed when required, using map representation data. The selection image is associated with an image identifier. Typically, the image identifier is transmitted together.

The navigation information transmission unit G42 transmits the one or more pieces of navigation information determined by the determination unit G36 to the terminal device H. For example, the navigation information transmission unit G42 transmits the one or more pieces of navigation information acquired by the acquisition part G368, to the terminal device H. The navigation information transmission unit G42 may transmit two or more pieces of correspondence information that are paired with the image identifier contained in a selection instruction, to the terminal device H. In such a case, it is preferable that the navigation information transmission unit G42 does not transmit map representation data. Also, the if only a thumbnail image has been transmitted, map representation data typically is to be transmitted as well.

The navigation information transmission unit G42 may transmit the navigation information corresponding to the image identifier contained in the selection instruction, to the terminal device H.

The navigation information transmission unit G42 may transmit current coordinate information to the terminal device H instead of navigation information. It is preferable that the case in which current coordinate information is transmitted to a terminal device instead of navigation information is the case in which the determination unit G36 cannot determine navigation information. The case in which current coordinate information is transmitted to a terminal device instead of navigation information is the case in which the terminal device H uses a captured map photograph.

Note that navigation information that has been transmitted is used for navigation in the terminal device H. Navigation typically is explicit indication of the current position.

The terminal storage unit H1 included in the classification device H stores various kinds of information. Examples of various kinds of information include a map photograph, navigation information, and correspondence information.

The terminal acceptance unit H2 accepts various kinds of instructions and information. Examples of various kinds of instructions include an instruction to take a photograph, a selection instruction, and a transmission instruction. A transmission instruction is an instruction to transmit a map photograph.

Any input means, such as a touch panel, a keyboard, a mouse, a menu screen, or the like, may be employed to input various kinds of instructions and information.

The terminal processing unit H3 performs various kinds of processing. Examples of various kinds of processing include processing that is performed the terminal image capturing unit H31, the terminal cutting unit H32, the terminal correction unit H33, the terminal position acquisition unit H34, and the terminal coordinate acquisition unit H35.

Examples of various kinds of processing include processing that is performed to accumulate the pieces of navigation information received by the terminal reception unit H5 in the terminal storage unit H1. Examples of various kinds of processing include processing that is performed to form current position-added map representation data by adding a pattern explicitly indicating the current position to the map representation data contained in the received navigation information, at a coordinate position indicated by the acquired current coordinate information. Note that the processing performed to form current position-added map representation data is the same as the processing performed by the data forming unit D33.

The terminal image capturing unit H31 takes a map photograph. The terminal image capturing unit H31 is realized using a camera, for example.

The terminal cutting unit H32 cuts the map region from the map photograph to acquire a map cut image. The processing performed by the terminal cutting unit H32 is the same as the processing performed by the cutting part G361.

The terminal correction unit H33 corrects the map cut image to be a rectangle to acquire a corrected map image. The processing performed by the terminal correction unit H33 is the same as the processing performed by the correction part G362.

The terminal position acquisition unit H34 acquires current position information. The terminal position acquisition unit H34 contains a GPS receiver, for example. The terminal position acquisition unit H34 may acquire current position information, using radio waves from three or more base stations for mobile phones. There is no limitation on the processing performed by the terminal position acquisition unit H34 to acquire current position information.

The terminal coordinate acquisition unit H35 acquires current coordinate information corresponding to current position information, using the two or more pieces of correspondence information contained in the navigation information. The processing performed by the terminal coordinate acquisition unit H35 is the same as the processing performed by the current coordinate acquisition unit G35.

The terminal transmission unit H4 transmits a map photograph to the map representation data processing device G. The map photograph may be a captured image without change, a map cut image, or a corrected map image.

The terminal transmission unit H4 transmits a map cut image to the map representation data processing device, instead of the map photograph. Note that the map photograph in such a case is the captured image without change.

The terminal transmission unit H4 transmits a corrected map image to the map representation data processing device instead of the map cut image.

The terminal reception unit H5 receives navigation information from the map representation data processing device G. Typically, the received navigation information is at least temporarily stored in the terminal storage unit H1.

The terminal output unit H6 outputs current position-added map representation data formed by explicitly indicating the current position at the coordinate position indicated by the current coordinate information, on the map representation data contained in the navigation information.

Here, "output" typically means displaying on a display device, but may be regarded as a concept that includes projection with a projector, printing with a printer, sound output, transmission to an external device, accumulation on a recording medium, delivery of processing results to another processing apparatus or another program, and so on.

It is preferable that the storage unit G1, the navigation information storage unit G11, and the terminal storage unit H1 are realized using a non-volatile recording medium, but they may be realized using a volatile recording medium.

There is no limitation on the process in which information is stored in the storage unit G1 and so on. For example, information may be stored in the storage unit G1 or the like via a recording medium, or information transmitted via a communication line or the like may be stored in the storage unit G1 or the like, or information input via an input device may be stored in the storage unit G1 or the like.

The reception unit G2, the photograph reception unit G21, the selection reception unit G22, and the terminal reception unit H5 typically are realized using a wireless or wired communication means, but may be realized using a broadcast receiving means.

The processing unit G3, the string acquisition unit G31, the position information acquisition unit G32, the region specification information acquisition unit G33, the coordinate information acquisition unit G34, the current coordinate acquisition unit G35, the determination unit G36, the cutting part G361, the correction part G362, the string judging part G363, the image judging part G364, the region judging part G365, the score acquisition part G366, the determination part G367, the acquisition part G368, the terminal processing unit H3, the terminal cutting unit H32, the terminal correction unit H33, the terminal position acquisition unit H34, and the terminal coordinate acquisition unit H35 typically are realized using an MPU, a memory, and so on. The processing procedures performed by the processing unit G3 typically are realized using software, and the software is recorded on a recording medium such as a ROM. However, such processing procedures may be realized using hardware (a dedicated circuit). Needless to say, another kind of processor such as a CPU or a GPU may be used instead of the MPU.

The transmission unit G4, the selection image transmission unit G41, the navigation information transmission unit G42, and the terminal transmission unit H4 typically are realized using a wireless or wired communication means, but may be realized using a broadcast means.

The terminal acceptance unit H2 can be realized using a device driver for the input means such as a touch panel or a keyboard, or control software or the like for controlling the menu screen.

The terminal output unit H6 may be regarded as including or not including an output device such as a display or a speaker. The terminal output unit H6 can be realized using the driver software of the output device, the driver software of the output device and the output device, or the like.

Next, operations of the information system F will be described. First, examples of operations of the map representation data processing device G will be described with reference to the flowchart shown in FIG. 50.

(Step S5001) The photograph reception unit G21 judges whether or not a map photograph has been received. If a map photograph has been received, processing proceeds to step S5002, and if a map photograph has not been received, processing proceeds to step S5017.

(Step S5002) The processing unit G3 judges whether or not to perform pre-processing. If pre-processing is to be performed, processing proceeds to step S5003, and if pre-processing is not to be performed, processing proceeds to step S5005. For example, if pre-processing has been performed in the terminal device H, the processing unit G3 determines not to perform pre-processing, and if pre-processing has not been performed in the terminal device H, the processing unit G3 determines to perform pre-processing. If pre-processing has been performed in the terminal device H, the photograph reception unit G21 may receive a flag indicating such a fact. Alternatively, information indicating that pre-processing has been performed in the terminal device H may be included in the received map photograph (for example, in the header part, the footer part, or the like). Alternatively, whether or not to perform pre-processing may be determined in advance.

(Step S5003) The cutting part G361 cuts the map region from the map photograph received in step S5001 to acquire a map cut image.

(Step S5004) The correction part G362 corrects the map cut image acquired in step S5003 to be a rectangle to acquire a corrected map image. It is assumed that this corrected map image is a map photograph as well. The map cut image may be used as a map photograph, without being corrected.

(Step S5005) The determination unit G36 performs first determination processing that is processing performed to determine navigation information using a map photograph. An example of the first determination processing will be described with reference to the flowchart shown in FIG. 51.

(Step S5006) The determination unit G36 judges whether or not one piece of navigation information has been determined in step S5005. If one piece of navigation information has been determined, processing proceeds to step S5007, and if one piece of navigation information is not determined, processing proceeds to step S5009.

(Step S5007) The determination unit G36 acquires the one piece of navigation information determined in step S5005, from the navigation information storage unit G11.

(Step S5008) The navigation information transmission unit G42 transmits the one piece of navigation information acquired by the determination unit G36 in step S5007, to the terminal device H. Processing returns to step S5001.

(Step S5009) The determination unit G36 judges whether or not two or more pieces of navigation information have been determined in step S5005. If two or more pieces of navigation information have been determined, processing proceeds to step S5010, and if two or more pieces of navigation information have not been determined, processing proceeds to step S5012.

(Step S5010) The determination unit G36 acquires the map representation data contained in each of the two or more pieces of navigation information determined in step S5005, or a thumbnail image for the map representation data. Note that such map representation data or such a thumbnail image is a selection image.

(Step S5011) The selection image transmission unit G41 transmits the two or more selection images acquired in step S5010 to the terminal device H. Processing returns to step S5001. Note that the selection image transmission unit G41 typically transmits image identifiers as well respectively in association with the two or more selection images, to the terminal device H. The image identifier need only be information that can identify a selection image, and may be the ID of navigation information, the ID of map representation data, or the ID of a thumbnail image, for example.

(Step S5012) The determination unit G36 judges whether or not the received map photograph is to be used by the terminal device H. If the map photograph is to be used, processing proceeds to step S5013, and if the map photograph is not to be used, processing proceeds to step S5015.

(Step S5013) The processing unit G3 acquires one or more pieces of correspondence information corresponding to the map photograph.

(Step S5014) The navigation information transmission unit G42 transmits the one or more pieces of correspondence information acquired in step S5013 to the terminal device H. Processing returns to step S5001.

(Step S5015) The determination unit G36 judges whether or not to use current position information to determine navigation information. If current position information is to be used, processing proceeds to step S5016, and if current position information is not to be used, processing returns to step S5001. Here, it is preferable that an error message is transmitted to the terminal device H.

(Step S5016) The determination unit G36 performs second determination processing that is processing performed to determine navigation information using current position information. An example of the second determination processing will be described with reference to the flowchart shown in FIG. 52.

(Step S5017) The selection reception unit G22 judges whether or not a selection instruction has been received. If a selection instruction has been received, processing proceeds to step S5018, and if a selection instruction has not been received, processing returns to step S5001.

(Step S5018) The determination unit G36 acquires an image identifier that is included in the selection instruction received in step S5017.

(Step S5019) The determination unit G36 acquires one or more pieces of correspondence information corresponding to the image identifier, from the navigation information storage unit G11. Note that the determination unit G36 may acquire navigation information corresponding to the image identifier, from the navigation information storage unit G11.

(Step S5020) The navigation information transmission unit G42 transmits the one or more pieces of correspondence information acquired in step S5019 to the terminal device H. Processing returns to step S5001. Here, navigation information corresponding to the image identifier may be transmitted to the terminal device H.

Figure 50:
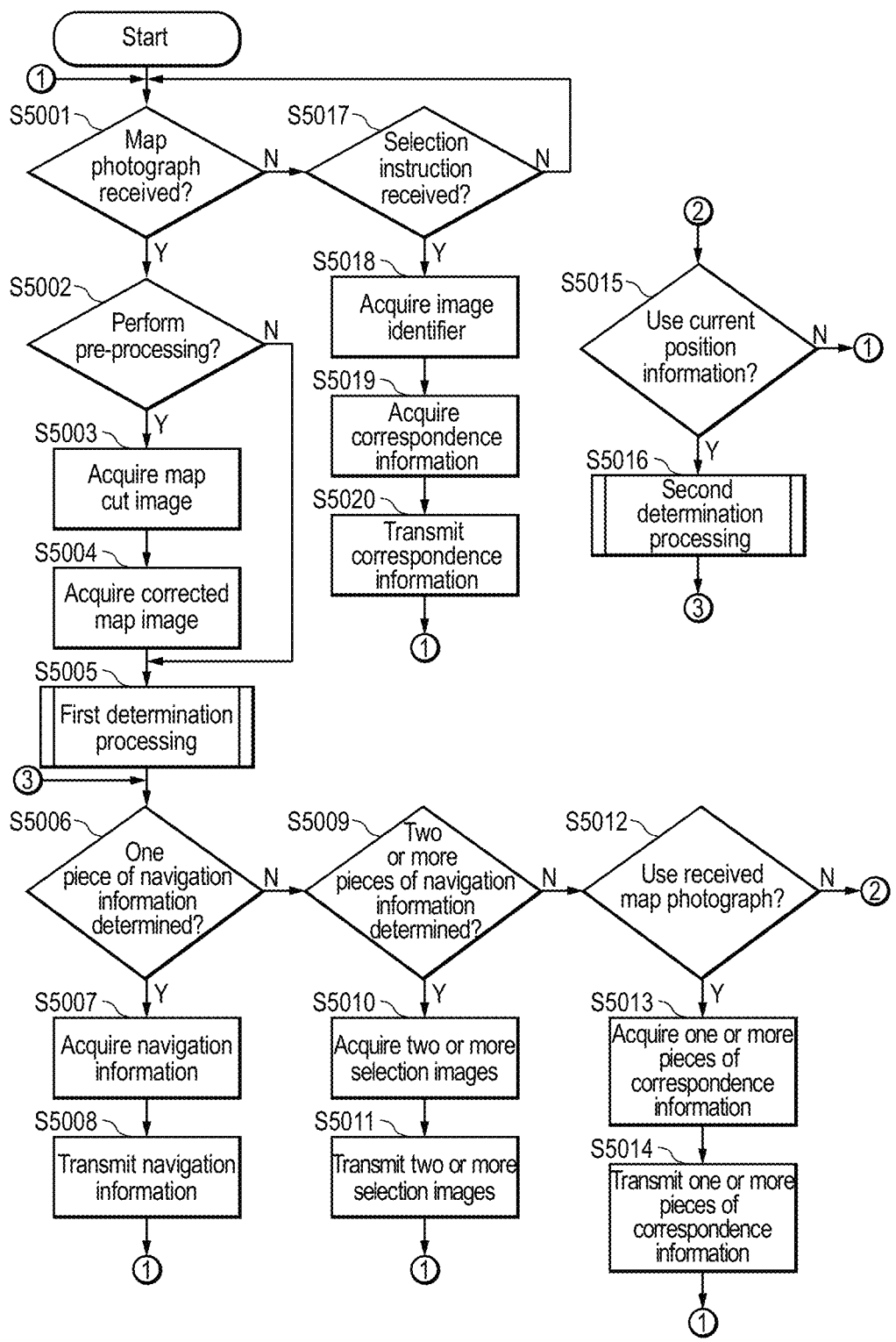
FIG. 50 is a flowchart illustrating examples of operations of the map representation data processing device G according to the same.

In the flowchart shown in FIG. 50, processing is terminated when power is turned off or an interruption is made to terminate the processing.

Figure 51:
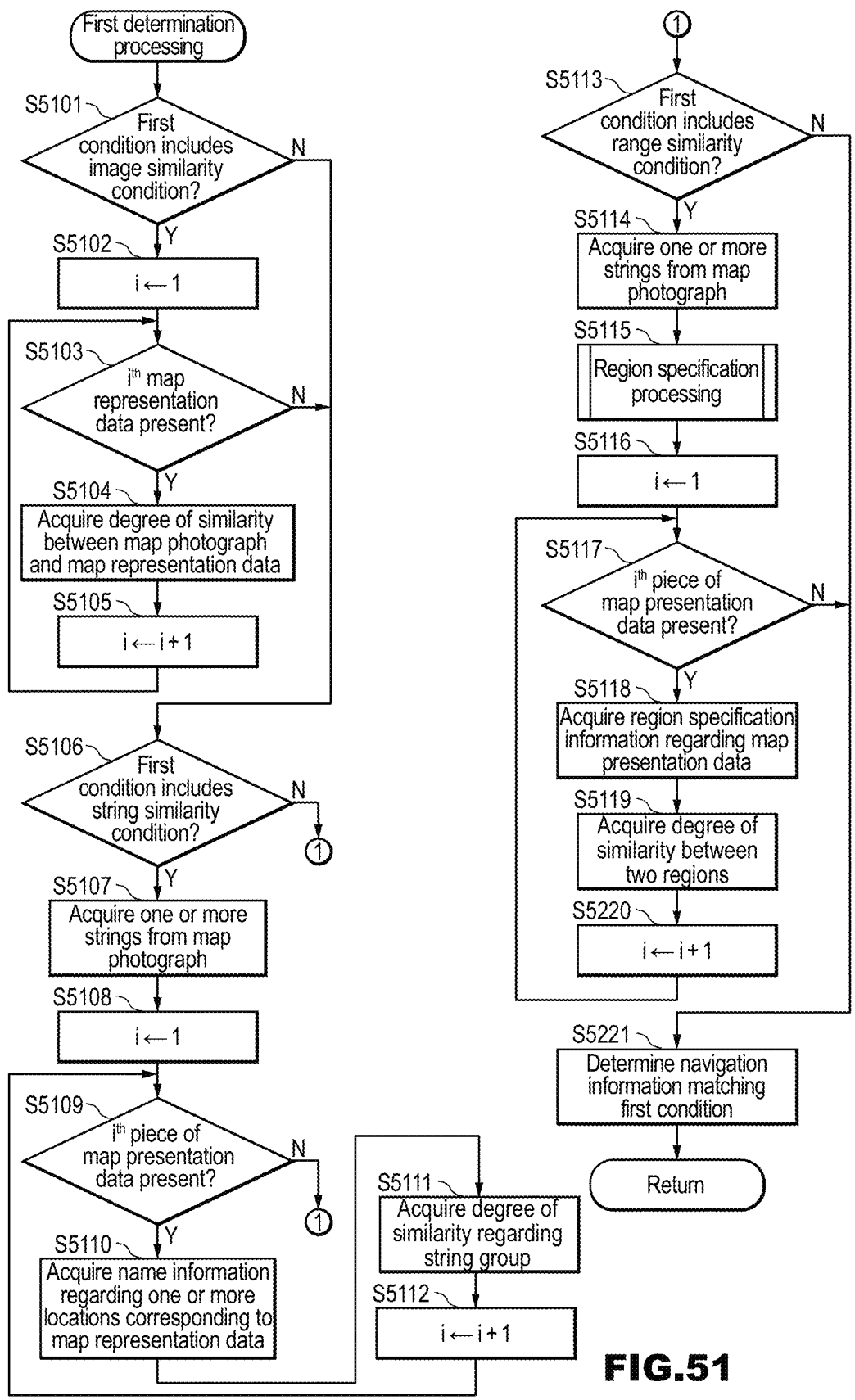
FIG. 51 is a flowchart illustrating an example of first determination processing according to the same.

Next, an example of the first determination processing in step S5005 will be described with reference to the flowchart shown in FIG. 51.

(Step S5101) The determination unit G36 judges whether or not the first condition includes an image similarity condition. If an image similarity condition is included, processing proceeds to step S5102, and if an image similarity condition is not included, processing proceeds to step S5106.

(Step S5102) The determination unit G36 substitutes 1 for the counter i.

(Step S5103) The determination unit G36 judges whether or not the $i^{th}$ piece of map representation data is present in the navigation information storage unit G11. If the $i^{th}$ piece of map representation data is present, processing proceeds to step S5104, and otherwise processing proceeds to step S5106.

(Step S5104) The determination unit G36 acquires an image similarity that is the degree of similarity between the map photograph that is an image and the $i^{th}$ piece of map representation data that is an image, and temporarily accumulates the image similarity in association with the $i^{th}$ piece of map representation data. Note that the image similarity may be an image sub score.

(Step S5105) The determination unit G36 increments the counter i by 1. Processing returns to step S5103.

(Step S5106) The determination unit G36 judges whether or not the first condition includes a string similarity condition. If a string similarity condition is included, processing proceeds to step S5107, and if a string similarity condition is not included, processing proceeds to step S5113.

(Step S5107) The string acquisition unit G31 performs character recognition processing on the map photograph to acquires a string group that is a group of one or more strings. It is preferable that the classification unit C32 judges whether or not the strings specify locations, and only strings that specify locations are acquired. It is also preferable that the position information acquisition unit G32 and the grouping unit C33 perform processing to exclude a string corresponding to position information regarding a location that is considered as not being located in the map photograph.

(Step S5108) The determination unit G36 substitutes 1 for the counter i.

(Step S5109) The determination unit G36 judges whether or not the $i^{th}$ piece of map representation data is present in the navigation information storage unit G11. If the $i^{th}$ piece of map representation data is present, processing proceeds to step S5110, and otherwise processing proceeds to step S5113.

(Step S5110) The determination unit G36 acquires one or more pieces of location information that are paired with the $i^{th}$ map representation data, from the navigation information storage unit G11. Note that the one or more pieces of location information is a string group of $i^{th}$ piece of map representation data.

(Step S5111) The determination unit G36 acquires a string similarity that is the degree of similarity between the string group of the map photograph and the string group of the $i^{th}$ piece of map representation data, and temporarily accumulates the string similarity in association with the $i^{th}$ map representation data. Note that the string similarity may be a string sub score.

(Step S5112) The determination unit G36 increments the counter i by 1. Processing returns to step S5109.

(Step S5113) The determination unit G36 judges whether or not the first condition includes a range similarity condition. If a range similarity condition is included, processing proceeds to step S5114, and if a range similarity condition is not included, processing proceeds to step S5121.

(Step S5114) The string acquisition unit G31 performs character recognition processing on the map photograph to acquires a string group that is a group of one or more strings.

(Step S5115) The region specification information acquisition unit G33 acquires region specification information regarding the map photograph, using the string group. Such region specification processing is, for example, the processing shown in FIG. 10 and FIG. 25.

(Step S5116) The determination unit G36 substitutes 1 for the counter i.

(Step S5117) The determination unit G36 judges whether or not the $i^{th}$ piece of map representation data is present in the navigation information storage unit G11. If the $i^{th}$ piece of map representation data is present, processing proceeds to step S5118, and otherwise processing proceeds to step S5121.

(Step S5118) The determination unit G36 acquires region specification information regarding the $i^{th}$ map representation data, from the navigation information storage unit G11.

(Step S5119) The determination unit G36 acquires the degree of similarity between two pieces of region specification information, and temporarily stores the range similarity in association with the $i^{th}$ piece of map representation data. Note that the range similarity may be a range sub score.

(Step S5120) The determination unit G36 increments the counter i by 1. Processing returns to step S5117.

(Step S5121) The determination unit G36 judges, for each piece of map representation data, whether or not the piece of map representation data matches the first condition, using the image similarity, the string similarity, and the range similarity associated with the piece of map representation data, and determines a piece of navigation information that includes that matching piece of map representation data.

Note that the flowcharts in FIGS may be.

Figure 52:
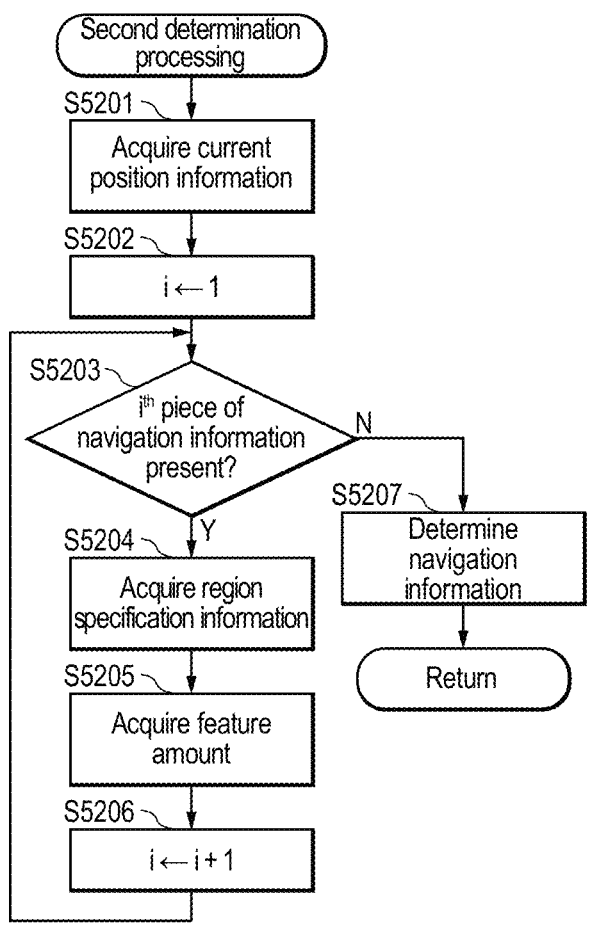
FIG. 52 is a flowchart illustrating an example of second determination processing according to the same.

Next, an example of the second determination processing in step S5016 will be described with reference to the flowchart shown in FIG. 52.

(Step S5201) The determination unit G36 acquires the received current position information.

(Step S5202) The determination unit G36 substitutes 1 for the counter i.

(Step S5203) The determination unit G36 judges whether or not the $i^{th}$ piece of navigation information is present in the navigation information storage unit G11. If the $i^{th}$ piece of navigation information is present, processing proceeds to step S5204, and otherwise processing proceeds to step S5207.

(Step S5204) The determination unit G36 acquires region specification information corresponding to the $i^{th}$ piece of navigation information.

(Step S5205) The determination unit G36 acquires one or more feature amounts, using the region specification information corresponding to the $i^{th}$ navigation information and the current position information, and temporarily accumulates the feature amounts in association with the $i^{th}$ navigation information. Note that examples of feature amounts include the distance between the center point of the region specification information and the current position information, whether or not the position indicated by the current position information is included in the region indicated by the region specification information, the size of the region indicated by the region specification information, and the coordinate information corresponding to the current position information in the region indicated by the region specification information.

(Step S5206) The determination unit G36 increments the counter i by 1. Processing returns to step S5203.

(Step S5207) The determination unit G36 determines one or more pieces of navigation information for which the one or more feature amounts acquired in step S5205 match the second condition. Processing returns to higher level processing. For example, the determination unit G36 determines one or more navigation information for which the position indicated by the current position information is included in the region indicated by the region specification information, and the distance between the center point of the region specification information and the current position information no greater than or less than a threshold value.

Figure 53:
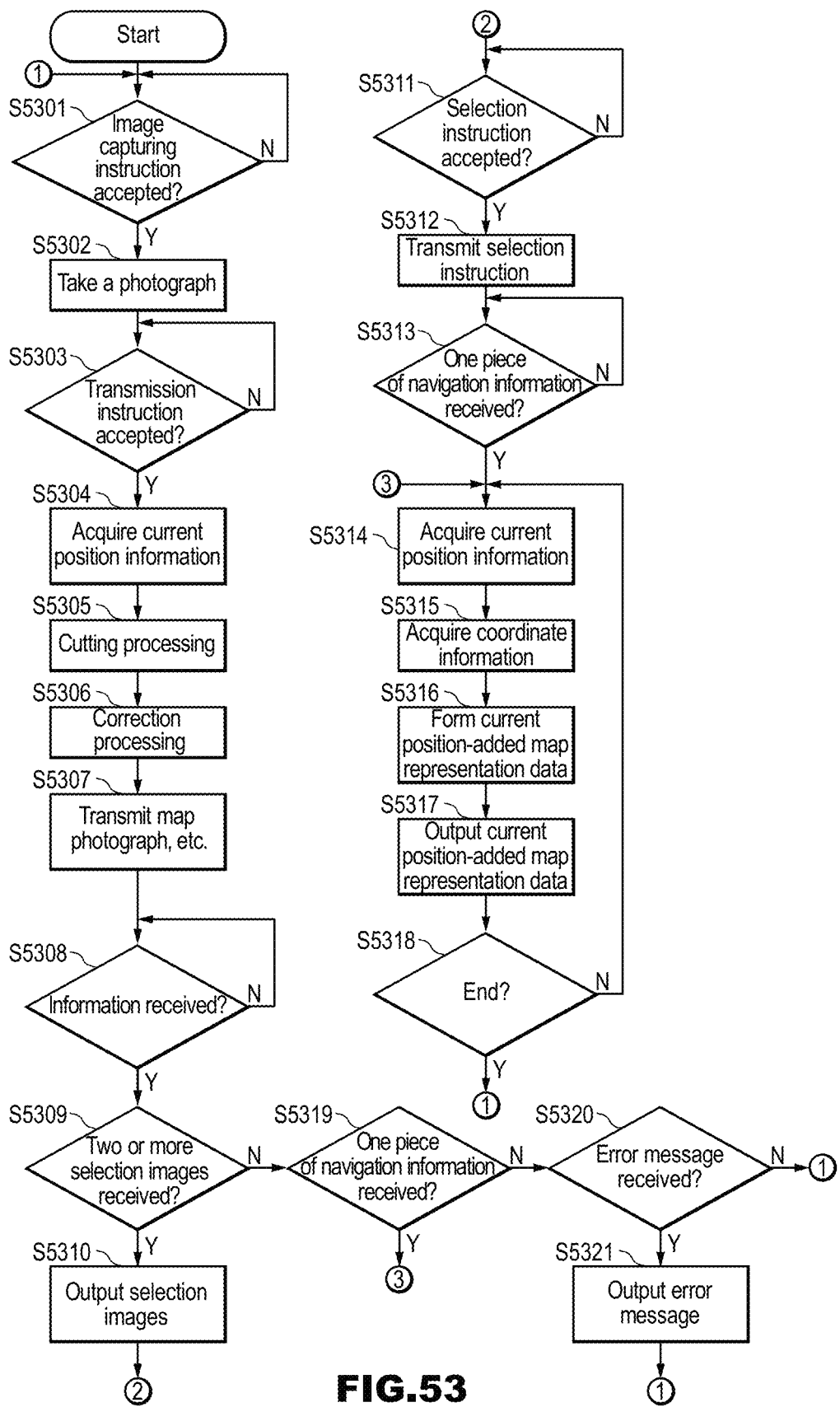
FIG. 53 is a flowchart illustrating examples of operations of a terminal device H according to the same.

Next, examples of operations of the terminal device H will be described with reference to the flowchart shown in FIG. 53.

(Step S5301) The terminal acceptance unit H2 judges whether or not an instruction to take a photograph has been accepted. If an instruction to take a photograph has been accepted, processing proceeds to step S5302, and if an instruction to take a photograph has not been accepted, processing returns to step S5301.

(Step S5302) The terminal image capturing unit H31 takes a photograph to acquire a map photograph, and temporarily accumulate the map photograph in a buffer.

(Step S5303) The terminal acceptance unit H2 judges whether or not a transmission instruction has been accepted. If a transmission instruction has been accepted, processing proceeds to step S5304, and if a transmission instruction has not been accepted, processing returns to step S5303.

(Step S5304) The terminal position acquisition unit H34 acquires current position information.

(Step S5305) The terminal cutting unit H32 cuts the map region from the map photograph in the buffer to acquire a map cut image.

(Step S5306) The terminal correction unit H33 corrects the map cut image acquired in step S5305 to be a rectangle to acquire a corrected map image. Note that this corrected map image is a map photograph as well.

(Step S5307) The terminal transmission unit H4 transmits the map photograph and the current position information acquired in step S5306, to the map representation data processing device G. Note that the processing in steps S5305 and S5306 is an option. If the processing in steps S5305 and S5306 is not performed, the terminal transmission unit H4 transmits the map photograph accumulated in the buffer in step S5302 and the current position information to the map representation data processing device G.

(Step S5308) The terminal reception unit H5 judges whether or not information has been received from the map representation data processing device G. If information has been received, processing proceeds to step S5309, and if information has not been received, processing returns to step S5308.

(Step S5309) The terminal processing unit H3 judges whether or not the information received in step S5308 is two or more selection images. If the information is two or more selection images, processing proceeds to step S5310, and if the information is not two or more selection images, processing proceeds to step S5314.

(Step S5310) The terminal output unit H6 outputs the two or more selection images thus received.

(Step S5311) The terminal acceptance unit H2 judges whether or not an instruction regarding one selection image has been accepted. If an instruction has been accepted, processing proceeds to step S5312, and if an instruction has not been accepted, processing returns to step S5311.

(Step S5312) The terminal processing unit H3 forms a selection instruction that is an instruction that includes an image identifier corresponding to the instruction received in step S5311, and that is to be transmitted. The terminal transmission unit H4 transmits a selection instruction that includes an image identifier, to the map representation data processing device G.

(Step S5313) The terminal reception unit H5 judges whether or not one piece of navigation information has been received from the map representation data processing device G. If one piece of navigation information has been received, processing proceeds to step S5314, and if one piece of navigation information has not been received, processing returns to step S5313.

(Step S5314) The terminal position acquisition unit H34 acquires current position information.

(Step S5315) The terminal coordinate acquisition unit H35 acquires current coordinate information corresponding to the current position information acquired in step S5314, using the two or more pieces of correspondence information contained in the navigation information received in step S5313.

(Step S5316) The terminal processing unit H3 forms current position-added map representation data by adding a pattern explicitly indicating the current position to the map representation data contained in the navigation information received in step S5313, at the coordinate position indicated by the current coordinate information.

(Step S5317) The terminal output unit H6 outputs the current position-added map representation data formed in step S5316.

(Step S5318) The terminal processing unit H3 judges whether or not to stop the output of current position-added map representation data. If the output is to be stopped, processing proceeds to step S5301, and if the output is not to be stopped, processing returns to step S5314. Note that when the output is to be stopped typically is when the terminal acceptance unit H2 accepts a stop instruction from the user.

(Step S5319) The terminal reception unit H5 judges whether or not one piece of navigation information has been received from the map representation data processing device G. If one piece of navigation information has been received, processing proceeds to step S5314, and if one piece of navigation information has not been received, processing proceeds to step S5320.

(Step S5320) The terminal reception unit H5 judges whether or not an error message has been received from the map representation data processing device G. If an error message has been received, processing proceeds to step S5321, and if an error message has not received, processing returns to step S5301.

(Step S5321) The terminal output unit H6 outputs the received error message. Processing returns to step S5301. Note that there is not limitation on the content of the error message. The error message is, for example, information indicating that navigation information could not be acquired.

The following describes examples of specific operations of the information system F according to the present embodiment. A conceptual diagram for the information system F is shown in FIG. 47.

Now, it is assumed that the navigation information management table shown in FIG. 54 is stored in the navigation information storage unit G11 in the map representation data processing device G. The navigation information management table is a table that stores two or more that each contain "ID", "navigation information", and "thumbnail image". "Navigation information" contains "map representation data" and two or more pieces of "correspondence information". "Correspondence information" contains "coordinate information" and "position information". Here, "region specification information" is information that specifies the region supported by map representation data, and indicates the upper left position information (latitude, longitude) and the lower right position information (latitude, longitude) of the map representation data that is a rectangle. That is to say, $P1(X_{P1}, Y_{P1})$ of the record with "ID=1" is the upper left position information, and $P2(X_{P2}, Y_{P2})$ of the record is the lower right position information. The attribute value of "map representation data" is the file or the file name of the map representation data. "Thumbnail image" is a thumbnail image of the map representation data, and is assumed here to be stored in advance.

Figure 55:
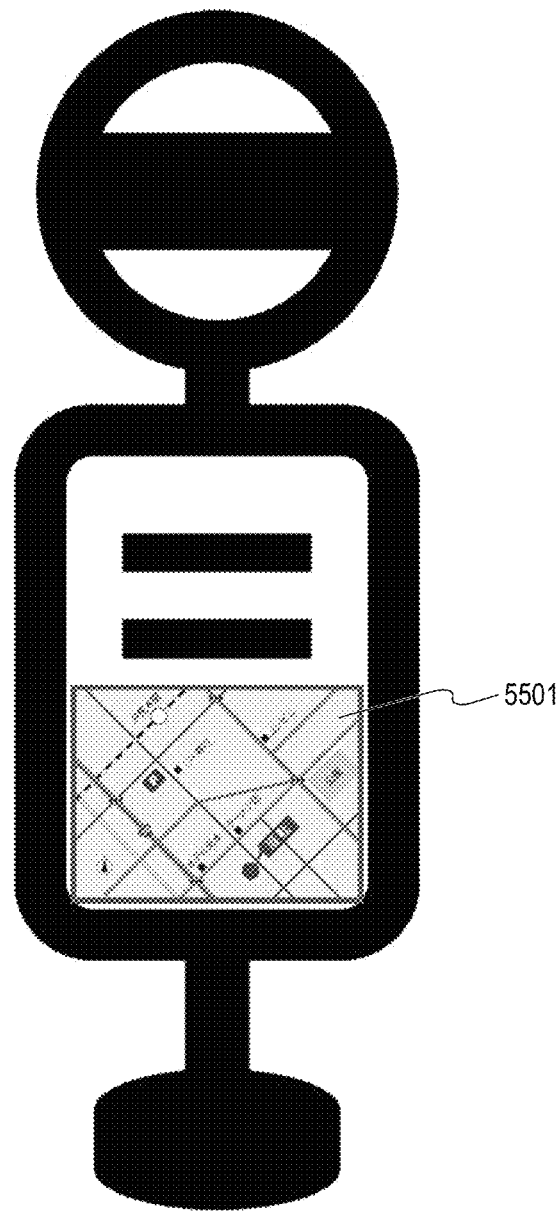
FIG. 55 is a diagram showing an example of an illustration map of an image capturing target according to the same.
Figure 56:
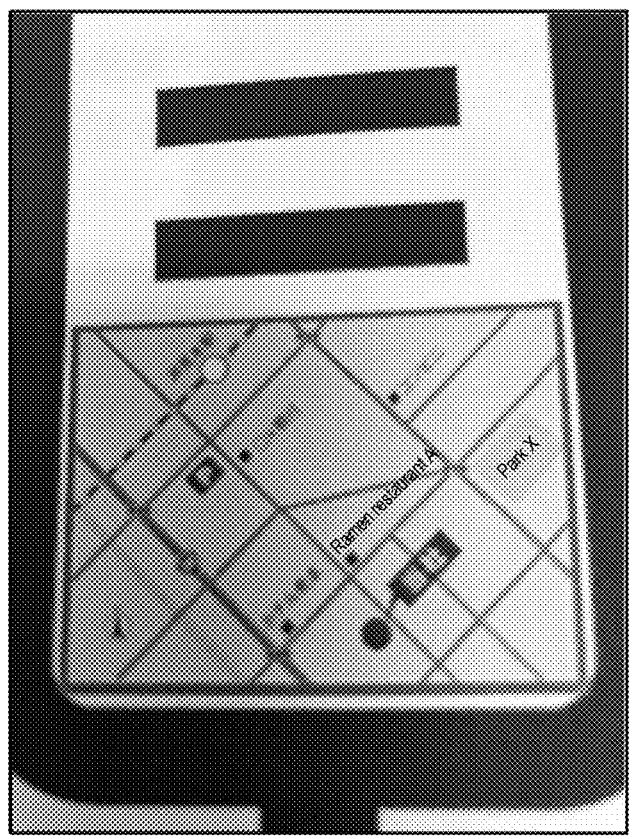
FIG. 56 is a diagram showing an example of a map photograph according to the same.

In such a situation, it is assumed that the user starts a map representation data application in the terminal device H and takes a photograph of an illustration map (5501 in FIG. 55) installed at a bus stop at a sightseeing spot where there is present, using the camera function of the terminal device H from the application. Next, the terminal image capturing unit H31 of the terminal device H takes a photograph to acquire a map photograph (FIG. 56). It is also assumed that the terminal position acquisition unit H34 of the terminal device H acquires the current position information $(X_t, Y_t)$ of the terminal.

After taking a photograph, the application of the terminal transmission unit H4 immediately transmits the map photograph (FIG. 56) and the current position information $(X_t, Y_t)$ to the map representation data processing device G. Note that if the terminal cutting unit H32 and the terminal correction unit H33 of the terminal device H have performed pre-processing, a flag indicating that pre-processing is complete is transmitted to the map representation data processing device G. However, in this example, it is assumed that pre-processing is not performed.

Next, the photograph reception unit G21 of the map representation data processing device G receives the map photograph shown in FIG. 56 and the current position information $(X_t, Y_t)$ Next, the processing unit G3 judges that a flag indicating that pre-processing is complete has not been received, and determines to perform pre-processing.

Figure 57:
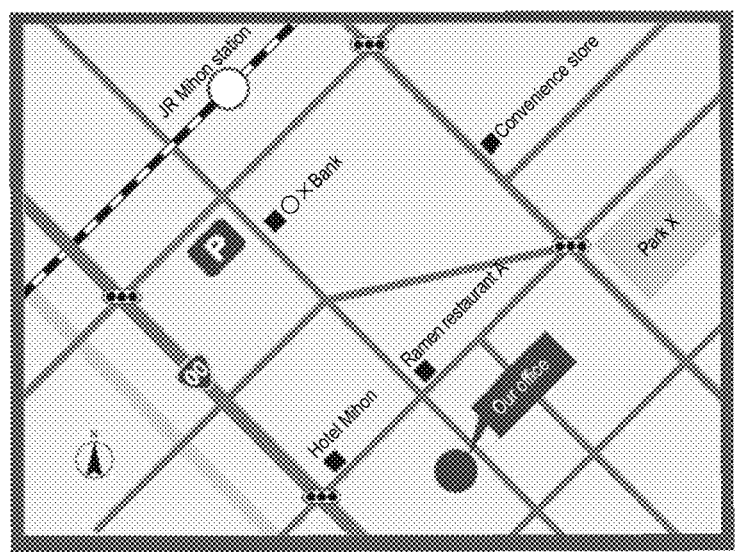
FIG. 57 is a diagram showing an example of a map photograph that has undergone pre-processing according to the same.

Next, the cutting part G361 cuts the map region from the map photograph shown in FIG. 56, to acquire a map cut image. The correction part G362 corrects the map cut image to be a rectangle to acquire the corrected map image in FIG. 57. Note that this corrected map image may be referred to as a map photograph.

Next, it is assumed that the determination unit G36 performs the first determination processing to determine navigation information using the map photograph that has undergone pre-processing (FIG. 57), to determine three pieces of navigation information. The details of the first determination processing have been described above, and therefore the descriptions thereof will be omitted here.

Next, the determination unit G36 acquires selection images that are thumbnail images contained in the three pieces of navigation information that have been determined, from the navigation information management table (FIG. 54).

Next, the processing unit G3 forms information regarding a selection screen that includes the three selection images thus acquired. Thereafter, the election image transmission unit G41 transmits information regarding the selection screen to the terminal device H. Note that information regarding the selection screen is written in, for example, HTML, XML, or the like.

Figure 58:
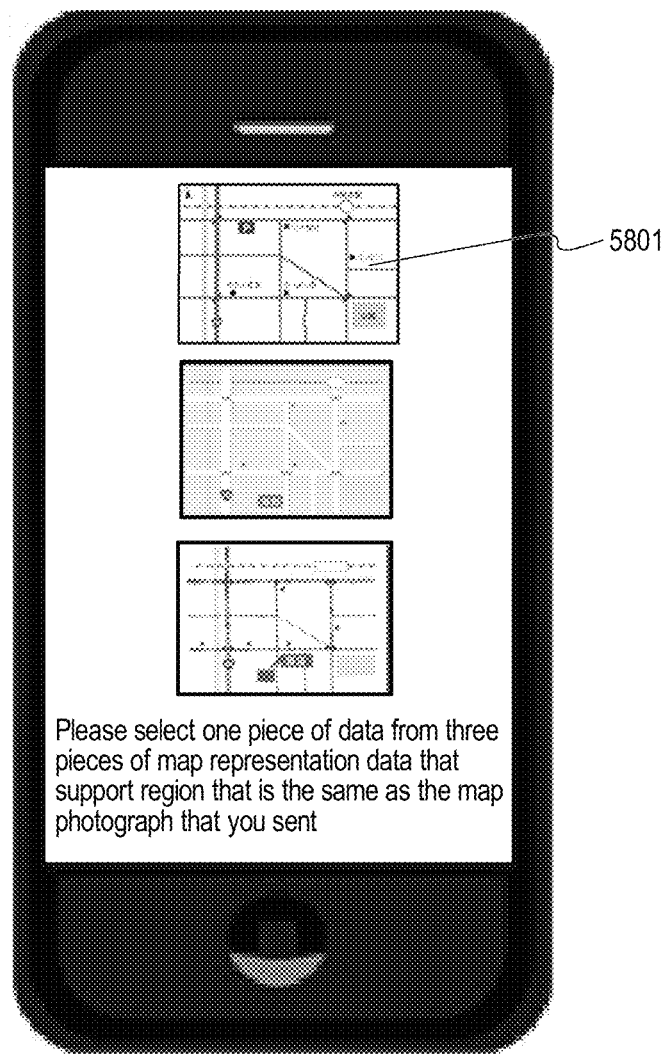
FIG. 58 is a diagram showing an example of a selection screen according to the same.

Next, the terminal reception unit H5 of the terminal device H receives information regarding the selection screen. Thereafter, the terminal processing unit H3 forms the selection screen, using the received information regarding the selection screen. Next, the terminal output unit H6 outputs the selection screen shown in FIG. 58.

Next, it is assumed that the user selects one selection image 5801 from among the three selection images. The terminal acceptance unit H2 of the terminal device H accepts a selection instruction. Thereafter, the terminal processing unit H3 forms a selection instruction that contains the image identifier of the selection image 5801. Next, the terminal transmission unit H4 transmits the selection instruction to the map representation data processing device G.

Next, the selection reception unit G22 of the map representation data processing device G receives the selection instruction. Next, the determination unit G36 acquires the image identifier included in the received selection instruction. Also, the determination unit G36 acquire navigation information corresponding to the image identifier, from the navigation information management table. Next, the navigation information transmission unit G42 transmits the acquired navigation information to the terminal device H.

Figure 59:
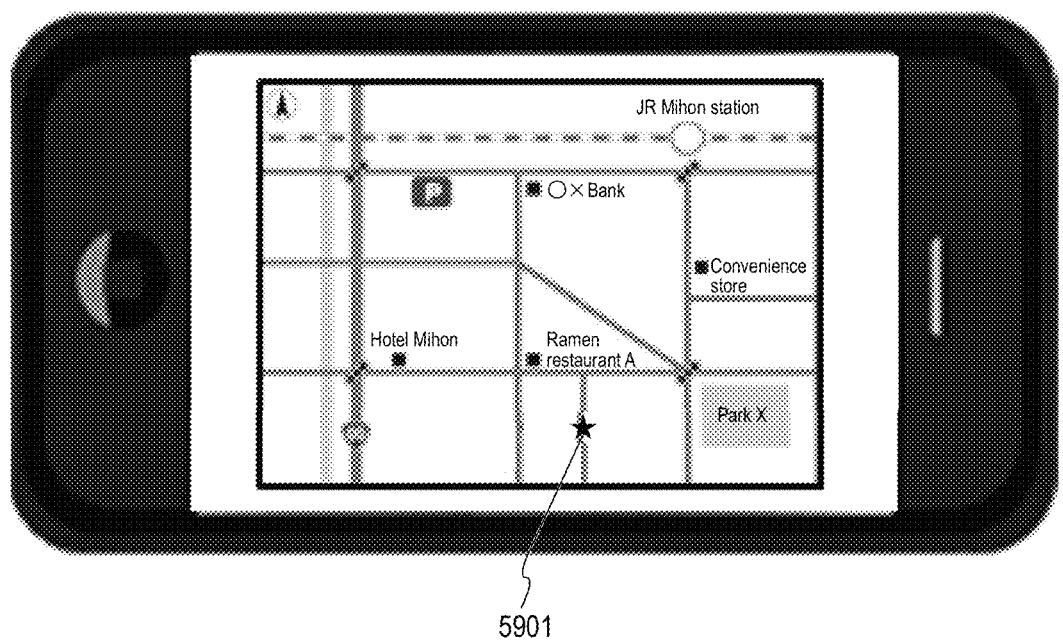
FIG. 59 is a diagram showing an example of an output according to the same.

Next, the terminal reception unit H5 of the terminal device H receives one piece of navigation information. Thereafter, the terminal position acquisition unit H34 acquires current position information. Next, the terminal coordinate acquisition unit H35 acquires current coordinate information corresponding to current position information, using the two or more pieces of correspondence information contained in the received navigation information. Next, the terminal processing unit H3 forms current position-added map representation data by adding a pattern explicitly indicating the current position to the map representation data contained in the received navigation information, at the coordinate position indicated by the current coordinate information. Next, the terminal output unit H6 outputs the current position-added map representation data thus formed. Such an output example is shown in FIG. 59. The pattern 5901 indicates the current position.

As described above, according to the present embodiment, it is possible to realize navigation that employs map representation data acquired using a captured map photograph.

Also, according to the present embodiment, it is possible to accurately select an appropriate map representation data, as a result of performing pre-processing on the captured map photograph.

Also, according to the present embodiment, the user can select their favorite map representation data from among two or more pieces of map representation data corresponding to the captured map photograph.

Furthermore, according to the present embodiment, it is possible to realize navigation that employs the captured map photograph, by automatically acquiring correspondence information corresponding to the captured map photograph and transmitting it to the terminal device H.

Note that the processing in the present embodiment may be realized using software. This software may be distributed through software downloading or the like. Also, this software may be recorded on a recording medium such as a CD-ROM and distributed. Note that the same applies to the other embodiments in the present description. The software that realizes the map representation data processing device G in the present embodiment is the program described below. That is to say, the program enables a computer to function as: a photograph reception unit that receives a captured map photograph from a terminal device; a determination unit that searches a navigation information group that contains two or more pieces of navigation information that contain map representation data and two or more pieces of correspondence information that are each a set of coordinate information and position information on the map representation data that is one of an illustration map, a handwritten map, and a sketch map, and determines a piece of navigation information that has a relationship that satisfies a first condition, with the map photograph; and a navigation information transmission unit that transmits the piece of navigation information determined by the determination unit, to the terminal device.

The software that realizes the terminal device H is the program described below. That is to say, the program enables a computer to function as: a terminal image capturing unit that takes a map photograph; a terminal transmission unit that transmits the map photograph to a map representation data processing device; a terminal reception unit that receives navigation information from the map representation data processing device; a terminal position acquisition unit that acquires current position information; a terminal coordinate information acquisition unit that acquires current coordinate information corresponding to the current position information, using two or more pieces of correspondence information that are contained in the navigation information; and a terminal output unit that outputs current position-added map representation data formed by explicitly indicating a current position at a coordinate position that is indicated by the current coordinate information, on map representation data that is contained in the navigation information.

Figure 60:
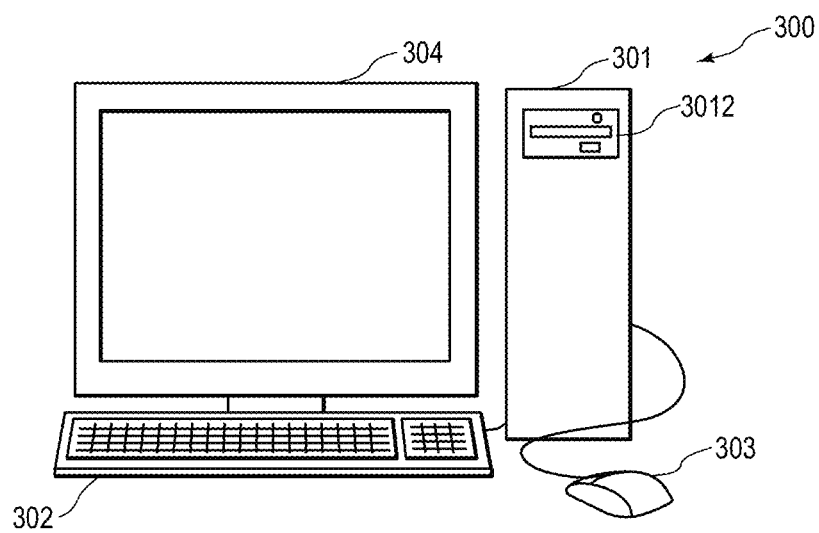
FIG. 60 is an overview diagram for a computer system according to the above-described embodiments.

FIG. 60 shows the external appearance of a computer that executes the program described herein to realize the map representation data processing device C and so on of the various embodiments described above. The above-described embodiments can be realized using computer hardware and a computer program that runs thereon. FIG. 60 is an overview diagram for this computer system 300, and FIG. 61 is a block diagram for the system 300.

In FIG. 60, the computer system 300 includes a computer 301 that includes a CD-ROM drive, a keyboard 302, a mouse 303, and a monitor 304.

Figure 61:
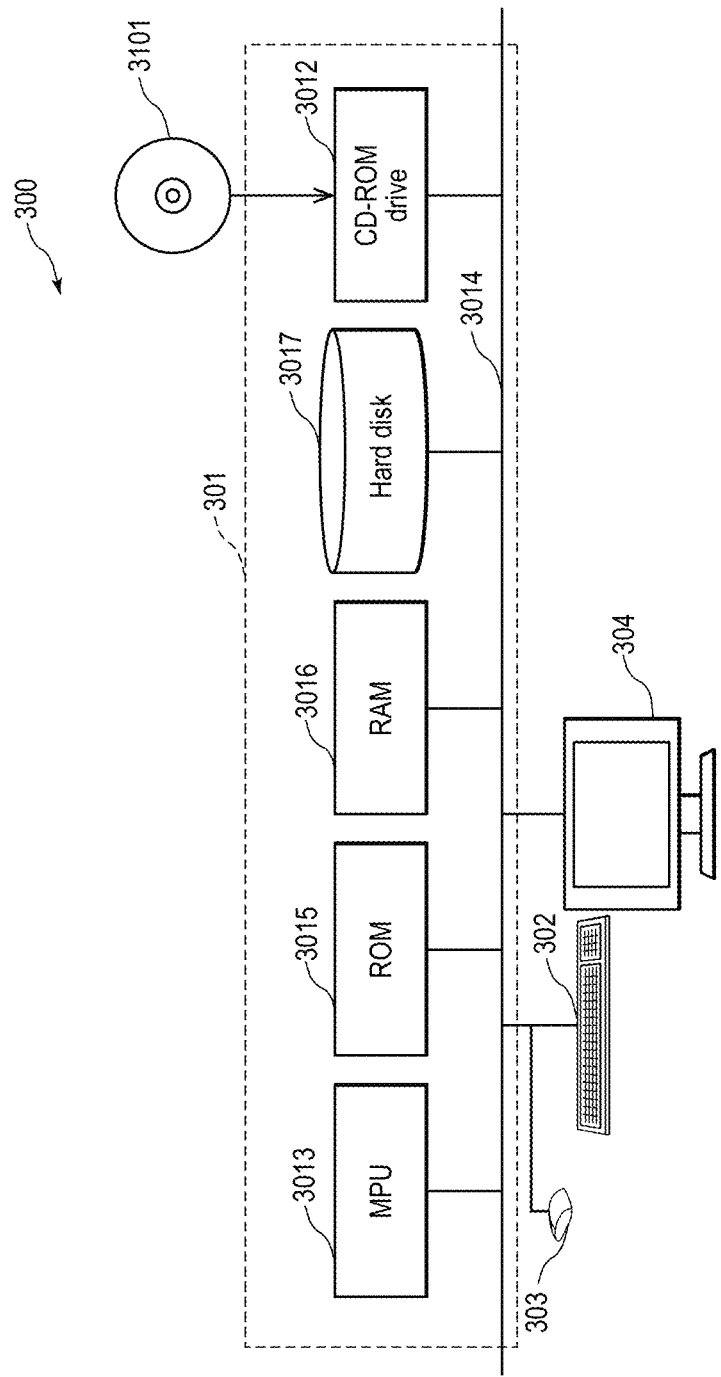
FIG. 61 is a block diagram for the computer system according to the same.

In FIG. 61, the computer 301 includes, in addition to the CD-ROM drive 3012, an MPU 3013, a bus 3014 that is connected to the CD-ROM drive 3012 and so on, a ROM 3015 for storing programs such as a boot-up program, a RAM 3016 that is connected to the MPU 3013 and is used to temporarily store application program instructions and provide a temporary storage space, and a hard disk 3017 for storing application programs, system programs, and data. Here, although not shown in the drawings, the computer 301 may further include a network card that provides connection to a LAN.

The program that enables the computer system 300 to perform the functions of the map representation data processing device G and so on according to the above-described embodiments may be stored in the CD-ROM 3101, inserted into the CD-ROM drive 3012, and furthermore transferred to the hard disk 3017. Alternatively, the program may be transmitted to the computer 301 via a network (not shown) and stored on the hard disk 3017. The program is loaded into the RAM 3016 when the program is to be executed. The program may be directly loaded from the CD-ROM 3101 or the network.

The program does not necessarily have to include an operating system (OS), a third-party program, or the like that enables the computer 301 to perform the functions of the map representation data processing device G and so on according to the embodiment described above. The program need only contain the part of the instruction that calls an appropriate function (module) in a controlled manner to achieve a desired result. How the computer system 300 works is well known and the detailed descriptions thereof will be omitted.

In the above-described program, the step of transmitting information and the step of receiving information do not include processing performed by hardware, for example, processing performed by a modem or interface card in the step of transmitting (processing that can only be performed by hardware).

There may be a single or multiple computers executing the above-described program. That is to say, centralized processing or distributed processing may be performed.

In addition, in each of the above-described embodiments, two or more communication means that are present in one device are physically one.

In the above-described embodiments, each kind of processing may be realized as centralized processing that performed by a single device, or distributed processing performed by multiple devices. That is to say, the map representation data processing device G and so on may operate as a stand-alone device.

As a matter of course, the present invention is not limited to the above-described embodiments, and various changes are possible, and such variations are also included within the scope of the present invention.

INDUSTRIAL APPLICABILITY

As described above, the map representation data processing device according to the present invention has the effect of being able to automatically acquire coordinate information and position information regarding location names or the like on map representation data in association with each other, and is useful as a map representation data processing device and so on.

REFERENCE SIGNS LIST

A Learning Device
B Classification Device
C, D, E, G Map Representation Data Processing Device
F Information System
H Terminal Device
A1, B1, C1, D1, G1 Storage Unit
A2, B2, C2, D2 Acceptance Unit
A3, B3, C3, D3, E3, G3 Processing Unit
A4, B4, C4, D4, E4 Output Unit
G2 Reception Unit
G4 Transmission Unit
A11 Learning Source Information Storage Unit
A12 Learner Storage Unit
A31 Learning Unit
A41 Accumulation Unit
B21 String Acceptance Unit
B31 Classification Unit
B41 Label Output Unit
C11 Location Dictionary Storage Unit
C12 Map Representation Data Storage Unit
C13 Accurate Map Information Storage Unit
C14 Correspondence Information Storage Unit
C21 Map Representation Data Acceptance Unit
C31, G31 String Acquisition Unit
C32 Classification Unit
C33 Grouping Unit
C34 Feature Spot Detection Unit
C35, G34 Coordinate Information Acquisition Unit
C36, G32 Position Information Acquisition Unit
C37, G33 Region Specification Information Acquisition Unit
C38 Direction Information Acquisition Unit
C41 Correspondence Output Unit
C42 Accurate Map Information Output Unit
C43 Direction Information Output Unit
C371 First Region Specification Information Acquisition Part
C372 Outer String Determination Part
C373 Size Information Acquisition Part
C374 Distance Information Acquisition Part
C375 Second Region Specification Information Acquisition Part
D31, G35 Current Position Information Acquisition Unit
D32 Coordinate Information Acquisition Unit
D33 Data Forming Unit
D41 Map Representation Data Output Unit
E31 Relationship Information Acquisition Unit
E32 Correspondence Information Acquisition Unit
E33 Scale Acquisition Unit
E34 Region Specification Information Acquisition Unit
E35 Additional Location Acquisition Unit
E36 Additional Position Acquisition Unit
E37 Additional Coordinate Acquisition Unit
E38 Location Addition Unit
E39 Direction Information Acquisition Unit
E41 Correspondence Output Unit
E42 Scale Information Output Unit
E43 Region Specification Information Output Unit
E44 Direction Information Output Unit
E321 Judging Part
E322 Correspondence Information Acquisition Part
G11 Navigation Information Storage Unit
G21 Photograph Reception Unit
G22 Selection Reception Unit
G36 Determination Unit
G41 Selection Image Transmission Unit
G42 Navigation Information Transmission Unit
G361 Cutting Part
G362 Correction Part G363 String Judging Part
G364 Image Judging Part
G365 Region Judging Part G
G366 Score Acquisition Part
G367 Determination Part
G368 Acquisition Part
H1 Terminal Storage Unit
H2 Terminal Acceptance Unit
H3 Terminal Processing Unit
H4 Terminal Transmission Unit
H5 Terminal Reception Unit
H6 Terminal Output Unit
H31 Terminal Image Capturing Unit
H32 Terminal Cutting Unit
H33 Terminal Correction Unit
H34 Terminal Position Acquisition Unit
H35 Terminal Coordinate Acquisition Unit

The invention claimed is:

1. A map representation data processing device comprising:
   a photograph reception unit that receives a captured map photograph from a terminal device;
   a determination unit that searches a navigation information group that contains two or more pieces of navigation information that contain map representation data and two or more pieces of correspondence information that are each a set of coordinate information and position information on the map representation data that is one of an illustration map, a handwritten map, and a sketch map, and determines a piece of navigation information that has a relationship that satisfies a first condition, with the map photograph;
   a string acquisition unit that acquires one or more strings from the map photograph; and
   a navigation information transmission unit that transmits the piece of navigation information determined by the determination unit, to the terminal device, wherein:
   the determination unit determines the piece of navigation information that satisfies the first condition, using the one or more strings,
   region specification information that specifies a region that is covered by the piece of map representation data is stored in association with the piece of navigation information,
   the string acquisition unit acquires three or more strings from the map photograph,
   the map representation data processing device further comprises:
      a position information acquisition unit that acquires pieces of position information corresponding to pieces of location information that are three or more strings acquired by the string acquisition unit, using a location dictionary that contains one or more pieces of location position information that associate the pieces of location information that specify locations and pieces of position information that specify positions of the locations with each other; and
      a region specification information acquisition unit that acquires region specification information that specifies a region that is covered by the map photograph, using the three or more pieces of position information acquired by the position information acquisition unit, and
   the determination unit determines a piece of navigation information corresponding to the region specification information acquired by the region specification information acquisition unit and the region specification information that satisfies the first condition.

2. The map representation data processing device according to claim 1,
   wherein the determination unit includes:
      a determination part that determines a piece of map representation data that is similar to the map photograph enough to satisfy the first condition; and
      an acquisition part that acquires a piece of navigation information that includes the piece of map representation data determined by the determination part, from the navigation information group, and
   the navigation information transmission unit transmits the piece of navigation information acquired by the acquisition part, to the terminal device.

3. The map representation data processing device according to claim 1, wherein:
   name information regarding locations is stored in association with the correspondence information, and
   the determination unit determines whether or not each of the one or more strings matches the name information, and determines the piece of navigation information that satisfies the first condition, using the result of the determination regarding matching between the strings and the name information.

4. The map representation data processing device according to claim 1,
   wherein the determination unit cuts a map region from the map photograph to acquire a map cut image, and searches a navigation information group that contains two or more pieces of navigation information that contain map representation data and two or more pieces of correspondence information that are each a set of coordinate information and position information on the map representation data, using the map cut image, and determines a piece of navigation information that is to be transmitted.

5. The map representation data processing device according to claim 4,
   wherein the determination unit corrects the map cut image to be a rectangle, and searches a navigation information group that contains two or more pieces of navigation information that contain map representation data and two or more pieces of correspondence information that are each a set of coordinate information and position information on the map representation data, using the corrected map image, and determines a piece of navigation information that is to be transmitted.

6. The map representation data processing device according to claim 1,
   wherein the photograph reception unit additionally receives terminal position information that specifies the current position of the terminal device, and
   if the determination unit fails to determine a piece of navigation information that satisfies the first condition, the determination unit determines a piece of navigation information that contains a piece of position information that indicates a position that is close to the terminal position information enough to satisfy a second condition.

7. The map representation data processing device according to claim 1, further comprising:
   a selection image transmission unit that, when the determination unit determines two or more pieces of navigation information, transmits two or more selection images that are pieces of map representation data that are contained in the two or more pieces of navigation information, or thumbnail images of the pieces of map representation data, to the terminal device; and a selection reception unit that receives a selection instruction that contains an image identifier that identifies a selection image, from the terminal device, wherein the navigation information transmission unit transmits two or more pieces of correspondence information that are paired with the image identifier contained in the selection instruction, to the terminal device.

8. The map representation data processing device according to claim 1, wherein the photograph reception unit additionally receives terminal position information that specifies the current position of the terminal device, the map representation data processing device further comprises:

a string acquisition unit that acquires three or more strings from the map photograph;

a coordinate information acquisition unit that acquires pieces of coordinate information regarding the three or more strings;

a position information acquisition unit that acquires pieces of position information corresponding to the three or more strings, using a location dictionary that contains one or more pieces of location position information that associate pieces of location information that specify locations and pieces of position information that specify positions of the locations with each other; and a current coordinate acquisition unit that acquires current coordinate information that specifies coordinates corresponding to the terminal position information, using three or more pieces of correspondence information that are sets of the pieces of coordinate information and the pieces of position information, and the terminal position information, and the navigation information transmission unit transmits the current coordinate information to the terminal device instead of the piece of navigation information.

9. An information processing method comprising:

a photograph reception step of receiving a captured map photograph from a terminal device;

a determination step of searching a navigation information group that contains two or more pieces of navigation information that contain map representation data and two or more pieces of correspondence information that are each a set of coordinate information and position information on the map representation data that is one of an illustration map, a handwritten map, and a sketch map, and determining a piece of navigation information that has a relationship that satisfies a first condition, with the map photograph; and a navigation information transmission step of transmitting the piece of navigation information determined in the determination step, to the terminal device, wherein the determination step includes cutting a map region from the map photograph to acquire a map cut image, and searching a navigation information group that contains two or more pieces of navigation information that contain map representation data and two or more pieces of correspondence information that are each a set of coordinate information and position information on the map representation data, using the map cut image, and determines a piece of navigation information that is to be transmitted.

10. The information processing method according to claim 9, wherein the determination step includes correcting the map cut image to be a rectangle, and searching a navigation information group that contains two or more pieces of navigation information that contain map representation data and two or more pieces of correspondence information that are each a set of coordinate information and position information on the map representation data, using the corrected map image, and determines a piece of navigation information that is to be transmitted.

11. The information processing method according to claim 9, wherein:

the photograph reception step incudes additionally receiving terminal position information that specifies the current position of the terminal device, and if in the determination step, it is failed to determine a piece of navigation information that satisfies the first condition, the determination step includes determining a piece of navigation information that contains a piece of position information that indicates a position that is close to the terminal position information enough to satisfy a second condition.

12. The information processing method according to claim 9, further comprising:

a selection image transmission step of, when the determination step determines two or more pieces of navigation information, transmitting two or more selection images that are pieces of map representation data that are contained in the two or more pieces of navigation information, or thumbnail images of the pieces of map representation data, to the terminal device; and a selection reception step of receiving a selection instruction that contains an image identifier that identifies a selection image, from the terminal device, wherein the navigation information transmission step includes transmitting two or more pieces of correspondence information that are paired with the image identifier contained in the selection instruction, to the terminal device.

13. A map representation data processing device comprising:

a photograph reception unit that receives a captured map photograph from a terminal device;

a determination unit that searches a navigation information group that contains two or more pieces of navigation information that contain map representation data and two or more pieces of correspondence information that are each a set of coordinate information and position information on the map representation data that is one of an illustration map, a handwritten map, and a sketch map, and determines a piece of navigation information that has a relationship that satisfies a first condition, with the map photograph; and a navigation information transmission unit that transmits the piece of navigation information determined by the determination unit, to the terminal device, wherein the determination unit cuts a map region from the map photograph to acquire a map cut image, and searches a navigation information group that contains two or more pieces of navigation information that contain map representation data and two or more pieces of correspondence information that are each a set of coordinate information and position information on the map representation data, using the map cut image, and determines a piece of navigation information that is to be transmitted.

14. The map representation data processing device according to claim 13,
wherein the determination unit corrects the map cut image to be a rectangle, and searches a navigation information group that contains two or more pieces of navigation information that contain map representation data and two or more pieces of correspondence information that are each a set of coordinate information and position information on the map representation data, using the corrected map image, and determines a piece of navigation information that is to be transmitted.

15. The map representation data processing device according to claim 13, wherein:
the photograph reception unit additionally receives terminal position information that specifies the current position of the terminal device, and
if the determination unit fails to determine a piece of navigation information that satisfies the first condition, the determination unit determines a piece of navigation information that contains a piece of position information that indicates a position that is close to the terminal position information enough to satisfy a second condition.

16. The map representation data processing device according to claim 13, further comprising:
a selection image transmission unit that, when the determination unit determines two or more pieces of navigation information, transmits two or more selection images that are pieces of map representation data that are contained in the two or more pieces of navigation information, or thumbnail images of the pieces of map representation data, to the terminal device; and
a selection reception unit that receives a selection instruction that contains an image identifier that identifies a selection image, from the terminal device,
wherein the navigation information transmission unit transmits two or more pieces of correspondence information that are paired with the image identifier contained in the selection instruction, to the terminal device.

17. A map representation data processing device comprising:
a photograph reception unit that receives a captured map photograph from a terminal device;
a determination unit that searches a navigation information group that contains two or more pieces of navigation information that contain map representation data and two or more pieces of correspondence information that are each a set of coordinate information and position information on the map representation data that is one of an illustration map, a handwritten map, and a sketch map, and determines a piece of navigation information that has a relationship that satisfies a first condition, with the map photograph; and
a navigation information transmission unit that transmits the piece of navigation information determined by the determination unit, to the terminal device, wherein:
the photograph reception unit additionally receives terminal position information that specifies the current position of the terminal device,
the map representation data processing device further comprises:
a string acquisition unit that acquires three or more strings from the map photograph;
a coordinate information acquisition unit that acquires pieces of coordinate information regarding the three or more strings;
a position information acquisition unit that acquires pieces of position information corresponding to the three or more strings, using a location dictionary that contains one or more pieces of location position information that associate pieces of location information that specify locations and pieces of position information that specify positions of the locations with each other; and
a current coordinate acquisition unit that acquires current coordinate information that specifies coordinates corresponding to the terminal position information, using three or more pieces of correspondence information that are sets of the pieces of coordinate information and the pieces of position information, and the terminal position information, and
the navigation information transmission unit transmits the current coordinate information to the terminal device instead of the piece of navigation information.

18. An information processing method comprising:
a photograph reception step of receiving a captured map photograph from a terminal device;
a determination step of searching a navigation information group that contains two or more pieces of navigation information that contain map representation data and two or more pieces of correspondence information that are each a set of coordinate information and position information on the map representation data that is one of an illustration map, a handwritten map, and a sketch map, and determining a piece of navigation information that has a relationship that satisfies a first condition, with the map photograph;
a string acquisition step of acquiring one or more strings from the map photograph; and
a navigation information transmission step of transmitting the piece of navigation information determined in the determination step, to the terminal device, wherein:
the determination step includes determining the piece of navigation information that satisfies the first condition, using the one or more strings,
region specification information that specifies a region that is covered by the piece of map representation data is stored in association with the piece of navigation information,
the string acquisition step includes acquiring three or more strings from the map photograph,
the information processing method further comprises:
a position information acquisition step of acquiring pieces of position information corresponding to pieces of location information that are three or more strings acquired in the string acquisition step, using a location dictionary that contains one or more pieces of location position information that associate the pieces of location information that specify locations and pieces of position information that specify positions of the locations with each other; and
a region specification information acquisition step of acquiring region specification information that specifies a region that is covered by the map photograph, using the three or more pieces of position information acquired in the position information acquisition step, and
the determination step includes determining a piece of navigation information corresponding to the region specification information acquired in the region specification information acquisition step and the region specification information that satisfies the first condition.

19. The information processing method according to claim 18, wherein:
the determination step includes:
a determination sub-step of determining a piece of map representation data that is similar to the map photograph enough to satisfy the first condition; and
an acquisition sub-step of acquiring a piece of navigation information that includes the piece of map representation data determined in the determination sub-step, from the navigation information group, and
the navigation information transmission step includes transmitting the piece of navigation information acquired in the acquisition sub-step, to the terminal device.

20. The information processing method according to claim 18, wherein:
name information regarding locations is stored in association with the correspondence information, and
the determination step includes determining whether or not each of the one or more strings matches the name information, and determining the piece of navigation information that satisfies the first condition, using the result of the determination regarding matching between the strings and the name information.

21. An information processing method comprising:
a photograph reception step of receiving a captured map photograph from a terminal device;
a determination step of searching a navigation information group that contains two or more pieces of navigation information that contain map representation data and two or more pieces of correspondence information that are each a set of coordinate information and position information on the map representation data that is one of an illustration map, a handwritten map, and a sketch map, and determining a piece of navigation information that has a relationship that satisfies a first condition, with the map photograph; and
a navigation information transmission step of transmitting the piece of navigation information determined in the determination step, to the terminal device, wherein:
the photograph reception step includes additionally receiving terminal position information that specifies the current position of the terminal device,
the information processing method further comprises:
a string acquisition step of acquiring three or more strings from the map photograph;
a coordinate information acquisition step of acquiring pieces of coordinate information regarding the three or more strings;
a position information acquisition step of acquiring pieces of position information corresponding to the three or more strings, using a location dictionary that contains one or more pieces of location position information that associate pieces of location information that specify locations and pieces of position information that specify positions of the locations with each other; and
a current coordinate acquisition step of acquiring current coordinate information that specifies coordinates corresponding to the terminal position information, using three or more pieces of correspondence information that are sets of the pieces of coordinate information and the pieces of position information, and the terminal position information, and
the navigation information transmission step of transmitting the current coordinate information to the terminal device instead of the piece of navigation information.

* * * * *